United States Patent [19]

Bartram et al.

[11] Patent Number: 5,640,541

[45] Date of Patent: Jun. 17, 1997

[54] ADAPTER FOR INTERFACING A SCSI BUS WITH AN IBM SYSTEM/360/370 I/O INTERFACE CHANNEL AND INFORMATION SYSTEM INCLUDING SAME

[75] Inventors: Robert P. Bartram, Garland; Thomas H. Butts, Wills Point; Isaac H. Collins, II, Carrollton; Stephen J. Clark, Irving; Cleve V. Graves, Dallas; William W. Kesler, Rowlett; Stephen W. Kosarek, Highland Village; Christopher F. Spurgeon, Mesquite; Paul C. Zuefeldt, Flower Mound, all of Tex.

[73] Assignee: Openconnect Systems, Inc., Dallas, Tex.

[21] Appl. No.: 410,086

[22] Filed: Mar. 24, 1995

[51] Int. Cl.$^6$ .................................................. G06F 13/00
[52] U.S. Cl. ...................................................... 395/500
[58] Field of Search .................................. 345/500, 309, 345/308, 294, 250, 253

[56] References Cited

U.S. PATENT DOCUMENTS

| | | | |
|---|---|---|---|
| 5,113,500 | 5/1992 | Talbott et al. | 395/309 |
| 5,191,653 | 3/1993 | Banks et al. | 395/253 |
| 5,204,951 | 4/1993 | Keener et al. | 395/294 |
| 5,274,763 | 12/1993 | Banks | 395/250 |
| 5,430,849 | 7/1995 | Banks | 395/308 |

OTHER PUBLICATIONS

OpenConnect Systems, *Distributed Solutions*, 1995.
OpenConnect Systems, *Internetwork Servers*, 1995.

*Primary Examiner*—Kevin J. Teska
*Assistant Examiner*—Dan Fiul
*Attorney, Agent, or Firm*—Baker & Botts, L.L.P.

[57] ABSTRACT

An information system (10) including a plurality of computer systems is provided. The information system (10) includes a first computer system (16) having an IBM System/360/370 I/O interface channel (18). The first computer system (16) is operable to communicate SNA and non-SNA protocol information via the IBM System/360/370 I/O interface channel (18). The information system (10) includes a second computer system (40) having a SCSI bus (38). The second computer system (40) is operable to communicate SCSI protocol information via the SCSI bus (38). An adapter (36) is coupled to the IBM System/360/370 I/O interface channel (18) of the first computer system (16) and the SCSI bus (38) of the second computer system (40). The adapter (36) is operable to interface the SCSI bus (38) with the IBM System/360/370 I/O interface channel (18) to allow bi-directional communication between the first computer system (16) and the second computer system (40).

28 Claims, 54 Drawing Sheets

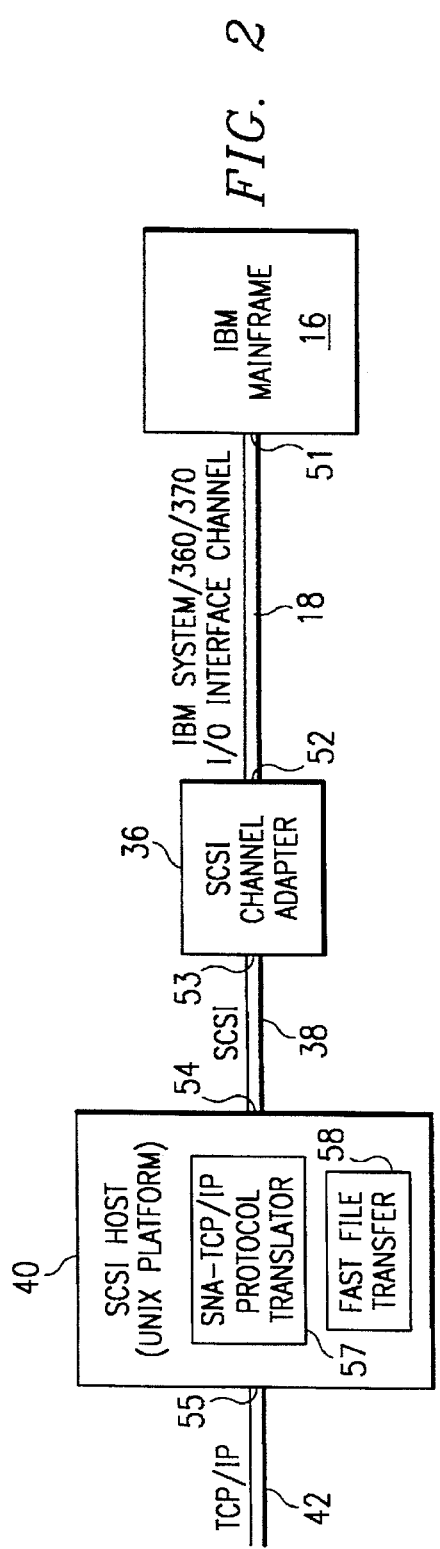
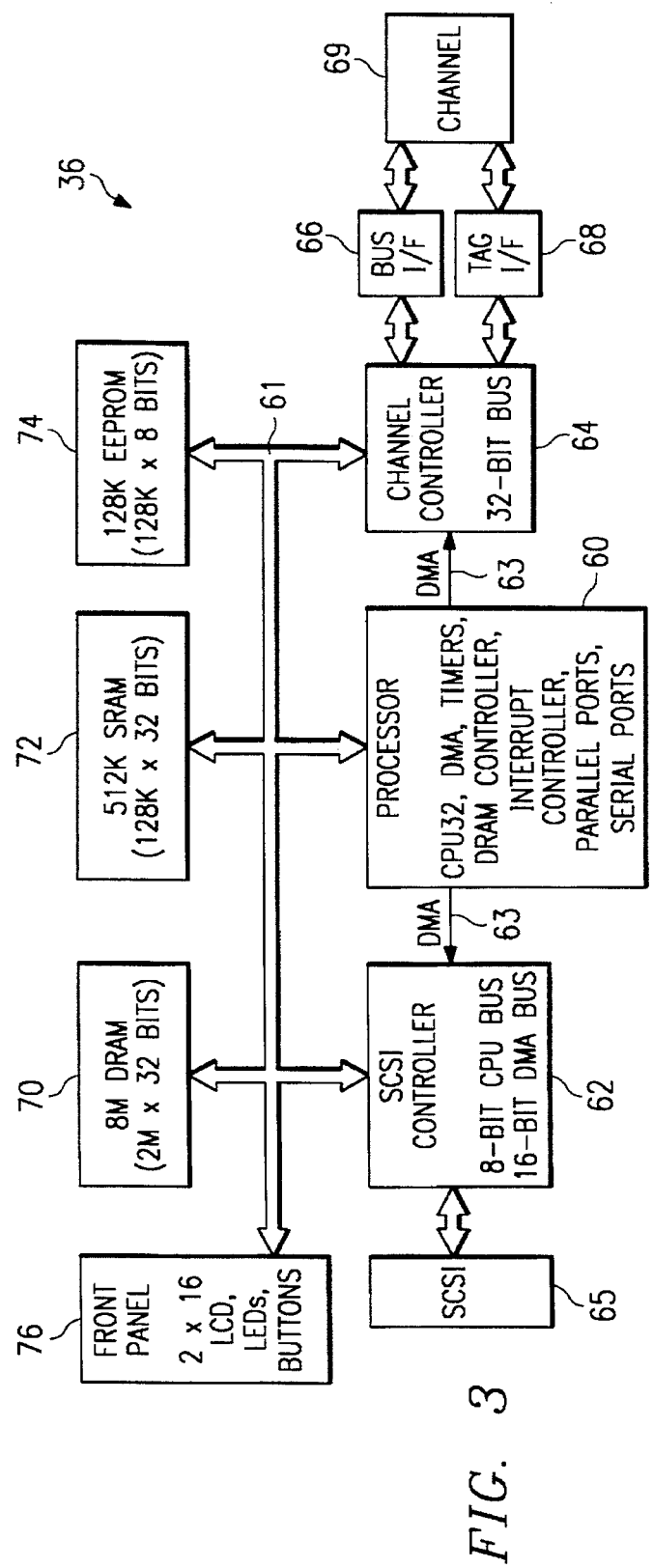
FIG. 2
FIG. 3

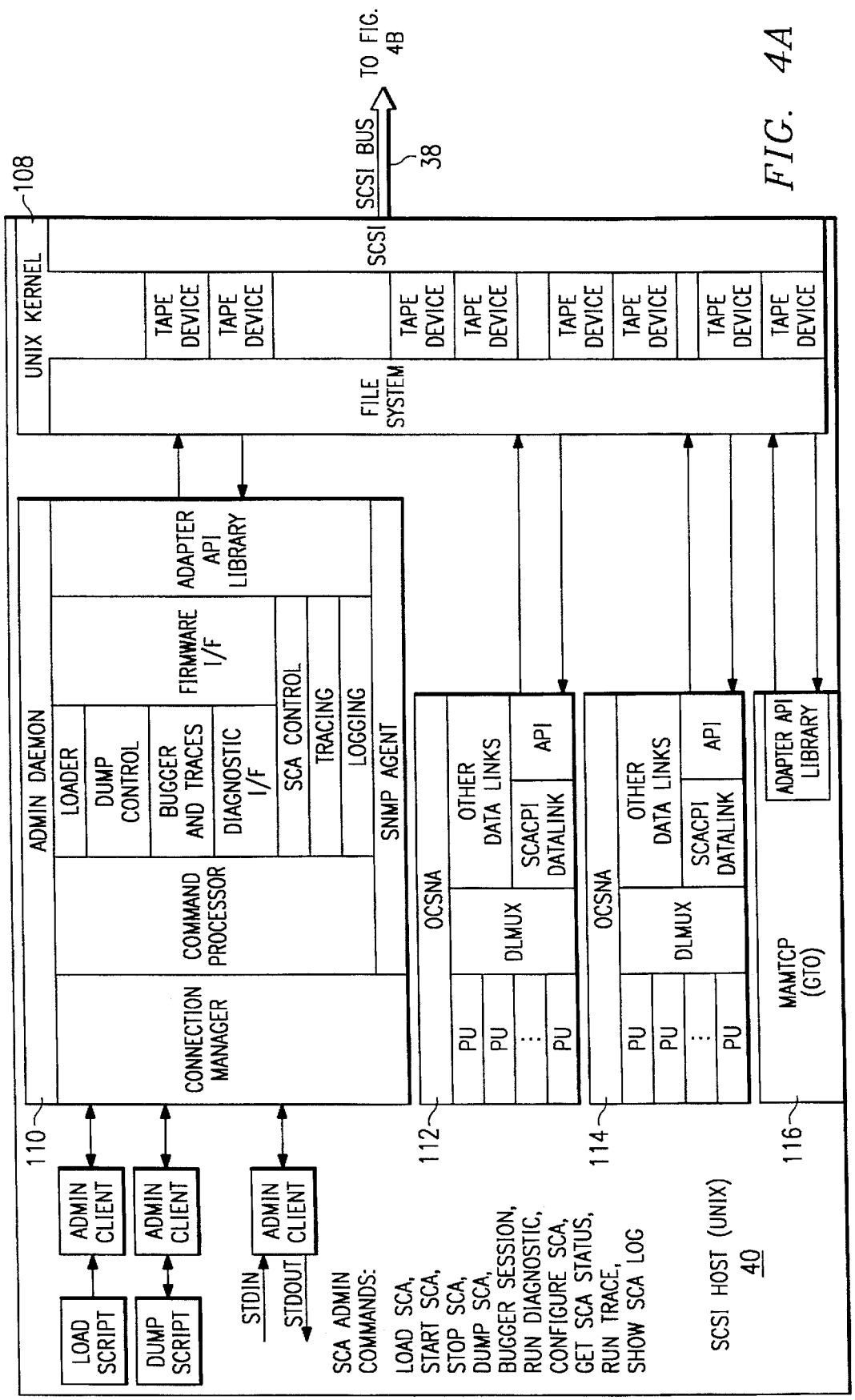

REFERENCE DOCUMENTION

| REF | PART | PAGE |
|---|---|---|
| U1 | MC75128 | 6 |
| U2 | MC3485 | 8 |
| U3 | DS1231 | 8 |
| U4 | 74F08 | 8,10 |
| U5 | MC3485 | 7 |
| U6 | 29C828 | 8 |
| U7 | MAX233 | 2 |
| U8 | 53C96 | 1 |
| U9 | 74F14 | 4,6,8,10 |
| U10 | 74F280A | 7 |
| U11 | MC3485 | 7 |
| U12 | 74HCT244 | 5 |
| U13 | 29C621 | 7 |
| U14 | MC75128 | 8 |
| U15 | MC75128 | 7 |
| U16 | 22V10 | 8 |
| U17 | XC4006 | 6 |
| U18 | 25Mhz | 2 |
| U19 | MC68360 | 2 |
| U20 | 29C828 | 7 |
| U21 | MC3485 | 8 |
| U22 | 74F163 | 8 |
| U23 | 74F74 | 5,10 |
| U24 | 74F280A | 7 |
| U25 | MC3461 | 8 |
| U26 | 74F163 | 8 |
| U27 | CY7C122 | 6 |
| U28 | 18Mhz | 8 |
| U29 | M8841000 | 3 |
| U30 | M8841000 | 3 |
| U31 | 74A520 | 5 |
| U32 | 74F138 | 2 |
| U33 | 74F163 | 5 |
| U34 | UON3611 | 8 |
| U35 | 22V10 | 5 |
| U36 | 28F010 | 3 |
| U37 | 74A6T245 | 3 |
| U38 | M8841000 | 3 |
| U39 | M8841000 | 3 |
| U40 | 16M36 | 3 |
| U41 | 74HCT123 | 5,10 |

| REF | DEVICE TYPE | DEVICE NUMBER | LABEL/FILE NAME | PART NUMBER | DESCRIPTION |
|---|---|---|---|---|---|
|  |  |  |  | 600-0060-101 | ROM, ASSEMBLY |
|  |  |  |  | 600-0060-201 | ASSEMBLY SPECIFICATION |
|  |  |  |  | 600-0060-301 | SCHEMATIC DIAGRAM |
|  |  |  |  | 600-0060-401 | TEST SPECIFICATION |
|  |  |  |  | 600-0060-402 | TEST SOFTWARE |
|  |  |  |  | 600-0060-501 | FABRICATION DRAWING |
|  |  |  |  | 600-0060-60X | ARTWORK |
|  |  |  |  | 600-0060-70X | SILKSCREEN |
|  |  |  |  | 600-0060-80X | SOLDERMASK, SOLDERPASTE |
|  |  |  |  | 600-0060-901 | RAV PC BOARD |
| U35 | GAL | 22V10 | 0111R(+ REV) | 575-0111-101 | LCD CONTROLLER |
| U18 | GAL | 22V10 | 0112R(+ REV) | 575-0112-101 | RESET AND CHANNEL PRIORITY |
| U17 | XILINX | XC4006-8 | 0017A | 270-0017-301 | CHANNEL SCHEMATIC 4006 |

NOTES: UNLESS OTHERWISE SPECIFIED
1) ALL PULLUP RESISTORS ARE 10K OHM SURFACE MOUNT 16 PIN 50 TYPE AND ARE ON PAGE 10.
2) ALL CAPACITORS ARE .1uf.
3) ALL SPARE PARTS ARE ON PAGE 10.

| LINK
| PG2.sch
| PG3.sch
| PG4.sch
| PG5.sch
| PG6.sch
| PG7.sch
| PG8.sch
| PG9.sch
| PG10.sch
| PG11.sch

*FIG. 5A*

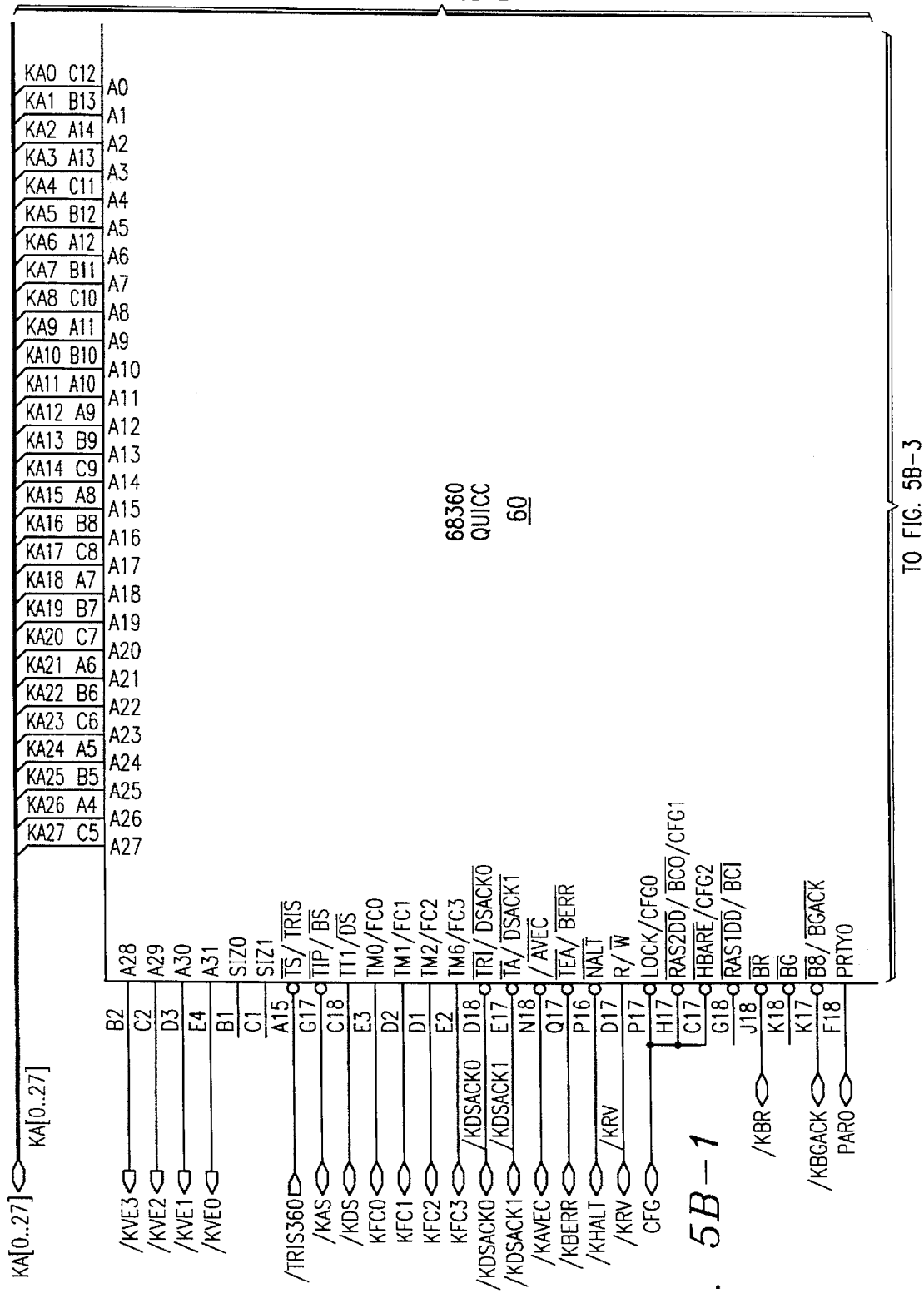

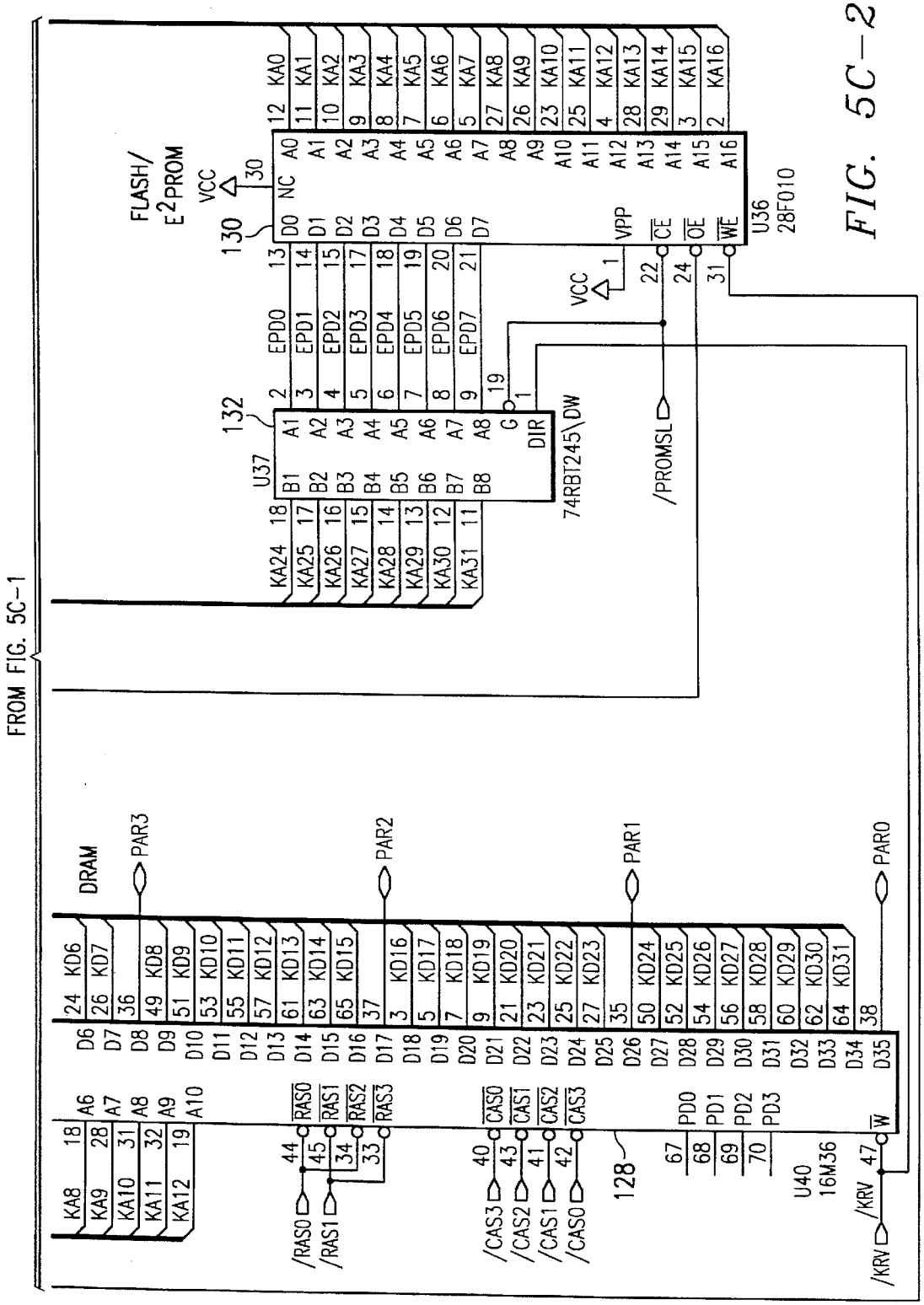

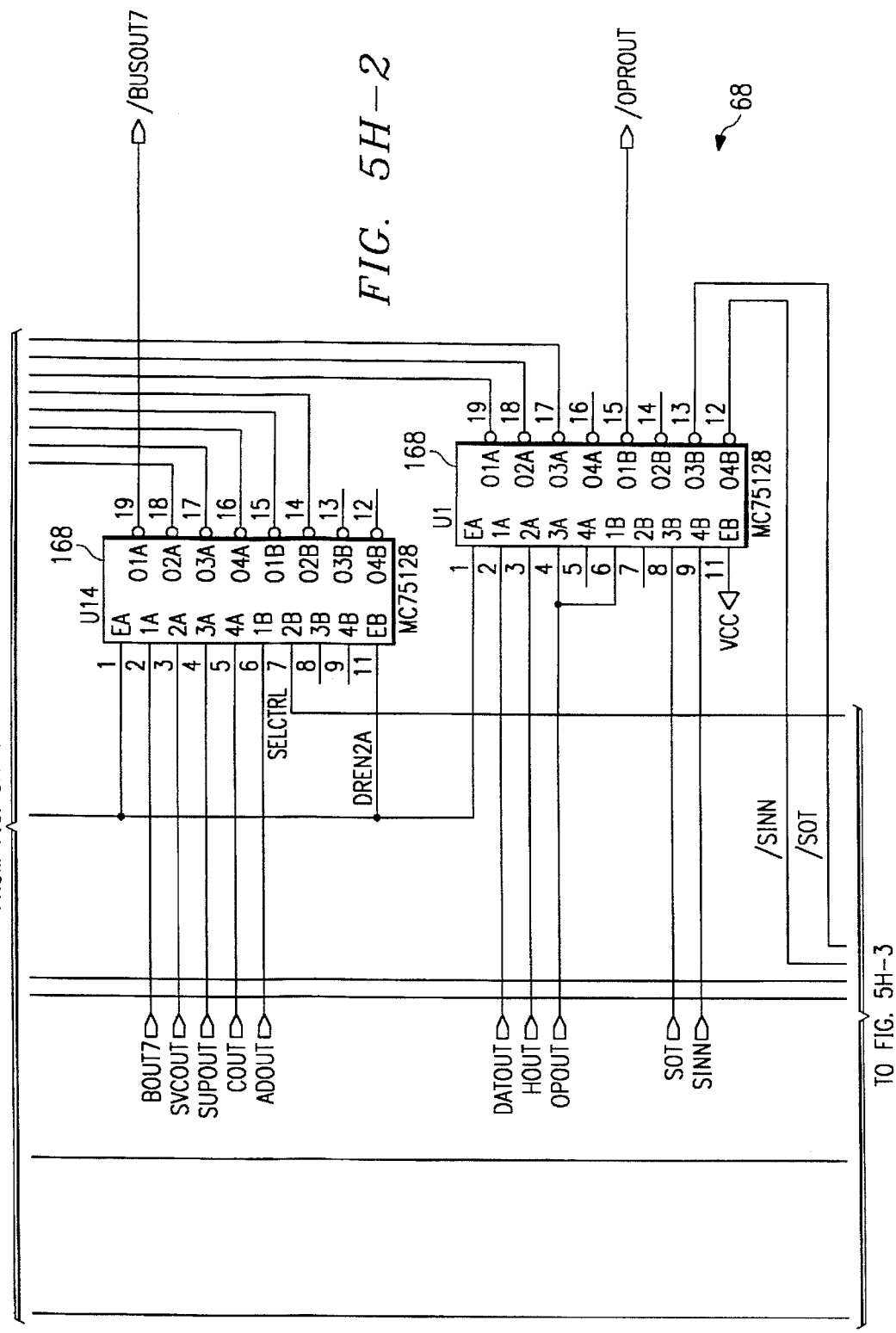

BYTE CLOCKS AND GO TAG

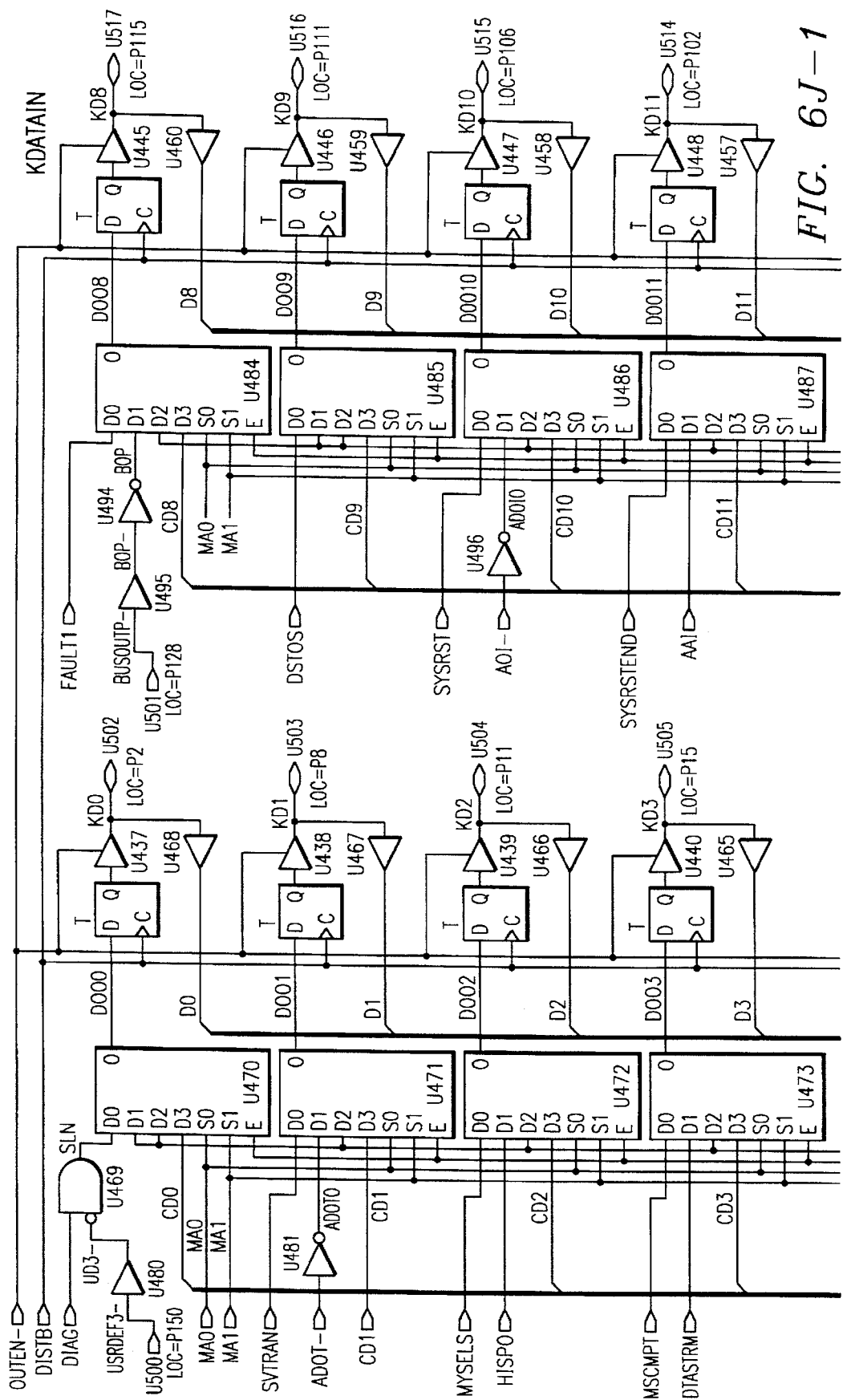

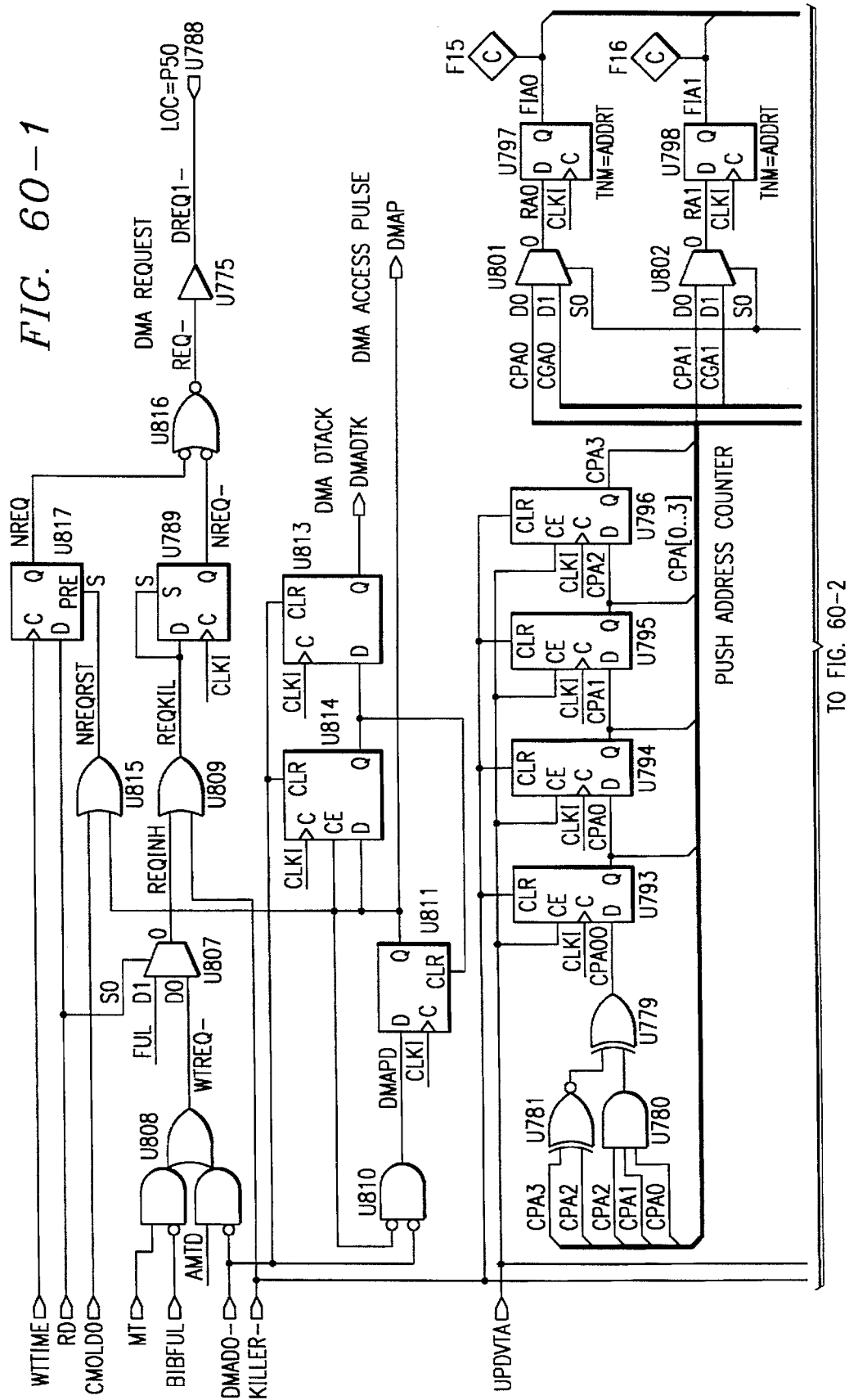

ADAPTER FOR INTERFACING A SCSI BUS WITH AN IBM SYSTEM/360/370 I/O INTERFACE CHANNEL AND INFORMATION SYSTEM INCLUDING SAME

TECHNICAL FIELD OF THE INVENTION

This invention relates in general to the field of electronic systems, and more particularly to an adapter for interfacing a SCSI bus with an IBM System/360/370 I/O interface channel and an information system including such an adapter.

BACKGROUND OF THE INVENTION

Numerous public and private organizations use information systems that include two types of computer systems. The first type of computer system generally comprises IBM® mainframe and compatible systems supporting SYSTEM NETWORK ARCHITECTURE™ ("SNA") sometimes referred to as legacy systems, These legacy systems commonly support communication of information via an IBM System/360/370 I/O interface channel where the information is formatted according to various protocols including SNA. An IBM System/360/370 I/O interface channel can comprise a block-multiplexed or "bus & tag" channel providing approximately 4.5 megabytes per second of data transmission bandwidth or an ESCON fiber-optic channel providing approximately 17.5 megabytes per second of data transmission bandwidth.

The second type of computer system generally comprises computer workstations and personal computers such as UNIX®-based systems, DOS and WINDOWS™ systems, OS/2® systems and MACINTOSH® systems, These systems commonly support communication of information via a communication network where the information is formatted according to a TCP/IP protocol. Local area networks ("LAN's") and wide area networks ("WAN's") are often created by interconnecting these systems to form workgroup environments generally providing bandwidths in the range of 10–16 megabits per second. Computer workstations and personal computers also commonly support communication via a Small Computer Standard Interface ("SCSI") bus to provide standard connectivity for peripheral devices such as internal/external hard drives or tape drives.

It is important for an organization having an information system that includes both of these types of computer systems to be able to access and integrate information housed in legacy systems with information distributed throughout numerous workgroup environments of computer workstations and personal computers. Bidirectional movement of information and greater bandwidth are important considerations in providing this interconnectivity. It is desirable for information to travel in both directions between a legacy system and a computer workstation or personal computer and to do so at as large a bandwidth as possible. Currently, the bandwidth for such communication of information is limited by the bandwidth of the communication network to which the computer workstation or personal computer is connected.

SUMMARY OF THE INVENTION

In accordance with the present invention, disadvantages and problems associated with prior systems and methods for interfacing a computer system supporting communication via an IBM System/360/370 I/O interface channel with computer systems in multi-vendor local area networks have been substantially reduced or eliminated.

According to one embodiment of the present invention, an information system including a plurality of computer systems is provided. The information system includes a first computer system having an IBM System/360/370 I/O interface channel. The first computer system is operable to communicate SNA or channel protocol information via the IBM System/360/370 I/O interface channel. The information system includes a second computer system having a SCSI bus. The second computer system is operable to communicate SCSI protocol information via the SCSI bus. An adapter is coupled to the IBM System/360/370 I/O interface channel of the first computer system and the SCSI bus of the second computer system. The adapter is operable to interface the SCSI bus with the IBM System/360/370 I/O interface channel to allow bidirectional communication between the first computer system and the second computer system.

According to another embodiment of the present invention, an adapter for interfacing a SCSI bus with an IBM System/360/370 I/O interface channel is provided. The adapter includes a channel interface unit operable to couple to an IBM System/360/370 I/O interface channel. The channel interface unit is further operable to communicate SNA and IBM channel protocol information via the IBM System/360/370 I/O interface channel. The adapter also includes a SCSI interface unit operable to couple to a SCSI bus. The SCSI interface unit is further operable to communicate SCSI protocol information via the SCSI bus. A processor is coupled to the channel interface unit and to the SCSI interface unit. The processor is operable to control the channel interface unit and the SCSI interface unit to allow bidirectional communication between the SCSI bus and the IBM System/360/370 I/O interface channel.

Technical advantages of the present invention include providing an adapter for interfacing a SCSI bus with an IBM System/360/370 I/O interface channel to allow bidirectional communication taking advantage of the bandwidth of the IBM System/360/370 I/O interface channel. Because of the wide availability of SCSI device ports on computer workstations and personal computers, an adapter constructed according to the teachings of the present invention benefits numerous information systems currently used by organizations that include both SNA and TCP/IP environments.

BRIEF DESCRIPTION OF THE DRAWINGS

A more complete understanding of the present invention and advantages thereof may be acquired by reference to the following description taken in conjunction with the accompanying drawings in which like reference numbers indicate like features and wherein:

FIG. 3 is a block diagram of one embodiment of the adapter for interfacing a SCSI bus with an IBM System/360/370 I/O interface channel of FIG. 2;

FIGS. 4A and 4B are block diagrams of one embodiment of software and firmware operating in the SCSI host and the adapter for interfacing a SCSI bus with an IBM System/360/370 I/O interface channel of FIGS. 2 and 3;

FIGS. 5A, 5B-1, 5B-2, 5B-3, 5B-4 and 5C-1, 5C-2, 5D, 5E-1, 5E-2, 5F-1, 5F-2, 5G, 5H-1, 5H-2, 5H-3, 5I, 5J-1, 5J-2, 5J-3 and 5K are schematics showing one embodiment of the components and interconnections for the adapter for interfacing a SCSI bus with an IBM System/360/370 I/O interface channel of FIGS. 2 through 4; and FIGS. 6A-1, 6A-2, 6B, 6C-1, 6C-2, 6D-1, 6D-2, 6E-1, 6E-2, 6F-1, 6F-2, 6G-1, 6G-2, 6H, 6I-1, 6I-2, 6J-1, 6J-2, 6K-1, 6K-2, 6L-1, 6L-2, 6M-1, 6M-2, 6M-3, 6M-4, 6N-1, 6N-2, and 6O-1, 6O-2 are schematics showing one embodiment of the logic components and interconnections for a channel controller of the adapter for interfacing a SCSI bus with an IBM System/360/370 I/O interface channel of FIGS. 2 through 4.

DETAILED DESCRIPTION OF THE INVENTION

Information System having SNA and TCP/IP environments

Figure 1:
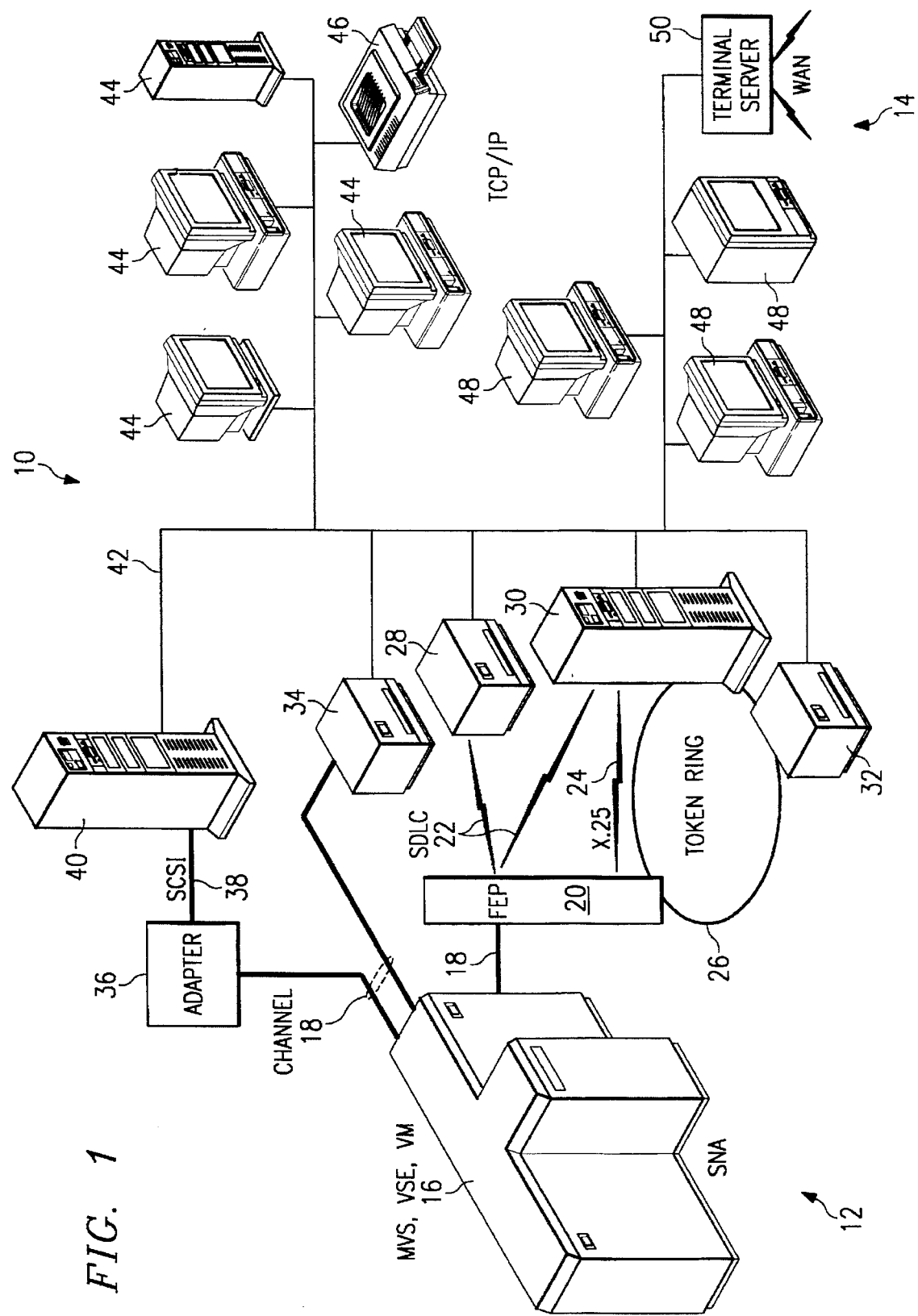
FIG. 1 illustrates one embodiment of an information system including an adapter for interfacing a SCSI bus with an IBM System/360/370 I/O interface channel constructed according to the teachings of the present invention.

FIG. 1 illustrates one embodiment of an information system, indicated generally at 10. Information system includes a SYSTEM NETWORK ARCHITECTURE™ ("SNA") environment, indicated generally at 12, and a TCP/IP environment, indicated generally at 14. SNA environment 12 includes a mainframe 16. In the embodiment of FIG. 1, mainframe 16 comprises an IBM® mainframe using an MVS, VSE or VM operating system. SNA environment 12 can include additional compatible computer systems supporting SNA and an IBM System/360/370 I/O interface channel. Mainframe 16 has a number of IBM System/360/370 I/O interface channels 18 accessible through IBM System/360/370 I/O interface channel ports in mainframe 18.

A front-end processor 20 is coupled to a channel 18, as shown. Front-end processor 20 is coupled to a number of terminal networks including an SDLC network 22, an X.25 network 24 and a Token Ring network 26. Front-end processor 20 can be coupled to other types terminal networks as well. A first hardware gateway device 28 is coupled to SDLC network 22. A computer system 30 operating as a gateway device and a second hardware gateway device 32 are coupled to Token Ring network 26. A third hardware gateway device 34 is coupled to a second channel 18 of mainframe 16, as shown. In the embodiment of FIG. 1, first gateway device 28, second gateway device 32 and third gateway device 34 comprise OC SERVER I standalone hardware gateways available from OPENCONNECT® SYSTEMS located in Dallas, Tex. In the embodiment of FIG. 1, workstation 30 comprises a UNIX®-based workstation running OC SERVER II software gateway available from OPENCONNECT® SYSTEMS located in Dallas, Tex.

An adapter 36 is coupled to a third channel 18 of mainframe 16. Adapter 36 is also coupled to a Small Computer Standard Interface ("SCSI") bus 38 of computer system 40. SCSI bus 38 is accessible through a SCSI device port of computer system 40. Adapter 36 operates to interface SCSI bus 38 with channel 18 according to the teachings of the present invention.

TCP/IP environment 14 includes a TCP/IP network 42. TCP/IP network 42 is coupled to communication units of first gateway device 28, computer system 30, second gateway device 32, third gateway device 34 and computer system 40. TCP/IP environment 14 includes a first workgroup environment having computer systems 44 and printer 46, each of which has a communication unit coupled to TCP/IP network 42. TCP/IP environment 14 includes a second workgroup environment having computer systems 48 and terminal server 50 supplying a wide area network ("WAN"), each of which has a communication unit coupled to TCP/IP network 42. In the embodiment of FIG. 1, computer systems 44 and computer systems 48 may comprise, for example, multi-vendor computer workstations and personal computers.

In operation, mainframe 16 can communicate with computer systems 44, printer 46, computer systems 48 and terminal server 50 through first gateway device 28, computer system 30, second gateway device 32, and third gateway device 34. However, the bandwidth of this communication is limited by the bandwidth of SDLC network 22, X.25 network 24 Token Ring network 26 and TCP/IP network 42.

Mainframe 16 also can communicate with computer system 40 through adapter 36. Computer system 40 can communicate with computer systems 44, printer 46, computer systems 48 and terminal server 50 through TCP/IP network 42. Adapter 36 is constructed according to the teachings of the present invention and is operable to interface SCSI bus 38 with IBM System/360/370 I/O interface channel 18 enabling high bandwidth bidirectional communication between computer system 40 and mainframe 16.

Adapter interfacing SCSI bus with IBM System/360/370 I/O interface channel

Figures 2, 5B:
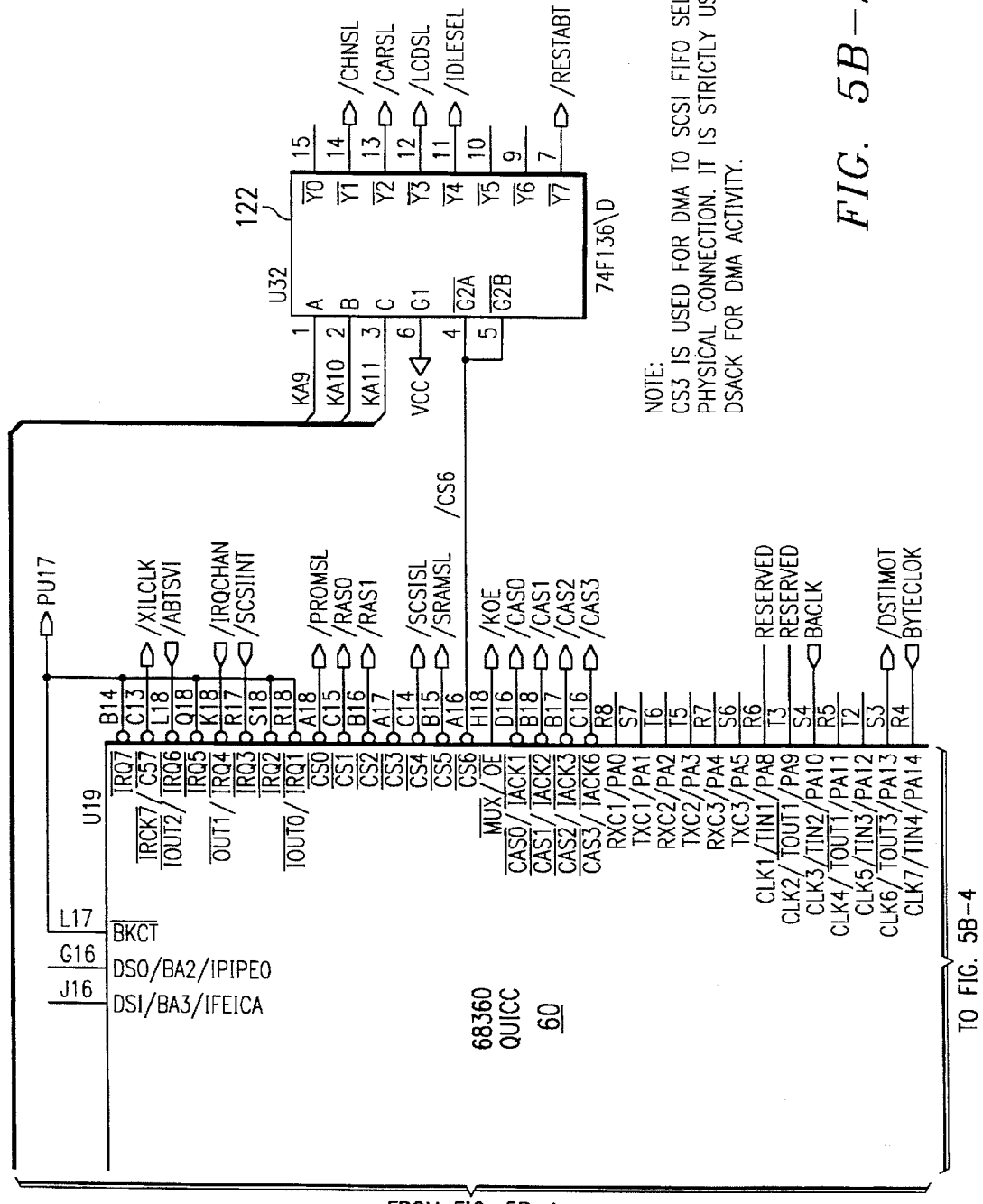

FIG. 2 is a block diagram of one embodiment of an IBM® mainframe 16 connected to a SCSI host 40 via an adapter 36 for interfacing SCSI bus 38 with IBM System/360/370 I/O interface channel 18 constructed according to the teachings of the present invention.

In the embodiment of FIG. 2, SCSI host 40 comprises a UNIX®-based computer workstation. Mainframe 16 has an IBM System/360/370 I/O interface channel port 51 through which IBM System/360/370 I/O interface channel 18 is accessible. Adapter 36 has an IBM System/360/370 I/O interface channel connector 52 coupled to IBM System/360/370 I/O interface channel port 51. Adapter 36 also has a SCSI bus connector 53. SCSI host 40 has a SCSI device port 54 through which SCSI bus 38 is accessible and which is coupled to SCSI bus connector 53. SCSI host 40 has a communication port 55 coupled to TCP/IP network 42. SCSI host 40 is operable to run software providing an SNA-TCP/IP protocol translator 57 and a fast file transfer unit 58.

Mainframe 16 is operable to communicate SNA and IBM System/360/370 I/O interface channel protocol information via IBM System/360/370 I/O interface channel 18, and SCSI host 40 is operable to communicate SCSI protocol information via SCSI bus 38. According to the teachings of the present invention, adapter 36 is operable to interface SCSI bus 38 with IBM System/360/370 I/O interface channel 18. Adapter 36 communicates information via IBM System/360/370 I/O interface channel 18 and SCSI bus 38 such that adapter 36 appears as a peripheral device to SCSI host 40 and as a system supporting SNA and IBM System/360/370 I/O interface channel protocols to mainframe 16. In this manner, adapter 36 enables bidirectional high bandwidth communication between mainframe 16 and SCSI host 40.

A user of SCSI host 40 can access information housed in mainframe 16 and can provide information to mainframe 16 using the full bandwidth capability of IBM System/360/370 I/O interface channel 18. SNA-TCP/IP protocol translator 57 allows SCSI host 40 to interpret and transmit information according to TCP/IP protocol or SNA protocol. In the embodiment of FIG. 2, TCP/IP protocol translator 57 comprises one version of OC SERVER II software gateway available from OPENCONNECT® SYSTEMS located in Dallas, Tex. Fast file transfer unit 58 allows SCSI host 40 to move bulk files at optimum speed using IBM System/360/370 I/O interface channel protocols. In the embodiment of FIG. 2, fast file transfer unit 58 comprises one version of OC/GTO software available from OPENCONNECT® SYSTEMS located in Dallas, Tex.

Figures 3, 5B:
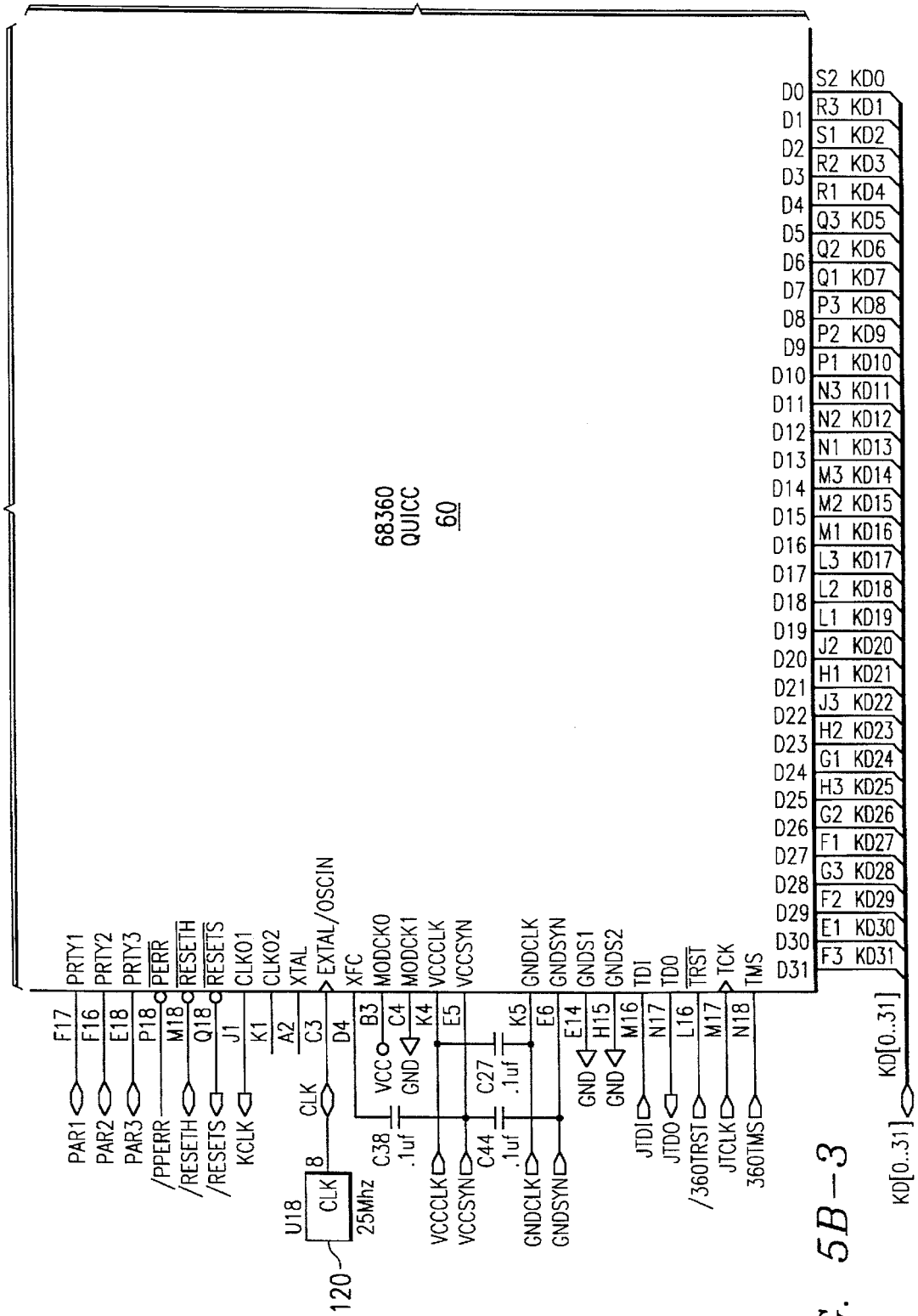

In the embodiment of FIG. 3, adapter 36 comprises a combination hardware and software device contained in a separate housing and operating to interface SCSI bus 38 of SCSI host 40 to mainframe 16 via IBM System/360/370 I/O interface channel 18. Adapter 36 provides IBM System/360/370 I/O interface channel attachment for protocol translator 57 and file transfer unit 58 using a general solution rather than platform-specific hardware and software. Adapter 36 comprises a microcomputer system having electronics and micrologic components for directly connecting and interfacing SCSI bus 38 with IBM System/360/370 I/O interface channel 18. Adapter 36 can be housed in a small enclosure with connectors for attaching to SCSI bus 38, IBM System/360/370 I/O interface channel 18, and to an external power supply. In another embodiment of the present invention, adapter 36 can provide IBM System/360/370 I/O interface channel attachment for a computer system 40 utilizing IBM System/360/370 I/O interface channel ESCON attachment.

Adapter 36 includes software that works with hardware components to implement low level SNA and IBM System/360/370 I/O interface channel protocols, one or more logical channel devices, such as 3274, SCSI devices to interface with SCSI device drivers on SCSI host 40, administrative functions and glue functions. Adapter 36 also includes firmware that provides a bootstrap loader for downloading operating software from SCSI host 40 across SCSI bus 38. Adapter 36 firmware also provides a driver for a front panel user interface and a configuration program to allow user entry of a SCSI ID, which must be set before SCSI host 40 can contact adapter 36. Additionally, adapter 36 firmware provides power-on self test, diagnostics, and a development/debugging functions.

SCSI host 40 uses system device drivers and hardware at lowest layers to attach to adapter 36. In the embodiment of FIG. 2, SCSI host 40 comprises a UNIX® platform, and protocol translator 57 comprises OC SERVER II. In this configuration, datalink software is used to interface to adapter 36. This software includes an OC SERVER II resident task to implement an application program interface ("API") for adapter 36 and to multiplex program units ("PU's"). Where SCSI host 40 comprises a large computer system, an external UNIX® process may also be used to multiplex OC SERVER II processes. In the embodiment of FIG. 2, fast file transfer unit 58 comprises OC/GTO software. In this environment, changes to a MAMTCP unit in the OC/GTO software are made in order to implement the API for adapter 36.

As a UNIX® platform, SCSI host 40 includes a daemon process that provides error logging capability for adapter 36 either to a file or to an SNMP monitor. This process also provides a path to adapter 36 for administrative utilities residing on SCSI host 40 to allow loading and starting of operating software located in adapter 36, and to provide configuration, dump and trace administration.

Adapter 36 operates to provide numerous functional advantages. Normal DC-interlocked and high-speed transfer features of IBM System/360/370 I/O interface channel 18 can be supported. Data streaming features of IBM System/360/370 I/O interface channel 18 can also be supported as well as burst data rates equal to the 4.5 megabytes per second bandwidth of data streaming on IBM System/360/370 I/O interface channel 18. Adapter 36 operates such that arbitrary limits to the number of concurrent sessions are not imposed. Available software products including OC SERVER II and OC/GTO can operate in conjunction with adapter 36 with insignificant loss of function. Adapter 36 is also flexible to allow adaptation to implement additional channel protocols over those currently implemented.

Block diagram of adapter components

FIG. 3 is a block diagram of one embodiment of adapter 36 for interfacing SCSI bus 38 with IBM System/360/370 I/O interface channel 18 of FIG. 2. Adapter 36 includes a processor 60 that provides 32-bit CPU, direct memory access ("DMA"), timers, DRAM controller, interrupt controller, parallel ports and serial ports. In the embodiment of FIG. 3, processor 60 comprises an MC68360 microprocessor. Processor 60 is coupled to a SCSI controller 62 and to a channel controller 64 via a bus 61 and respective DMA connections 63. SCSI controller 62 provides an 8-bit CPU bus and a 16-bit DMA bus, and channel controller 64 provides a 32-bit bus. In the embodiment of FIG. 3, SCSI controller 62 comprises an NCR 53CF96-2 SCSI controller, and channel controller 64 comprises an XC4006-6 programmable logic component obtained from XILINX®.

SCSI controller 62 is coupled to a SCSI connector 65 which is operable to connect to SCSI bus 38. Channel controller 64 is coupled to a bus interface 66 and to a tag interface 68. Bus interface 66 and tag interface 68 are coupled to channel connector 69 which is operable to connect to IBM System/360/370 I/O interface channel 18. In the embodiment of FIG. 3, IBM System/360/370 I/O interface channel 18 comprises a block-multiplexed or "bus & tag" channel providing approximately 4.5 megabytes per second of bandwidth. Other embodiments of FIG. 3, System 360/370 I/O interface channel comprise "ESCON" channel providing approximately 17.5 megabytes per second of bandwidth. A dynamic RAM 70, a static RAM 72, a programmable ROM 74, and a front panel 76 are coupled to processor bus 61.

The operation of adapter 36 is controlled by processor 60, SCSI controller 62, and channel controller 64. SCSI controller 62 interfaces with SCSI bus 38 and channel controller 64 interfaces with IBM System/360/370 I/O interface channel 18. Processor 60 links SCSI controller 62 with channel controller 64 to enable direct communication between SCSI bus 38 and IBM System/360/370 I/O interface channel 18. In the embodiment of FIG. 3, the components of adapter 36 can be mounted on and housed in a main circuit board, a connector board, a front panel assembly, an enclosure base with a rear panel, and an enclosure cover. An external power supply, SCSI bus cables, bus/tag converter cables, and terminators can be provided separately.

In the embodiment of FIG. 3, processor 60 of adapter 36 comprises a MOTOROLA® MC68360 and provides a central processing unit ("CPU") and on-board peripherals. An MC68360 implements a 25 MHz CPU32 as its core processor, which is a 32-bit CPU from the 68000 family. As such, processor 60 is fully implemented as a 32-bit machine, and on-board peripherals include DRAM controller, timers, two independent DMA controllers, an interrupt controller, serial ports, baud rate generators, and parallel ports. A serial port resident in processor 60 can be utilized to support a firmware-based debugger program. The serial port can be terminated on a main circuit board of adapter 36 with no provision for a debug port external to the enclosure. An internally accessible ABORT switch can also be provided.

In the embodiment of FIG. 3, SCSI controller 62 of adapter 36 comprises an NCR 53CF96-2. As such, SCSI controller 62 provides an interface to SCSI bus 38 including line drivers/receivers, and handles all SCSI bus protocol. In the illustrated embodiment, only single-ended drivers and receivers are implemented.

In the embodiment of FIG. 3, channel controller 64 implements drivers and receivers to interface to IBM System/360/370 I/O interface channel 18. Channel controller 64 comprises a programmable logic component available from XILINX® and is programmed to implement a handler for low level IBM System/360/370 I/O interface channel protocol. A 32-byte FIFO in channel controller 64 along with a dedicated DMA channel and interrupt provide adapter 36 real time response capabilities to service IBM System/360/370 I/O interface channel 18.

In the embodiment of FIG. 3, adapter 36 comprises a number of memory components. Dynamic RAM 70 comprises an 8 megabyte, expandable to 32 megabyte, DRAM (2 M×32-bits). Dynamic RAM 70 is operable to provide general user RAM, buffers, and other such functions. Static RAM 72 comprises a 512 kilobyte SRAM (128 K×32-bits) and is operable to provide program storage, stack space and storage for global variables. Programmable ROM 74 comprises a 128 kilobyte EEPROM (64 K×8-bits) and is operable to provide firmware and non-volatile configuration storage. In addition, there is 1536 bytes of system RAM resident in processor 60.

Front panel 76 provides an operator interface for adapter 36 and can comprise an operator panel including LED's, a multiple character LCD display, and membrane switches or buttons. The LED's can be allocated as indicators for power, halt, online, and operational status, and for CPU, IBM System/360/370 I/O interface channel and SCSI bus activity. The membrane buttons can be allocated for RESET, MENU and SELECT functions. In addition to displaying an operational status of adapter 36, the LCD display can be used in conjunction with MENU and SELECT buttons to implement a menuing system for entering configuration data such as SCSI identification code ("SCSI ID").

In the embodiment of FIG. 3, front panel 76 can comprise a modular LED and membrane switch component with a flexible flat cable connector, a two line by sixteen character LCD display for status and configuration information, a ribbon cable, and brackets for mounting to an enclosure base. The LED/switch component provides buttons for RESET, MENU and SELECT, and provides LED indicators for POWER, PROCESSOR HALT and BUSY, CHANNEL and SCSI I/O ACTIVITY, and ONLINE ENABLE and OPERATIONAL OUT CHANNEL STATUS. The LCD display can operate as an 8-bit peripheral off main CPU bus 61. The LCD display can include two lines having an 80-character buffer for storing ASCII data, of which 16 characters are visible at a time. This display can include cursor and highlighting capabilities as well as high level commands for shifting the display. Front panel 76 also includes a reset button hardwired to a board reset circuit of adapter 36. MENU and SELECT buttons can be handled by a parallel port resident in processor 60 with interrupt generating capability. Front panel 76 further includes LED's that are indicators of hardware signals with the exception of ONLINE and PROCESSOR BUSY indicators. ONLINE can be a software-controlled indicator intended to directly reflect a state of the ONLINE setting, entered by an operator via a menuing system for front panel 76. PROCESSOR BUSY can be automatically set by hardware when processor 60 of adapter 36 awakens from a STOP condition, and can be reset by software immediately before issuing a STOP instruction.

All logic components of adapter 36 can reside on a main circuit board mounted to an enclosure base. A DC power switch and a five-pin circular DIN-connector for DC power can be right-angle components mounted directly to the main circuit board. Post-row connectors for ribbon cables can connect front panel 76. Post-row connectors can also be provided for attaching a debug console and abort switch. The main circuit board can include a 96-pin DIN connector for passing all SCSI and IBM System/360/370 I/O interface channel signals to a connector circuit board.

A connector circuit board can provide mini-D 50-pin connectors 65 for SCSI-In and SCSI-Out for SCSI bus 38, and 100-pin hi-density HIPPI style connectors 69 for Bus/Tag-In and Bus/Tag-Out for IBM System/360/370 I/O interface channel 18. The connector circuit board can mount to a rear panel with connectors protruding through. The connector circuit board can also provide a 96-pin DIN connector for direct attachment to a main circuit board, which supplies electrical signals for SCSI bus 38 and IBM System/360/370 I/O interface channel 18. Such a setup is similar to a VME backplane arrangement utilizing conventional VME parts.

A base of an enclosure for adapter 36 can be a sheet metal component that includes a rear panel for adapter 36. The rear panel can have openings for SCSI-In and SCSI-Out connectors 65, and for Bus/Tag-In and Bus/Tag-Out connectors 69. The rear panel can also have openings for a DC power connector and switch. A circuit board can mount to the rear panel providing connectors 65 for SCSI bus 38 and connectors 69 for IBM System/360/370 I/O interface channel 18. An enclosure cover can be a sheet metal component providing a top and sides for adapter 36, and a bezel for front panel 76.

Adapter 36 can use Bus/Tag-In and Bus/Tag-Out assemblies developed for the Openconnect Systems 3030 hardware gateway 34, to convert from 100-pin high-density HIPI connectors to standard Bus and Tag serpentine connectors. Cables for attachment to SCSI host 40 can be provided for common SCSI connectors such as mini-D 50 to mini-D 50, mini-D 50 to Centronics, and mini-D 50 to DB-50. An external power supply can be utilized to provide DC power to adapter 36. Connection to adapter 36 can be via a 5-pin circular DIN connector accessible from a rear panel adapter 36. The power supply can comprise a wide range model that needs no special configuration for domestic or international installations, and a country-specific power cord can be provided separately.

Block diagram of software and firmware

Figure 4B:
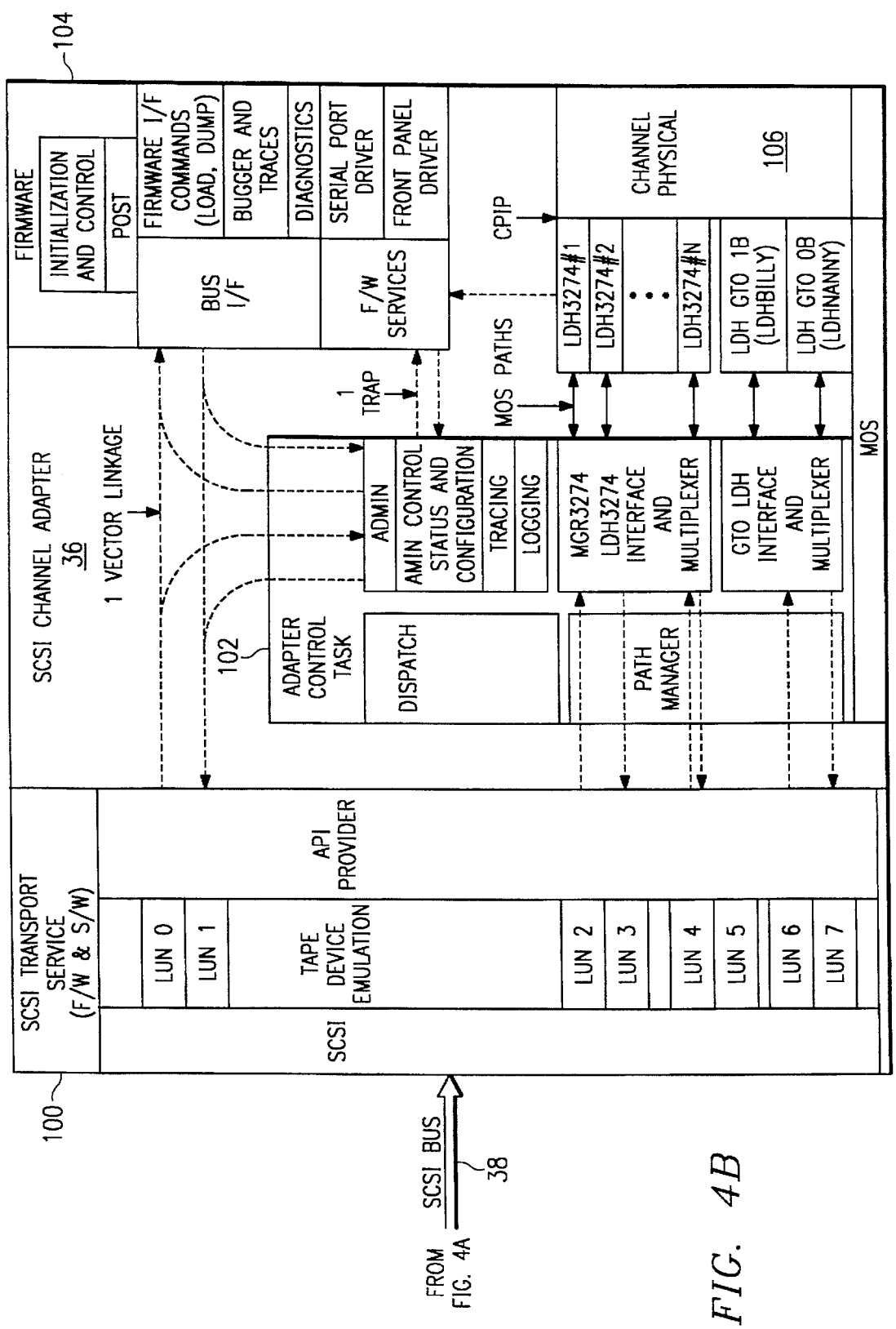

FIGS. 4A and 4B are block diagrams of one embodiment of software and firmware operating in SCSI host 40 and adapter 36 of FIGS. 2 and 3. Adapter 36 comprises SCSI transport service 100 which includes a SCSI interface, an application program interface ("API") provider, eight logical units ("LUN's"), and tape device emulation, as shown. Adapter 36 also comprises adapter control task 102 which includes dispatch, administration, path manager, 3274 manager, and file transfer manager components. Adapter 36 further comprises firmware 104 and channel interface 106. Firmware 104 includes initialization and control, power-on self test, bus interface and firmware services. Channel interface 106 includes channel physical and LDH 3274 and LDH-GTO components. The software and firmware components of adapter 36 are interconnected as shown in FIGS. 4A and 4B.

SCSI host 40 comprises a UNIX® kernel 108 which includes a SCSI interface, tape devices, and a file system interface. SCSI host 40 also comprises an administration daemon 110, a first SNA unit 112, a second SNA unit 114, and a fast file transfer unit 116. In the illustrated embodiment, SNA units 112 and 114 comprise OCSNA processes, and file transfer unit 116 comprises a MAMTCP (GTO) process established by OC SERVER II software available from OPENCONNECT® SYSTEMS located in Dallas, Tex. The software components of SCSI host 40 are interconnected as shown in FIGS. 4A and 4B.

Functional layers—SCSI bus

SCSI bus 38 comprises a functional layer of adapter 36 and SCSI host 40. The ANSI specification for SCSI, and SCSI-II (ANSI X3.131-1990), defines signals, cables, drivers, connectors, terminators and timings on a SCSI bus. Within this specification, adapter 36 can implement single ended drivers and an 8-bit bus. SCSI host 40 and other daisy-chained peripherals should do the same. Single ended drivers limit the cable length between SCSI devices to six meters. In adapter 36, a SCSI bus interface is implemented by SCSI controller 62, and software is involved in setting configuration parameters such as the SCSI ID. The same is true for SCSI host 40.

Functional layers—SCSI logical

A SCSI logical layer exists in both SCSI host 40 and adapter 36. The SCSI logical layer can operate in a SCSI-I mode of operation until SCSI-II has been negotiated from SCSI host 40. A SYNCHRONOUS DATA TRANSFER REQUEST message is used to negotiate up to 10 MHz synchronous transfers to support data streaming on IBM System/360/370 I/O interface channel 18. The SCSI logical layer can be implemented in adapter 36 by a software component, running mainly at interrupt level, that works with SCSI and DMA controllers in adapter 36. Some functionality can be configurable to accommodate different types of SCSI host computer systems. SCSI logical layer functions on SCSI host 40 can be implemented either in hardware or system device drivers. Some of this functional behavior can be configurable.

The ANSI specification for SCSI defines the logical protocols for operating SCSI bus 38, much of which is dependent on configuration. SCSI devices are classified as Initiators and Targets. With respect to adapter 36, SCSI host 40 is the initiator and adapter 36 is the target. Additional targets as well as initiators may also be present on SCSI bus 38.

At the lower logical level, SCSI implements a finite state machine consisting of "bus phases" which are implemented by various combinations and sequences of control signals. BUS FREE, ARBITRATION, SELECTION and RESELECTION phases are associated with establishing or re-establishing a connection between an initiator and a target to perform an information transfer. COMMAND, DATA (IN or OUT), STATUS, and MESSAGE (IN or OUT) are the information transfer phases.

Device level commands are sent from the initiator to the target during COMMAND phase to perform a device operation or to communicate the desire to enter the DATA phase to transfer data. The SCSI specification defines a Command Descriptor Block ("CDB") and device opcodes for common devices and their operations. When a command completes, the target enters the STATUS phase to report command results to the initiator, then enters MESSAGE phase to send a command complete message. SCSI defines the following status codes: GOOD, CHECK CONDITION, CONDITION MET, BUSY, INTERMEDIATE, INTERMEDIATE CONDITION MET, RESERVATION CONFLICT, COMMAND TERMINATED, and QUEUE FULL.

The MESSAGE phase allows the exchange of control messages between the target and initiator to manage path and data flow. Included are the following: COMMAND COMPLETE, SAVE DATA POINTER, RESTORE POINTERS, DISCONNECT, INITIATOR DETECTED ERROR, ABORT, MESSAGE REJECT, NO OPERATION, MESSAGE PARITY ERROR, BUS DEVICE RESET, IDENTIFY, and SYNCHRONOUS DATA TRANSFER REQUEST. SCSI defines other messages supporting "linked commands" and "tagged queuing" that are not significant to the illustrated embodiment of adapter 36.

Each SCSI device can define up to eight Logical Units ("LUN's"). As shown in FIGS. 4A and 4B, adapter 36 firmware defines all eight LUN's for potential use since SCSI host 40 may not support dynamic definition of LUN's. To access a LUN in adapter 36, SCSI host 40 arbitrates for SCSI bus 38, selects adapter 36, then issues an IDENTIFY message that specifies a LUN within adapter 36. Some SCSI-I hosts may skip this message and pass the LUN in the CDB. A device command to initiate a data read or a write can then be sent to the LUN in adapter 36. Unless the LUN is ready to proceed with the data transfer, it should respond with a DISCONNECT message to effectively suspend the current command at SCSI host 40 and get off SCSI bus 38.

If the LUN chose to disconnect, then the LUN arbitrates for SCSI bus 38 and perform RESELECTION when it is ready to proceed with the data transfer. The LUN also sends an IDENTIFY message to SCSI host 40 to identify the reconnecting LUN, so that the appropriate pointers will be loaded. This achieves independent operation of the LUN's in adapter 36 and prevents adapter 36 from locking out other devices on SCSI bus 38. It is also possible that application buffering schemes may require that data transfers be interrupted midstream. For these cases, the LUN disconnects as described above, but first issues a SAVE DATA POINTER message to the initiator. The RESTORE POINTERS message is used at RESELECTION time to instruct the initiator to resume the transfer where it left off.

Functional layers—SCSI tape device

SCSI tape devices comprise another layer in SCSI host 40 and adapter 36. Within the ANSI specification for SCSI, chapters are dedicated to discussion of SCSI commands and status, generic SCSI devices and sequential access devices (in chapters 6, 7 and 9, respectively). Provision is also made for vendor-specific operation. All SCSI tape devices should operate within this broad definition.

Device drivers on SCSI host 40 implement an initiator role for supported tape devices. Depending on system implementation, an unrecognized tape device is typically supported by a general SCSI tape driver. This feature is exploited to provide applications access from SCSI host 40 to adapter 36 using the standard file system and system-provided device drivers in UNIX® environments.

SCSI host 40 can issue an INQUIRY command to obtain device information from adapter 36. Adapter 36 responds for all LUN's that adapter 36 is a SCSI-I sequential access device supporting synchronous data transfer (as mentioned above, SCSI-II operation can be negotiated from SCSI host 40 later using the CHANGE DEFINITION command). In UNIX® systems, this causes adapter 36 to be associated with the general SCSI tape driver.

Where SCSI host 40 does not support such a generic SCSI tape device, adapter 36 should include vendor and product identification of a supported tape device in response to the INQUIRY. This may include specification of the platform of SCSI host 40 through front panel 76 of adapter 36 before download occurs.

Asynchronous overlapped input/output ("I/O") is not a universally available feature of tape devices. Therefore, two SCSI tape devices can be included to implement a full-duplex path to adapter 36. Application data can be transferred to and from adapter 36 using tape WRITE and tape READ commands. Other command handling may be nonproductive, incident to the emulation of a SCSI tape device.

Functional layers—application program interface

An application program interface ("API") exists in SCSI host 40 for adapter 36. Logical communication paths are created between SCSI host 40 and adapter 36 by defining SCSI tape devices on SCSI host 40 system as shown. Each tape device on SCSI host 40 maps to tape emulation code residing in a LUN on adapter 36, and represents a half-duplex communications path. Two tape devices are used for full-duplex communications.

An application resident on SCSI host 40 can communicate with an application resident on adapter 36 (such as channel devices and administrative components) utilizing one or more logical communication paths and a simple message protocol. Administrative components can be accessed through fixed LUN addresses, 0 and 1. Channel devices can be dynamically configured to reside at any of the remaining LUN address pairs.

Standard file system calls can be used by an application on SCSI host 40 to access a corresponding device resident on adapter 36: open, close, read, write, and select if available. A full-duplex logical path can be opened between SCSI host 40 and adapter 36 by issuing "open" calls to an appropriate pair of tape devices. For a path other than the fixed path to administrative components, the "open" calls can be followed by path control commands to establish the identity of the newly created path. Read and write can be used for passing path control commands, as well as application data, encapsulated in message frames for adapter 36.

A message frame for adapter 36 can be used to maintain message boundaries for application data in a consistent way for all applications. Among other reasons, this allows adapter 36 tape emulation code to present a message-oriented interface to devices on IBM System/360/370 I/O interface channel 18. The message frame can be composed of a Message Header, containing the message length, followed by zero to 64 Kilobytes of application data. Application-defined fields for sub-path identification and command can also be included as part of the Message Header. These fields can help provide a consistent mechanism for applications that require multiplexing capability.

Functional layers—LDH 3274

An LDH 3274 channel device interface comprises another layer in adapter 36. Attachment to IBM System/360/370 I/O interface channel 18 can be implemented using a channel device that emulates the IBM® 3274-41A Control Unit. In FIGS. 4A and 4B, this device is referred to as LDH3274 (Logical Device Handler). LDH3274 manages the connection and the flow of SNA protocol information between mainframe 16 and a physical unit ("PU") configured in adapter 36. There is one LDH3274 instance generated for each PU configured in OCSNA 112 and 114. In adapter 36, SCSI bus 38 separates the LDH(s) from the rest of the IBM System/360/370 I/O interface channel gateway provided by OCSNA 112 and 114. The PU can communicate with the LDH(s) using the message protocol for adapter 36 according to the API for adapter 36.

Since LUN's are limited, a multiplexing scheme can be used for path resolution. A pair of LUN's, corresponding to two tape devices, can be allocated as a full-duplex communications path for multiple PU's/LDH's, possibly from OCSNA processes 112 and 114. Messages flowing over SCSI bus 38 between LDH3274 and OCSNA process 112 or OCSNA process 114 in SCSI host 40 carry a Message Header for adapter 36 as described above. Multiplexing can be achieved by utilizing a sub-path identifier field in the Message Header for adapter 36. This identifier can be used by a multiplexer process on either side of SCSI bus 38 to route SNA protocol data and control messages to an appropriate destination. Multiplexer processes comprise intermediate software components between the PU's and the LDH's.

One sub-path identifier can be reserved for passing control messages between multiplexer processes for each pair of LUN's configured for an OCSNA process or an LDH3274. The others can be available to be assigned to identify configured LDH's. A separate sub-path for control can allow for the implementation of an efficient flow control mechanism, since flow information for all PU's/LDH's on a LUN pair can be passed in a single message.

A flat BTU buffer, with extra space for header information, can be used to pass SNA protocol data through various SNA layers in adapter 36. This header space in the BTU buffer can be utilized to receive the Message Header for adapter 36, which can be added and stripped away at both ends of SCSI bus 38 without consequence.

The commands listed below are supported by LDH3274 and the "protocol handler". These commands, when appropriate, may be passed over SCSI bus 38 in the command field of a Message Header, and then converted to "ITEM" commands by an LDH interface component. In addition, the flow control mechanism can create a new class of commands exchanged between multiplexing components on either side of SCSI bus 38 that are not seen by the LDH.

| | |
|---|---|
| PASSBTU | normal message passing |
| REQMS | request maintenance statistics (no reset) |
| REQMSR | request maintenance statistics (with reset) |
| MSRSP | maintenance statistics response |
| HOSTC | host has sent a connect command |
| HOSTDC | host has sent a disconnect command |
| INIZREQ | initialization request from the protocol handler w/ iniz parms |
| STOPREQ | terminate request from the protocol handler |
| DIBERROR | invalid dib request from ph |
| HELLO | are you there? request from the protocol handler |
| HOWDY | texas type response to a hello |
| INIZRSP | response to an initialization request |
| STOPRSP | response to a stop request |
| SNARFED | ldh is unbelievably messed up |
| INT | a wake up item from the ph |
| HOSTCRSP | response to HOSTC |
| MEMREQ | memory allocation request from protocol handler |
| MEMRSP | memory allocation response to protocol handler |
| CLOSEREQ | UNIX terminate request from protocol handler |
| CLOSERSP | UNIX terminate response to protocol handler |
| RLSBUF | release buffer |
| MAKEBUFF | make a channel buffer, attach it to this item, release to channel |
| HOSTDC_RLS | host sent a disconnect commands plus release this buffer |

Functional layers—LDH-GTO

An LDH-GTO channel device interface comprises an additional layer in adapter 36. OC/GTO is a fast file transfer application available from OPENCONNECT® SYSTEMS located in Dallas, Tex. The LDH-GTO comprises a non-SNA protocol communications product that relies on a pair of channel devices to give mainframe applications access to TCP/IP sockets. A sockets protocol can be passed across IBM System/360/370 I/O interface channel 18 between GTO components residing on mainframe 16 and in SCSI host 40. A GTO channel device protocol can be based on Mitek Access Method ("MAM") which is a channel protocol designed for high-speed data transfer. Consequently, the primary application is for fast file transfer. GTO can be supported in adapter 36 by two channel devices, referred to as Logical Device Handlers ("LDH's"), and a component for interfacing an application in SCSI host 40. One LDH handles inbound data traffic and the other handles the outbound data traffic.

Interface protocol to GTO-LDH can be implemented using the command set listed below.

To LDH:

| | |
|---|---|
| FFT_SDAREQ | Set device address |
| FFT_RLSSTAT | Give LDH a status buffer for reporting status |
| FFT_WRITE | Write data to mainframe (inbound dev) |
| FFT_RLSBUF | Give LDH a buffer to read data from mainframe (outbound dev) |
| FFT_CLOSEREQ | Request close on FFT LDH. Respond with FFT_CLOSERSP |
| FFT_MAXBUFSZ_REQ | Tell LDH max buffer size supported |

From LDH:

| | |
|---|---|
| FFT_STAT | Response to FFT_SDAREQ |
| FFT_SDARSP | LDH's status for FFT device |
| FFT_WRITE | Write data to mainframe has completed (inbound dev) |
| FFT_RLSBUF | Read completed, buffer has data from mainframe (outbound dev) |
| FFT_CLOSERSP | Response to FFT_CLOSEREQ |
| FFT_MAXBUFSZ_RSP | Response to FFT_MAXBUFSZREQ |

These commands flow between the GTO-LDH interface component and the LDH-GTO as ITEM commands over a MOS path. Some originate or terminate at the GTO-LDH interface component. Commands that flow information over SCSI bus 38 are passed in the command field of the Message Header for adapter 36 during tape READ's and WRITE's from application MAMTCP on SCSI host 40, and converted to and from "ITEM" commands by the GTO-LDH interface component.

Functional layers—administrative path

An administrative path for adapter 36 comprises a further layer. A separate administrative path supports logging, tracing, and debugging from SCSI host 40. This path can also be utilized for other administrative operations, such as an initial download for adapter 36, core dumps, local trace buffer dumps, and configuration and control commands to adapter 36. A pair of LUN's (corresponding to two tape devices) is allocated as a full-duplex communications path for handling all administrative traffic to and from adapter 36: an Inbound Admin Device (LUN 0) and the Outbound Admin Device (LUN 1).

Separate software and firmware components exist in adapter 36 and on SCSI host 40 for executing various administrative tasks; such that the tasks can be run concurrently, where practical. As an example, logging, tracing, and a debug session might be run concurrently, whereas a core dump would need to run alone. The sub-path identifier field in the Message Header for adapter 36 can be used to address each Admin component.

Functional layers—bus interface services

Several services resident as firmware on adapter 36 are accessible to SCSI host 40 over one sub-path of the administrative path. These services include load, dump, debugger and diagnostic services. The debugger includes commands for viewing local traces. These services are collectively referred to as Firmware Bus Interface services.

SCSI host 40 formats a control block (with appropriate Message Header), and writes it to an Inbound Admin Device. When the command completes or when asynchronous character data from one of the services is available, adapter 36 formats a control block (with appropriate Message Header) that can be read by SCSI host 40 over an Outbound Admin Device.

In general, the Firmware Bus Interface services are only available to SCSI host 40 when adapter 36 is under the control of the firmware. Once adapter 36 is loaded and started, these services are unavailable until adapter 36 receives a STOP command and returns to firmware mode.

A LOAD can be used at power up and reset to download operating software into adapter 36. A separate START command can be used to start adapter 36 to operating software. A DUMP can be used at the discretion of SCSI host 40 to retrieve all or part of adapter 36 memory. Diagnostics should be run at power-up or reset. Adapter 36 includes firmware commands to query for previous fatal error status to determine if dump is required before download and to download/update certain firmware components; in particular, logic for channel controller 64.

Functional layers—control path

A control path for adapter 36 comprises a sub-path of Admin, and is used for sending configuration and control commands and data, and for retrieving status information for adapter 36. Adapter 36 can be stopped, via the control path, in order to reload and/or reconfigure. Firmware Bus Interface services are available after a STOP is received, until adapter 36 has been restarted.

Functional layers—logging and tracing

Adapter 36 event messages flow over the logging sub-path of Admin, from adapter 36 to the Admin Daemon on SCSI host 40. A separate tracing path (sub-path of Admin) can be provided to support a comprehensive tracing capability in adapter 36. Trace configuration and start/stop commands can be sent to adapter 36 from SCSI host 40. Trace vectors can be sent from adapter 36 to SCSI host 40 for decode and display or recording in a trace log file.

Functional layers—channel physical interface protocol

A channel physical interface protocol ("CPIP") comprises the protocol the LDH uses to communicate with channel physical ("CP"). Three control blocks, called channel control areas ("CCA's"), can be passed back and forth between the LDH and CP and contain fields for command, response, and status codes. The control CCA can be used by the LDH to communicate Control Commands to CP and by CP to communicate responses to those commands back to the LDH. The command CCA can be used by the LDH to communicate Interactive Commands to CP and by CP to communicate Interactive Responses back to the LDH. Interactive Commands tell CP to interact with IBM System/360/370 I/O interface channel 18. An asynchronous CCA is used by CP to notify the LDH that an asynchronous event has occurred on IBM System/360/370 I/O interface channel 18.

The LDH passes CCAs to CP by calling a "put" function that processes the CCA within the CP environment while still running as an LDH task. Likewise, CP passes CCAs to the LDH by calling a "receive" function that was passed to CP by the LDH at initialization. The "receive" function may be called within an interrupt service routine as a result of a channel event and then "wake up" the appropriate LDH task to process a CCA. A more complete description of this interface can be found in the OpenConnect Systems, Inc. Mitek IBM Communications Controller Programming Interface (P/N 350-0142-101) document.

User interface—adapter front panel

Administration of adapter 36 can primarily be accomplished using SCSI host 40. However, certain setup items are administered at adapter 36. Also, adapter 36 includes a capability of reporting status locally, without relying on SCSI host 40 or SCSI bus 38 being operational.

Aside from cabling and power, all local administration for adapter 36 can be performed through front panel 76. Administration includes the reset switch, hardware status LED's, and the configurations/status subsystem. The LED's are allocated as indicators for power, halt, on-line, and Operational-Out status, and for CPU, IBM System/360/370 I/O interface channel and SCSI bus activity indicators.

The configuration/status subsystem is implemented with software and firmware components that interact with a user through two buttons on front panel 76 for "menu" and "select" functions, and a 2-line by 16-character LCD display. Internally, each line has an 80-character capacity. Long lines can be displayed as a marquee display; i.e., continuously scrolling the message through the 16-character window. Normally, the LCD display displays operational status and a last event log message for adapter 36. This is a default state which is reentered after a timeout interval of inactivity for front panel 76.

In the illustrated embodiment, pushing the MENU button on front panel 76 activates a menuing system, displaying a top-level menu on the top display line with the first menu item highlighted, and the cursor in the first character position of the top line. The bottom line displays data associated with the currently highlighted menu item, which is typically another menu. If the top-level menu items do not fit within the 16-character window, each subsequent depression of the MENU button would cause the menu line to scroll to the left by one item. This in turn causes that item to be highlighted, and its associated data to be displayed on the bottom line.

If the bottom display line is a second-level menu, its menu items are displayed with the first item on the line highlighted. Pushing the SELECT button moves the cursor to the bottom line with the first item "selected". Subsequent depressions of the SELECT button cause the cursor to move to the next item if selections fit completely within viewing area; otherwise, second-level menu items to rotate left by one item, and for that item to become "selected". A "selected" second-level menu item is activated by depressing the MENU button. This action also causes the cursor to return to the previous menu. Once a selection has been activated, it remains highlighted and in the first position each time that particular second-level menu is displayed, until a new selection has been activated. An escape ("ESC") option on the second-level menu can be offered to allow return to the previous menu without activating a new selection.

Additional menu nesting can be supported. If a second-level menu item represents another menu heading, then activating that item causes the top line to display the entire "branch" of the currently selected menu items in the "tree", from the top level to the current, and the new menu to display on the bottom line. There is no necessity for limiting the level of nesting that can be achieved using this technique. For menus nested beyond two levels, a TOP option can be offered to allow direct return to the top-level menu.

In the illustrated embodiment, two menu programs are defined. The first runs from the firmware before download. The second runs after adapter 36 is downloaded and started. These menu programs can be identical, except that the second program does not allow the SCSI ID or Device to be changed and only allows viewing of the current settings.

User interface—administration from SCSI Host

In general, adapter 36 can be administered from SCSI host 40 with a ".INI"-style configuration file, and commands issued through an Admin Client to Admin Daemon 110. The configuration file provides a UNIX device-to-adapter path mapping, download image path, autoload and autostart flags, and identifies a port for Admin Clients to connect up to Admin Daemon 110. Adapter 36 can be loaded and started automatically by starting up Admin Daemon 110 with no arguments and the autoload and autostart flags set in the configuration file. Command line arguments can allow alternate configuration file specification, or override of individual configuration parameters.

A character mode Admin Client, working with Admin Daemon 110, can provide the user interface to adapter 36. In the illustrated embodiment, the following commands are supported:

| | |
|---|---|
| Dump | dump adapter 36 memory |
| Load | download adapter 36 operating software |
| Start | execute adapter 36 operating software |
| Stop | stop execution of adapter operating software and return to firmware mode |
| Bugger | invoke the firmware resident debugger mapped to stdin and stdout |
| Diagnostics | run selected adapter diagnostics |
| Configure | download adapter 36 configuration |
| Status | retrieve and display adapter status and configuration |
| Trace | execute specified trace on adapter |
| Log | display the event log |

Software components—adapter firmware

Firmware 104 is EEPROM-resident code that provides startup routines and low level procedures for interfacing hardware components.

An initialization and control program controls the flow of firmware 104 providing the main line of program execution from power-up or reset. The initialization and control program is responsible for preliminary initialization, dispatching Power-On Self Tests, hardware initialization, installation of interrupt vectors and other firmware components, and initialization of global variables. The firmware control program also sets up a vector table that provides soft linkage to hardware and software components. This allows the downloaded software to access hardware components and firmware entry points without needing hardcoded addresses.

A power-on self test ("POST") program operates to detect the power-on condition and run self tests to verify that hardware components of adapter 36 are functioning properly.

The debugger, or "bugger" for short, is a firmware component with facilities for examining and modifying memory and CPU registers, single-stepping, breakpoints, assembler, disassembler, and other such functions. There are additional facilities for the examination of local component traces for channel and SCSI interfaces, and for running diagnostics. A default debug console is a dumb ASCII terminal attached to a serial port of adapter 36. The bugger runs at interrupt level, driven by keystrokes from the serial port. A firmware command allows the bugger to switch over from the serial port to SCSI bus 38 for its input and output.

A bus interface services firmware component provides administrative and debug services to SCSI host 40 as mentioned above. These services include load and dump capability, as well as access to the bugger and diagnostics.

The bus interface services are started by the firmware control program after all initialization is complete. SCSI devices LUN 0 and 1 are initialized as read and write paths for the bus interface services. The Admin Control component of adapter 36 operating software can later take over LUN's 0 and 1.

A firmware services component provides services to adapter 36 operating software, or other firmware components, to insulate it from the hardware. Included are drivers for the serial port and front panel 76. The firmware services are accessed via trap instruction and processor registers. A serial port driver allows software components to display messages to the debug console. A front panel driver includes a low level and a high level interface. The low level interface allows software components to directly write messages to either line of the LCD display and to independently read and/or reset stored button states. Additionally, the low level interface can allow installation of service routines for each button. The high level interface implements the menu system described above.

The firmware control program installs a menu program to handle the front panel before operating software is downloaded. This program is primarily concerned with configuration parameters to operate the SCSI interface.

SCSI transport service 100 comprises a firmware component that provides the communications pipe between adapter 36 and SCSI host 40. This component is later replaced by a downloaded software component by the same name. SCSI transport service 100 is composed of the three components, a SCSI interface, tape emulation and SCSI transport API which described in more detail below.

Software components—adapter operating Software

Operating software is downloaded to adapter 36 over SCSI bus 38 for the purpose of implementing channel devices. In the illustrated embodiment, software for implementation of 3274 devices comprises OC SERVER II and OC/GTO software available from OPENCONNECT® SYSTEMS located in Dallas, Tex. This downloaded software utilizes OpenConnect Systems, Inc.'s Mitek Operating System ("MOS") for dispatch and interprocess communication services in a multitasking environment.

SCSI transport service 100 comprises a software component that provides the communications pipe between adapter 36-resident applications and SCSI host 40. This service is originally resident in firmware and is subsequently replaced with a downloaded version. SCSI transport service 100 comprises three components as described below.

The first is a SCSI interface and is also referred to as a SCSI protocol handler. The SCSI interface works with SCSI and DMA controllers in hardware to implement the SCSI logical functionality described above. The SCSI interface provides services to the tape emulation component through a defined interface. The SCSI interface comprises interrupt routines to provide real-time response to SCSI bus 38, and SCSI primitive functions for the tape emulation layer. The SCSI interface can operate as either a SCSI-I or SCSI-II target.

A tape emulation component, which is also referred to as the SCSI device handler, emulates eight independent tape devices (LUN 0–7) as described above. Each tape device defines itself to SCSI host 40 as an ANSI standard half-inch nine-track SCSI tape controller. Each device constitutes an independent logical unit with separate state logic and work area to achieve and handle low-level logical functions.

The third component is a SCSI transport API and provides asynchronous, message-oriented Read/Write services to adapter 36-resident applications. The SCSI transport API component relies on the tape emulation layer to filter out all SCSI activity other than Reads, Writes and Resets. Application-provided routines are dispatched for notification of certain events, such as input/output ("I/O") completion and reset.

Adapter control task 102 comprises a MOS task responsible for interfacing the channel devices and administrative services to SCSI host 40, and for any multiplexing that may be required to implement the interface. Each device type (LDH 3274, LDH GTO) has an interface/manager component residing in adapter control task 102, with MOS path generated to each potential device. The manager components utilize SCSI transport service 100, according to its API, to read and write SCSI bus 38, and convert interrupt events to MOS queue events.

Adapter control task 102 is also home to Admin control and all the administrative functions in adapter 36 that are not provided by firmware. Admin control also uses the SCSI transport service 100 for accessing SCSI bus 38. Additionally, a path management service resides in adapter control task 102 to listen for incoming PATH OPEN commands so that an appropriate LDH Manager can be assigned to a given path. The main line of execution in adapter control task 102 is a dispatch function that responds to MOS queue events to dispatch the appropriate adapter 36 application (such as LDH Manager or Admin).

A MGR3274 component implements the multiplexing protocol described above with respect to LDH 3274 channel device interface. MOS paths are generated to each generated LDH3274 task for routing ITEM's between the multiplexer and each LDH. Routing is based on adapter 36 logical path and the sub-path ID field and command code in adapter 36 Message Header. The routing data is created and managed by MGR3274 in response to path assignments from the path manager, and from LDH OPEN and CLOSE commands from SCSI host 40 applications received over these paths.

MGR3274 can be assigned up to three full-duplex paths (LUN's 2–7), for communicating with SNA processes on SCSI host 40. A buffer pool is allocated for each inbound path to receive transmissions for all LDH's associated with the path. A flow control protocol is executed over each path to achieve logical independence of buffer resources among LDH's. This protocol is also executed over each outbound path to allow the multiplex process running on SCSI host 40 to control its buffer usage.

A GTO-LDH interface provides the LDH interface component described above with respect to the GTO-LDH channel device interface. The GTO-LDH interface is assigned a full-duplex logical path from the Path Manager in response to a PATH OPEN command from MAMTCP running on SCSI host 40. This path is used for communicating status and data across SCSI bus 38; one for the inbound LDH and one for the outbound LDH. A buffer pool is used for receiving inbound transmissions.

Upon initial entry, Admin Control takes over control of LUN's 0 and 1 from the firmware ("F/W") bus interface. The F/W bus interface then becomes one of several end points for routing messages that flow over adapter 36 administrative path. Configuration and status messages can be handled directly by Admin Control.

Adapter control task 102 includes a logging manager and a trace manager as referenced above. The logging manager writes important system events to front panel 76 and to the logging daemon on SCSI host 40.

LDH3274 is a channel device that emulates the IBM 3274-41A Control Unit. Implemented as a MOS task, each generated LDH3274 manages the connection and flow of SNA data between mainframe 16 and one PU configured in SCSI host 40. The services of channel physical are used to access the Input/Output ("I/O") sub-channel addresses of mainframe 16. MGR3274 in adapter 36 adapter control task 102 is used to present the anticipated interface.

LDH-GTO uses separate sub-channel addresses for inbound and outbound data transfers which are handled by the inbound LDH (ldhbilly) and the outbound LDH (ldhnanny). LDH-GTO devices implement a channel protocol, based on OpenConnect Systems, Inc. Mitek Access Method ("MAM"), for achieving high-speed data transfers. The services of channel physical are used to access the Input/Output ("I/O") sub-channel addresses of mainframe 16. The LDH-GTO interface component in adapter 36 adapter control task 102 presents the anticipated interface.
Channel interface Channel interface 106 includes a Channel Physical which comprises a manager of the IBM System/360/370 I/O interface channel input/output ("I/O") communications for adapter 36. Channel Physical acts as the intermediary between each LDH (e.g., LDH3274 and LDHGTO) and IBM System/360/370 I/O interface channel 18. Channel Physical manages input from the LDH's, schedules work on the channel, and transfers requests and data between the LDH's and IBM System/360/370 I/O interface channel 18.

Communications between IBM System/360/370 I/O interface channel 18 and Channel Physical occurs at adapter 36 channel hardware interface via interrupts and registers. When a channel event occurs, an interrupt invokes a Channel Physical interrupt service routine which in turn reads channel hardware status registers to determine the event and appropriate action. Channel Physical initiates activity on the channel by writing to the appropriate channel hardware registers. The Channel Physical interface to IBM System/360/370 I/O interface channel 18 complies with the specifications in "IBM® System/360 and System/370 I/O interface channel to Control Unit Original Equipment Manufacturers' Information", GA22-6974-08, File No. S360/S370-19. Communications between Channel Physical and the LDH's are achieved through the use of channel physical interface protocol ("CPIP") as mentioned above.
Software components—SCSI host Software SCSI tape drivers on SCSI host 40 provide access to SCSI bus 38 for applications using adapter 36 as described above. These drivers are supplied by the operating system with platform-dependent installation requirements. The adapter API library is used by UNIX® applications to interface to adapter 36. This library includes calls for creation and deletion of a full-duplex path to adapter 36, as well as calls for passing data to and from adapter 36.

Since UNIX systems, in general, do not support the SELECT function for tape devices and do not honor non-blocking requests, the adapter API library can need to fork separate processes for the read and the write path and utilize shared memory for passing data. Since pipes support SELECT, they may be utilized for control. Pipes may also be considered for passing data, since the implementation can be much simpler than a shared memory implementation.

The SCACPI in first OCSNA process 112 and in second OCSNA process 114 is the data link component and is responsible for interfacing adapter 36 and multiplexing PU's over a full-duplex path to adapter 36. The SCACPI implements multiplexing protocol and is the counterpart to MGR3274 in adapter 36. For SCSI host 40 systems with three or fewer concurrent OCSNA processes, SCACPI can utilize the adapter API library for access to adapter 36. For large systems, SCACPI can be configured to go through an OCSNA MUX process. SCACPI coexists with other data link components in the data link task by utilizing a new multiplexing layer that interfaces the NUC. SCACPI may be implemented as a single data link task.

The OCSNA MUX process is a separate UNIX® process responsible for multiplexing LDH3274 traffic from multiple OCSNA processes over a pair of SCSI tape devices. The OCSNAMUX process is used for systems running more than three concurrent OCSNA processes through adapter 36 (or GTO and more than two concurrent OCSNA processes). An API utilizing shared memory and PIC is defined to interface the OCSNA processes 112 and 114. The multiplexing protocol described above with respect to the LDH 3274 channel device interface is used to access MGR3274 in adapter 36.

MAMTCP is a SCSI host 40 workstation application that provides "sockets" access to mainframe applications.

Communication is achieved using reads and writes over the full-duplex path provided by the adapter API library. Adapter 36 Message Header is utilized to multiplex input/output and control functions with data using only the read and write functions.

The Admin Daemon 110 is a UNIX® process that provides the path for all adapter 36 administration from SCSI host 40 using the adapter API. Several administrative functions can be provided directly by Admin Daemon 110, including load, start and event logging. Admin Daemon 110 parses command line arguments and a configuration file for its base input. In addition, Admin Client sessions are supported over socket connections for initiating additional administrative operations. Admin Daemon 110 also provides a SNMP agent component to support certain administrative functions from a SNMP manager.

Admin clients connect to Admin Daemon 110 over socket connections for manual or interactive adapter 36 administration. Admin Daemon 110 provides an ASCII test command set. This allows a generic Admin client to be developed that supports all Admin operations by simply mapping STDIN and STDOUT to Admin Daemon 110 connection. In addition, this client could provide a GUI interface to modify the configuration file. Shell scripts invoking the generic Admin Client can be developed to provide individual Admin utility functions such as "load" and "dump".
Buffers and Data Flow With respect to outbound SNA data flow, on adapter 36, each LDH3274 allocates a pool of buffers for receiving outbound data from IBM System/360/370 I/O interface channel 18. As outbound data is received into these buffers, they are sent to MGR3274 to be sent across SCSI bus 38. They are held up in MGR3274 until a READ has been received from the outbound tape device, and the flow control mechanism indicates that the corresponding PU can receive the data. At this time, the data can be sent across SCSI bus 38 and the buffer is subsequently released to the LDH. If the LDH runs out of buffers, the channel enters a "slowdown" mode.

On SCSI host 40 system, SCACPI in OCSNA process 112 or 114 allocates a single pool of buffers to receive transmissions from adapter 36 outbound to all PU's in OCSNA process 112 or 114. SCACPI tries continuously to read the outbound tape device, utilizing the "select" function to avoid blocking. As outbound data is received, the buffers are routed to the appropriate PU, and eventually released back to SCACPI. A flow control mechanism between SCACPI in OCSNA process 112 or 114 and MGR3274 on adapter 36 prevents any single PU from using more than its share of buffers.

With respect to inbound SNA data, on SCSI host 40, SCACPI within OCSNA process 112 or 114 receives buffers of inbound data from PU's. The source application and owner of the buffer can be irrelevant. If the inbound path can be written without blocking, and the flow control mechanism indicates that the corresponding LDH can receive the data, then the write operation proceeds causing data to be transmitted over SCSI bus 38. The buffer is then released back to its owner. Each source application is responsible for handling the case of inbound buffer depletion.

On adapter 36, MGR3274 allocates a single pool of buffers for all the LDH's associated with a given OCSNA process 112 or 114. As long as buffers are available, MGR3274 attempts to read the inbound path for that OCSNA process 112 or 114. As inbound data is received, the buffers are routed to the appropriate LDH for transmission over IBM System/360/370 I/O interface channel 18, and eventually released back to MGR3274.

The same flow control mechanism used for outbound transmissions is used for inbound transmissions, preventing any single LDH from using more than its share of buffers. For both directions of flow, adapter 36 Message Protocol allows transmissions to be blocked-up over SCSI bus 38 for improved performance.

With respect to file transfer data, on adapter 36, the GTO-LDH interface component in adapter control task 102 allocates all the buffers. GTO-LDH interface keeps some for inbound transmissions and passes some for outbound transmissions. On SCSI host 40, MAMTCP allocates a buffer pool to be used for both channel and TCP/IP.

Outbound data is received by ldhnanny who passes the buffer to GTO-LDH interface. Outbound buffers are held up here until a READ has been received from the outbound tape device. At this time, the data can be sent across SCSI bus 38 and the buffer subsequently released to the LDH. If the LDH runs out of buffers, the channel enters a "slowdown" mode. As long as buffers are available, MAMTCP on SCSI host 40 attempts to continuously read the outbound path, utilizing the "select" function to avoid blocking.

MAMTCP writes inbound data to the inbound path when the "select" function indicates that blocking can not occur, causing data to be transmitted over SCSI bus 38. As long as buffers are available, GTO-LDH interface attempts to read the inbound path. As inbound data is received, the buffers are passed for transmission over the channel, and eventually released back to GTO-LDH interface.

A single SCSI host 40 may require more than one adapter 36 to address performance issues, fault tolerance, or to connect to multiple mainframes. This can be accomplished by setting up SCSI host 40 with additional tape devices at a different target address. This is platform dependent. SCSI host 40 applications are started with the appropriate device names to direct them to the correct target adapter and LUN's. The only special requirements for handling more than one adapter 36 are associated with Admin Daemon 110 and its configuration file. An Admin Daemon 110 should be started for each attached adapter 36 with a command line parameter specifying its unique configuration file. Each configuration file should specify the device mapping for adapter 36, and provide a unique port address for client connections to Admin Daemon 110.

Schematics for adapter

Figures 4, 5B:
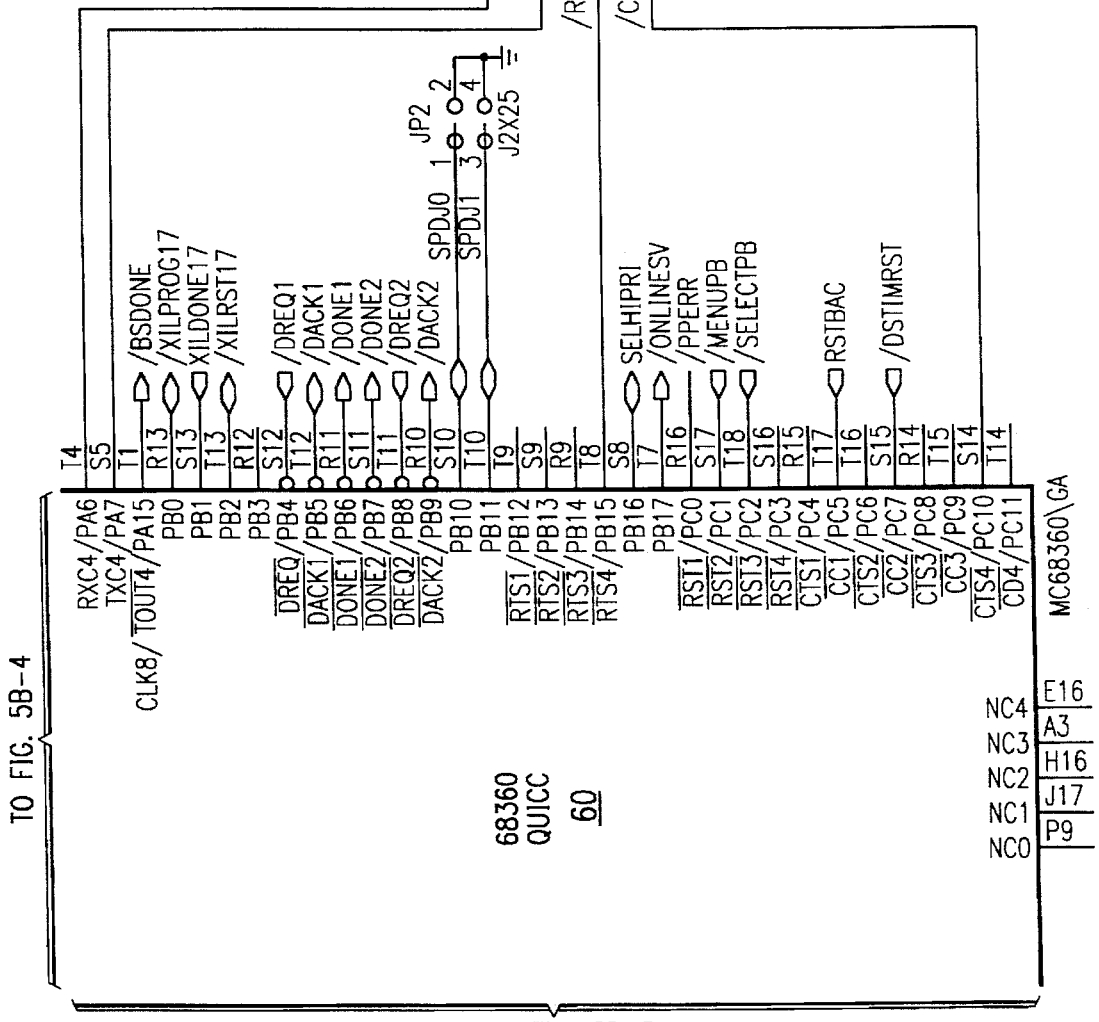

FIGS. 5A, 5B-1, 5B-2, 5B-3, 5B-4, 5C-1, 5C-2, 5D, 5E-1, 5E-2, 5F-1, 5F-2, 5G, 5H-1, 5H-2, 5H-3, 5I, 5J-1, 5J-2, 5J-3 and 5K are schematics showing one embodiment of the components and interconnections for adapter 36 of FIGS. 2 through 4. FIG. 5A shows a list of building materials and a cross-reference chart.

FIGS. 5B-1, 5B-2, 5B-3 and 5B-4 are schematics showing processor 60 of FIG. 3 including a number of devices interconnected as shown. Processor 60 comprises a 68360 QUICC, which is a MOTOROLA® 32-bit processor, and functions as the central processing unit for adapter 36. Device 120 comprises a 25 MHz crystal oscillator and operates to provide timing signals. Device 122 comprises an address decoder and operates to provide additional capability from the central processor. Device 124 comprises an RS232 interface chip and provides signal conversion from RS232 plus/minus 12 volt signals to standard TTL CMOS signals which are used by processor 60.

Figures 1, 5C:
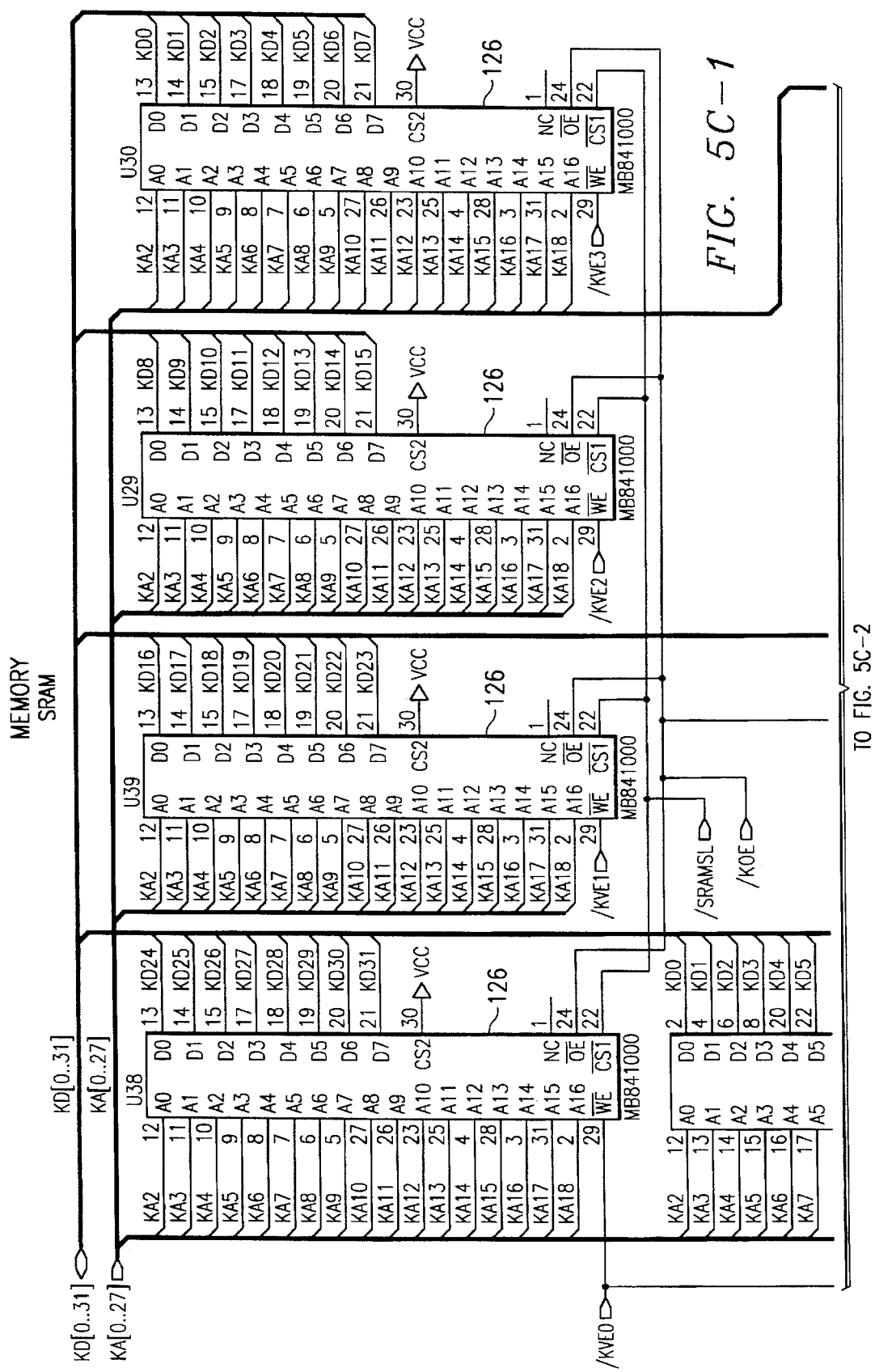

FIGS. 5C-1, 5C-2 are schematics showing memory facilities used by processor 60 including a number of devices interconnected as shown. Devices 126 comprise static random access memory chips, each holding 32-bits×128 K for a total of 512 kilobytes of memory storage space. Device 128 comprises a single inline memory slot which can hold from 4 megabytes to 64 megabytes of dynamic random access memory. Device 130 comprises a flash EEPROM, and device 132 comprises a driver circuit for device 130. Device 130 is operable to store debugger code, initialization code and various other boot code. Device 130 also maintains the XYLINX® image used at power-up to program channel controller 64 which comprises an XC4006-6 programmable gate array from XILINX®.

Figure 5D:
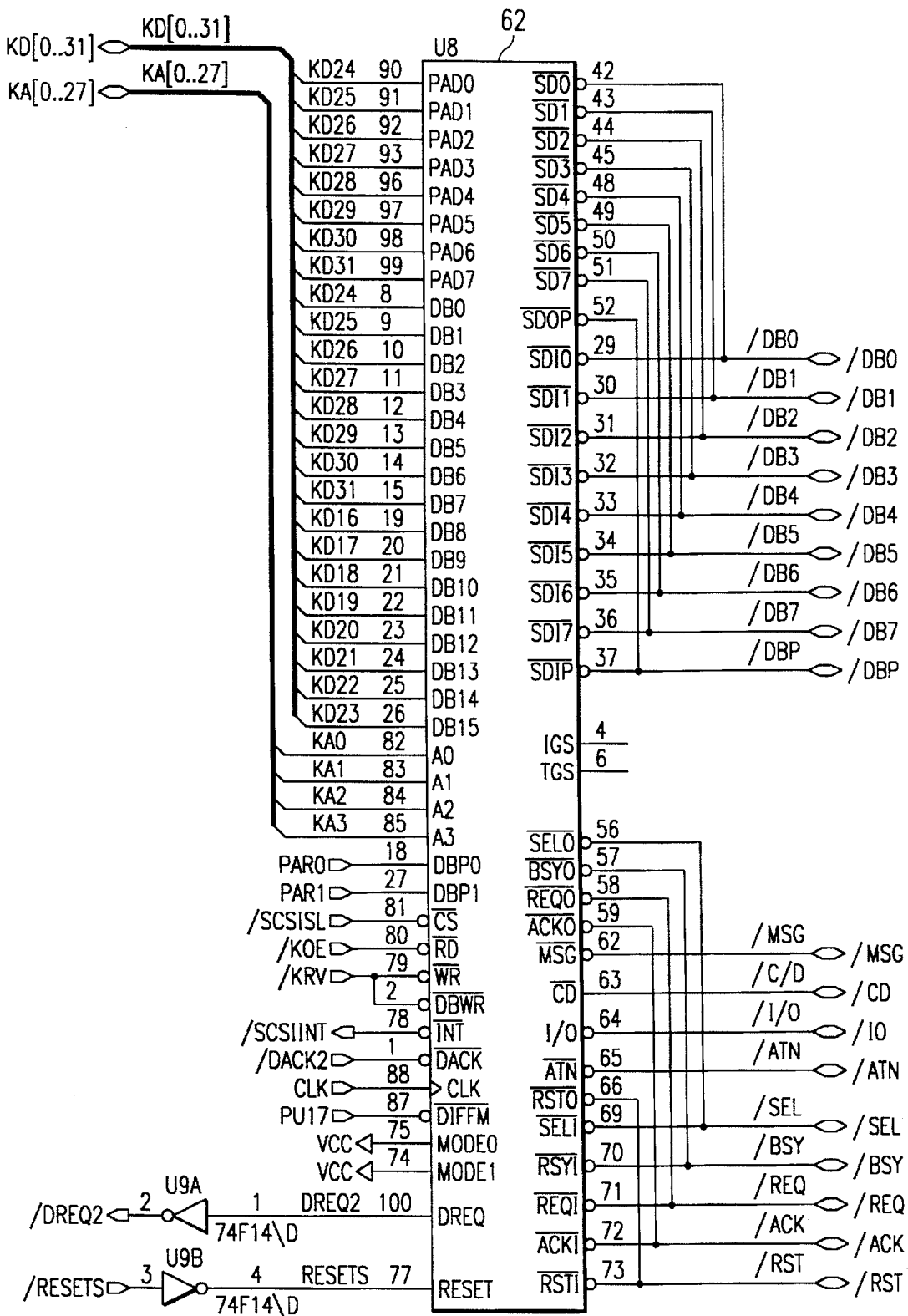

FIG. 5D is a schematic showing SCSI controller 62 of FIG. 3 including a number of devices interconnected as shown. SCSI controller 62 provides an interface between processor 60 and SCSI bus 38. In the illustrated embodiment, SCSI controller 62 comprises an NCR 35CF96-2.

Figure 5E:
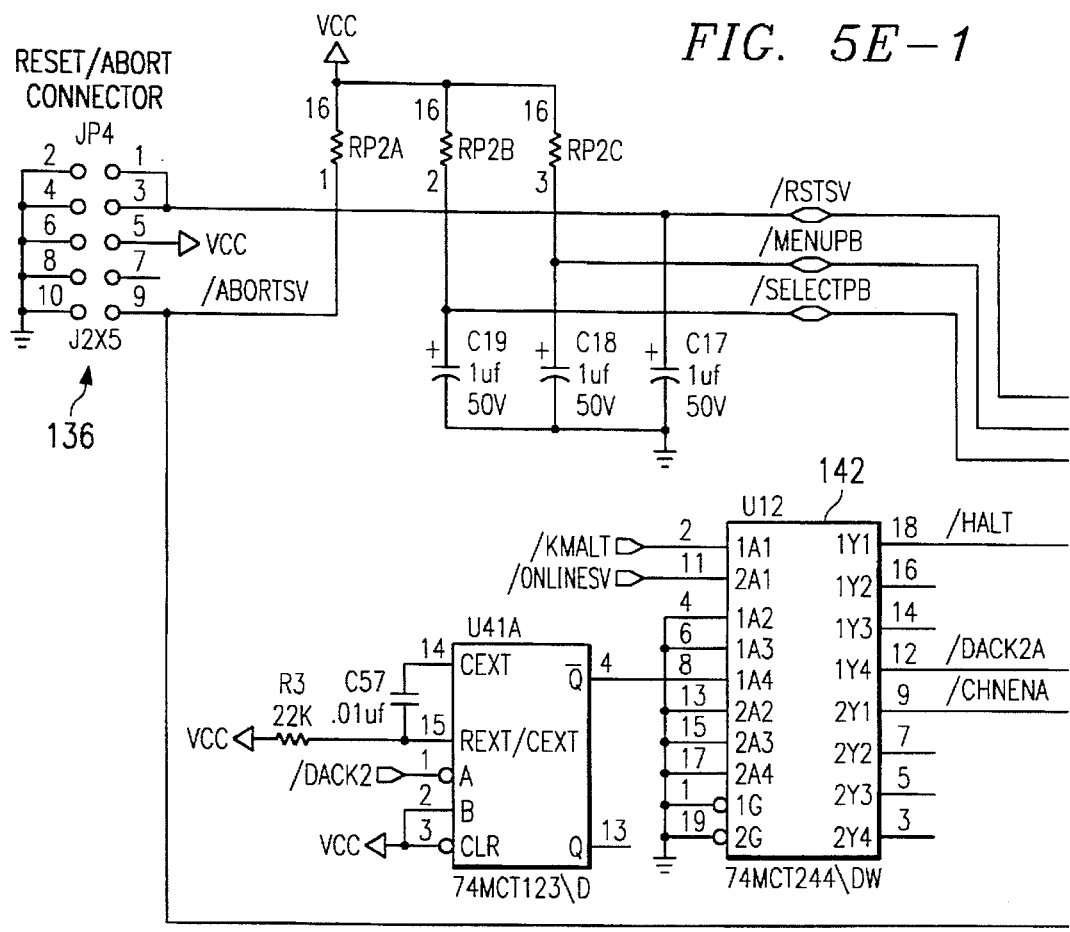
Figure 1:
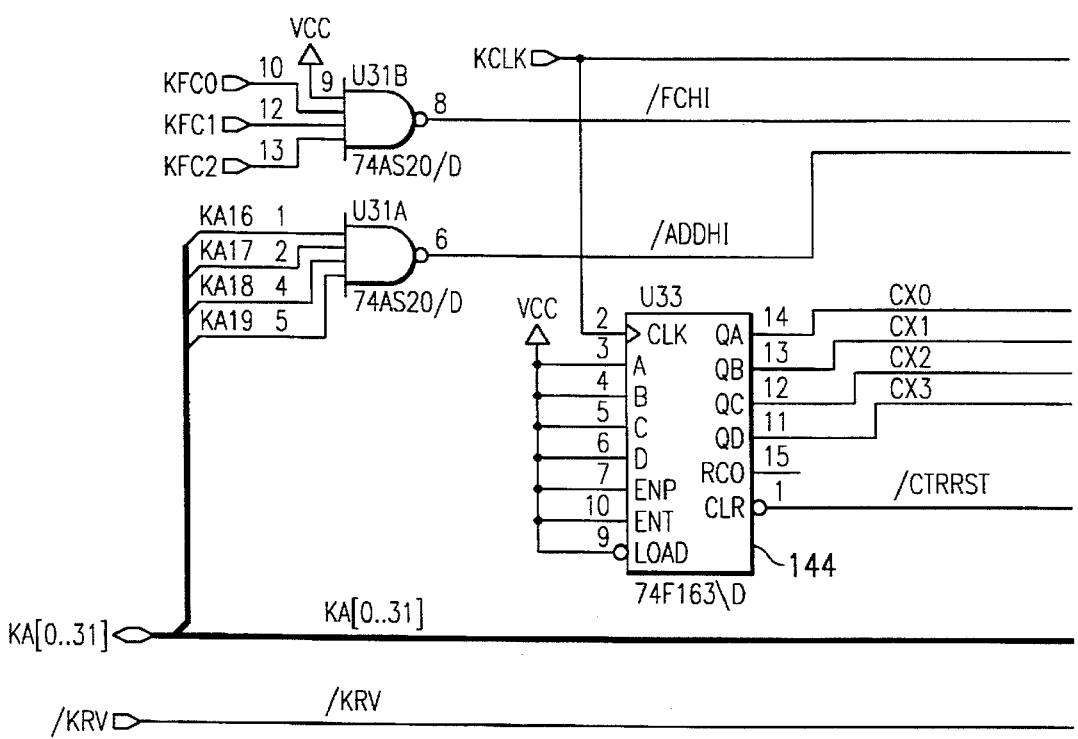
Figures 2, 5E:
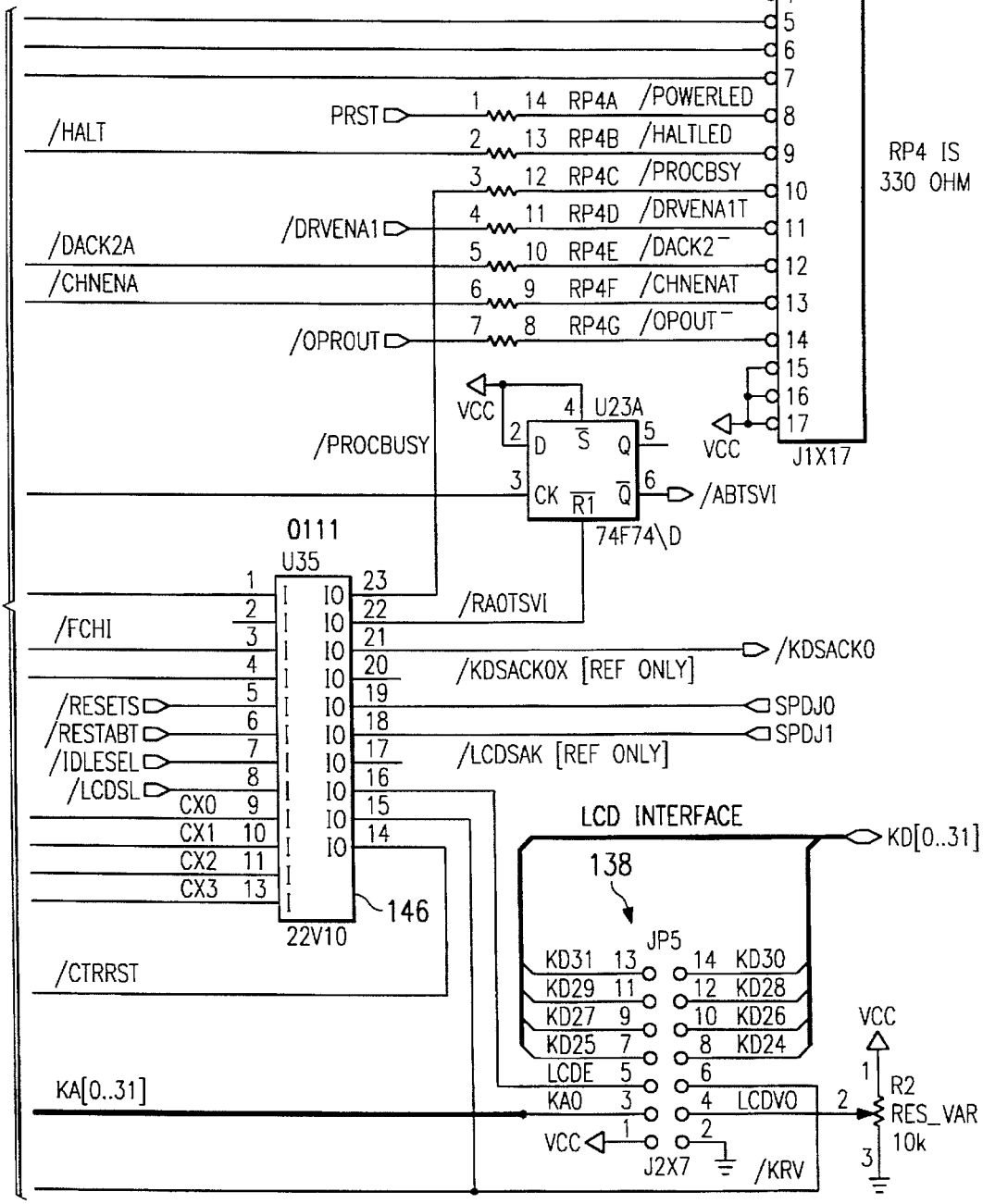

FIGS. 5E-1, 5E-2 are schematics showing a number of devices interconnected as shown. A boundary scan connector 134 is shown and is operable to provide testing. A reset connector 136 is shown and operates as an internal reset generator used for testing during manufacturing. An LCD interface 138 is shown and operates to drive the LCD display of front panel 76. A front panel interface 140 is shown and operates to provide a connector to the buttons and LED's of front panel 76. Device 142 comprises an LED driver. Device 144 comprises a four-bit counter. Device 146 comprises an input/output ("I/O") controller. Together device 144 and device 146 operate as a state machine for the LCD and idle LED on the front panel 76.

Figures 1, 5F:
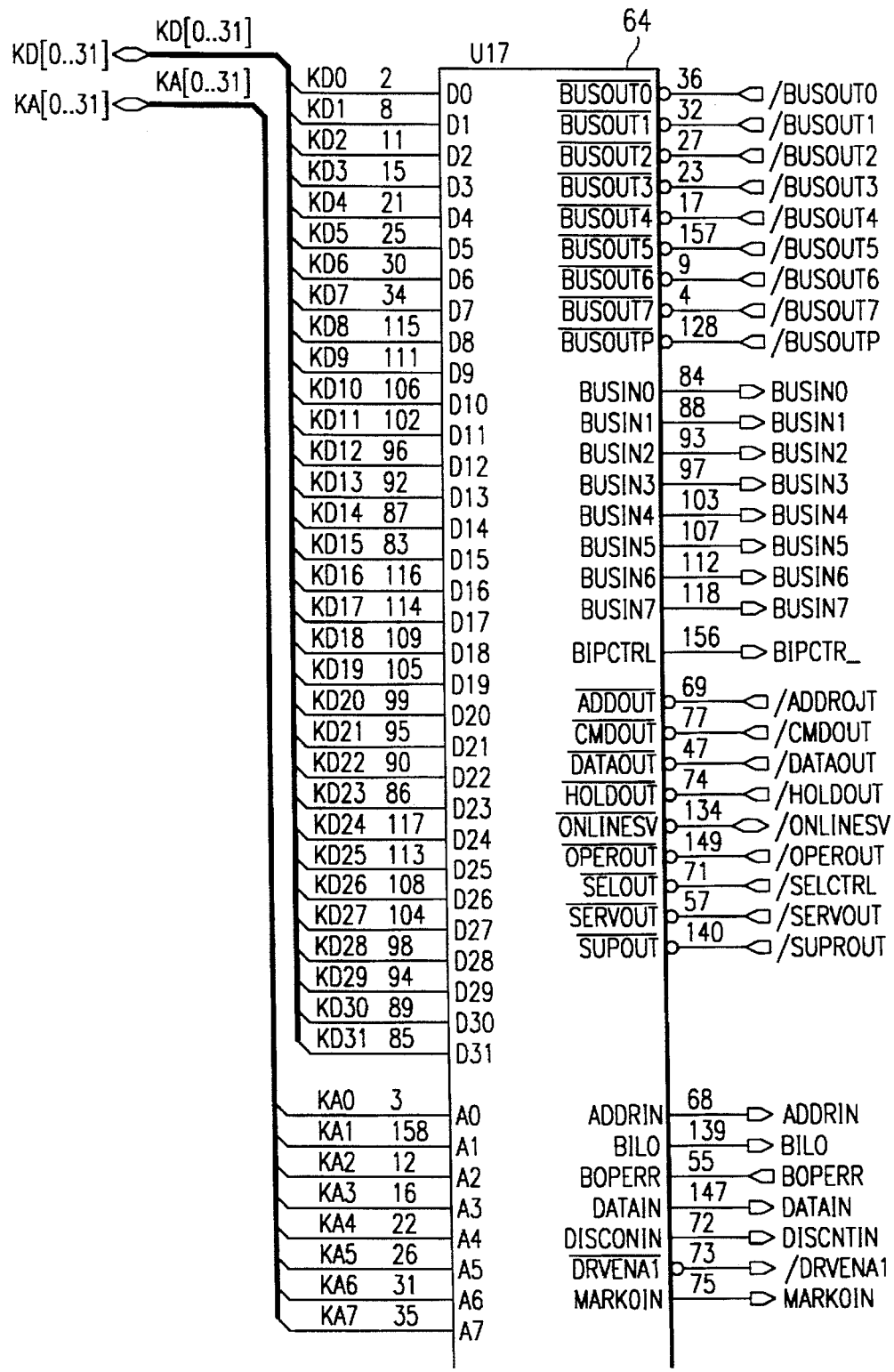
Figures 2, 5F:
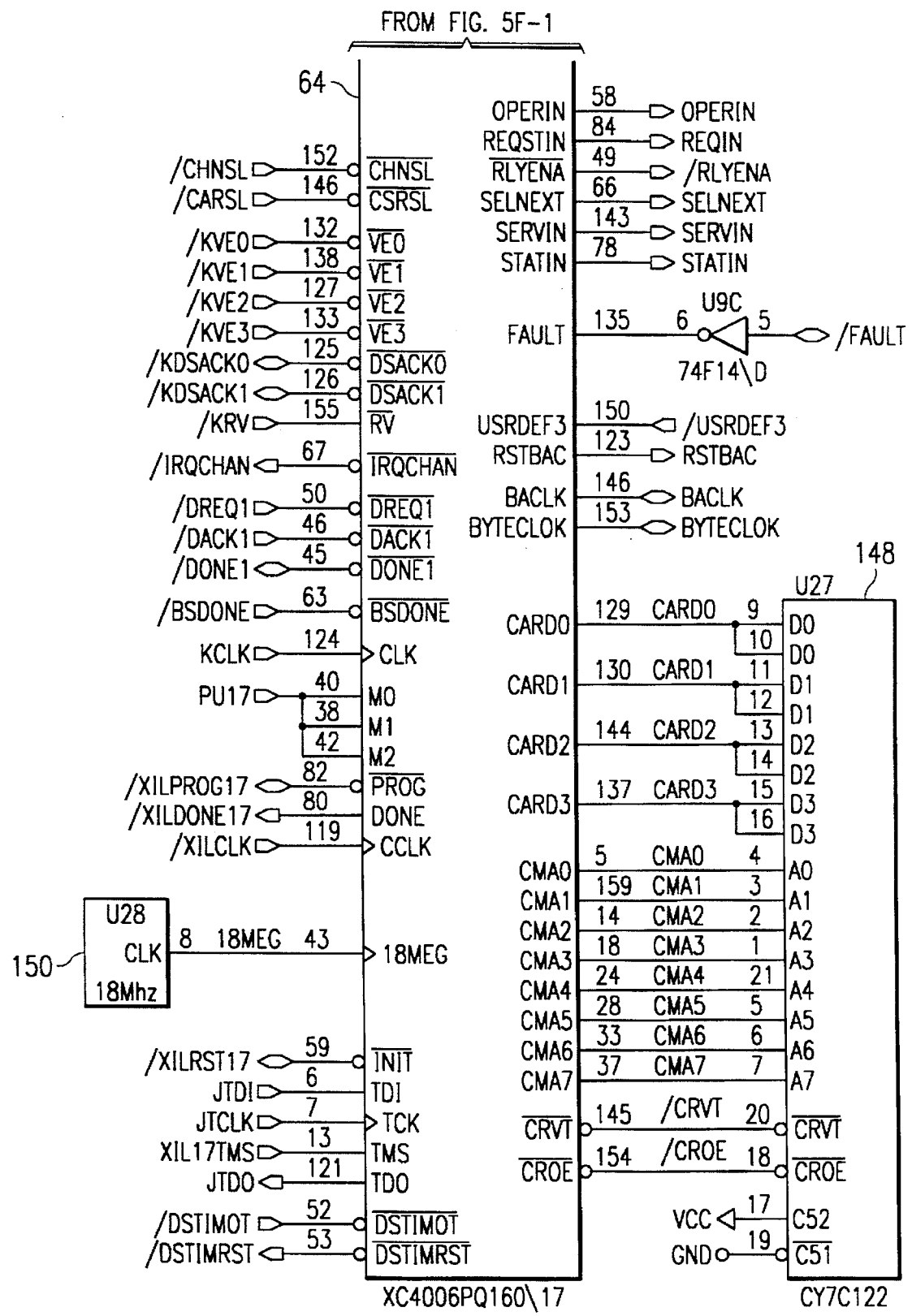

FIGS. 5F-1, 5F-2 are schematics showing channel controller 64 of FIG. 3 including a number of devices interconnected as shown. FIGS. 6A-1, 6A-2, 6B, 6C-1, 6C-2, 6D-1 6D-2, 6E-1, 6E-2, 6F-1 6F-2, 6G-1, 6G-2, 6H, 6I-1, 6I-2, 6J-1, 6J-2, 6K-1, 6K-2, 6L-1, 6L-2, 6M-1, 6M-2, 6M-3, 6M-4, 6N-1, 6N-2, and 6O-1, 6O-2, as described below, are schematics showing the internal logic components and interconnections of channel controller 64. Channel controller 64 comprises a programmable gate array from XILINX®. Device 148 comprises a 256×4-bit SRAM used for address decoding and channel selection addressing. Device 150 comprises an 18 MHz crystal.

Figure 5G:
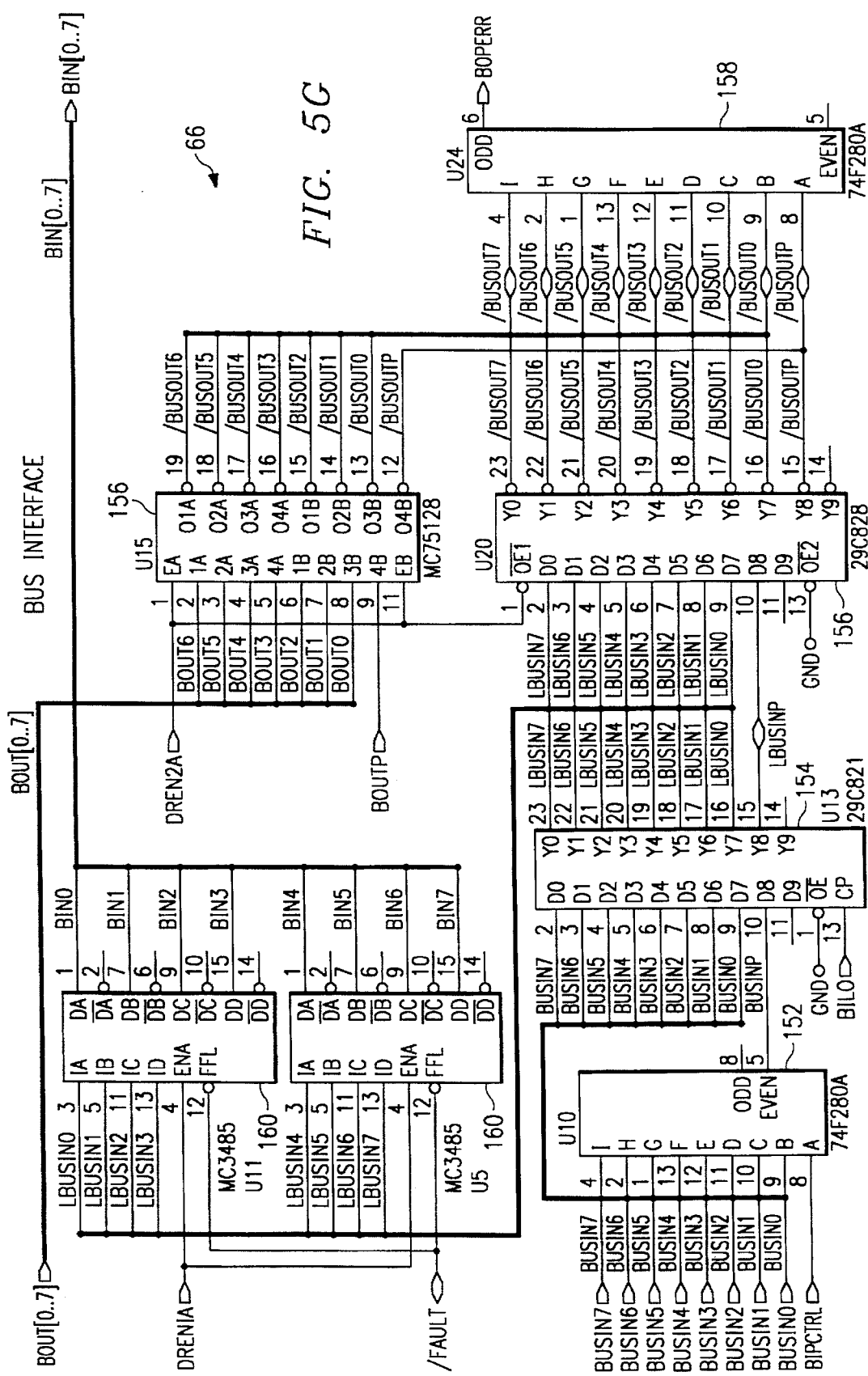
Figures 1, 5H:
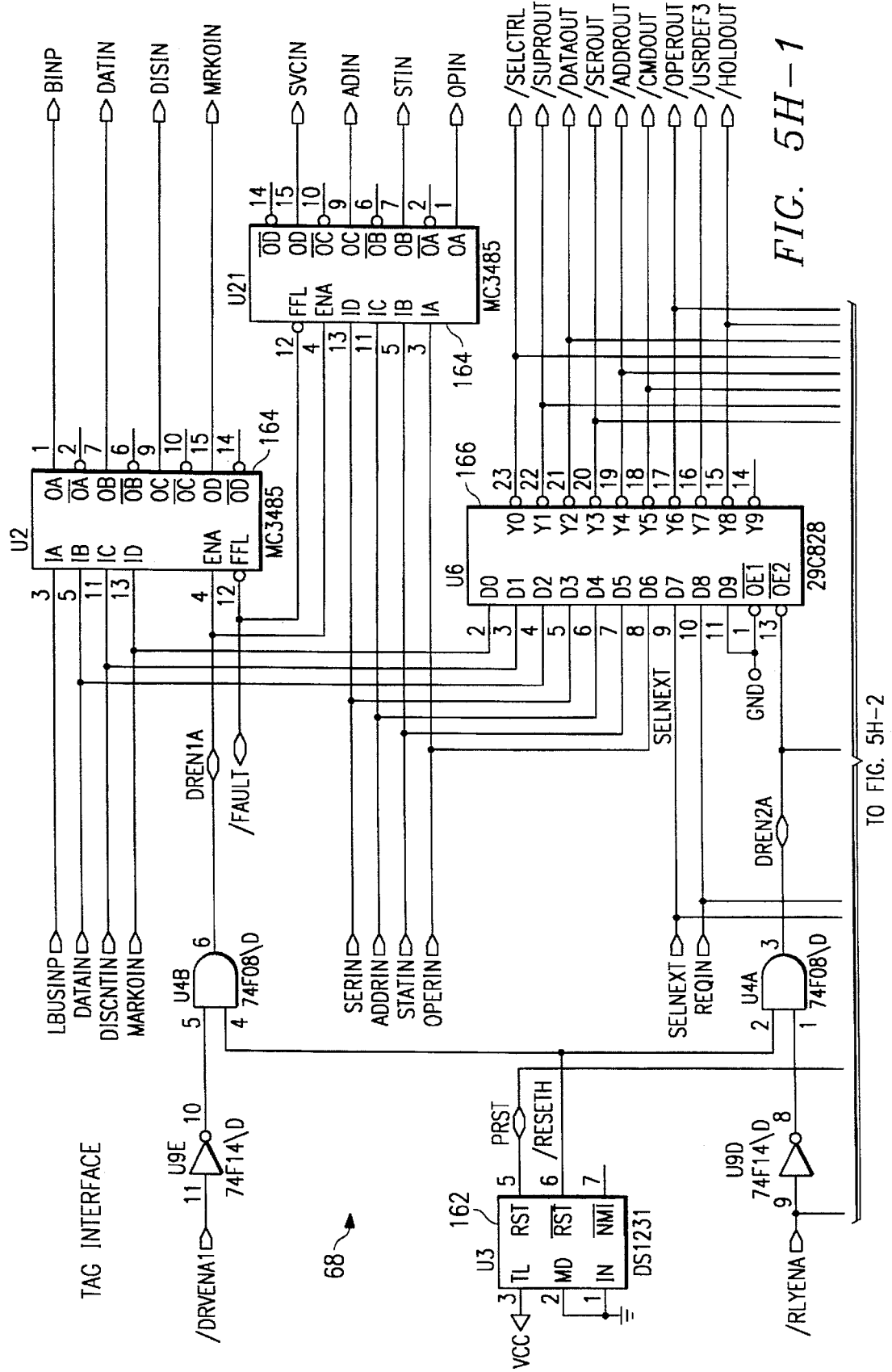
Figures 3, 5H:
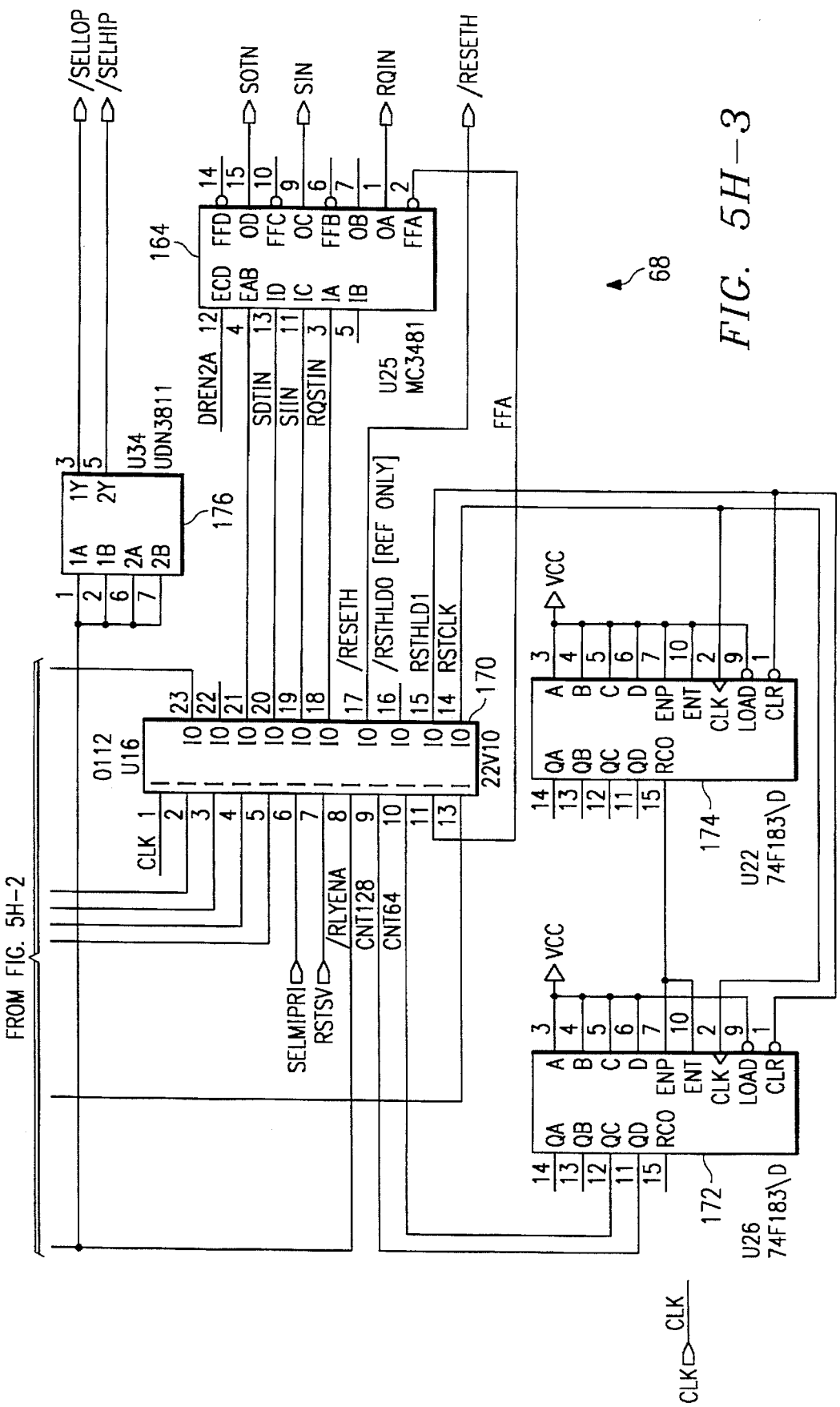
Figure 5I:
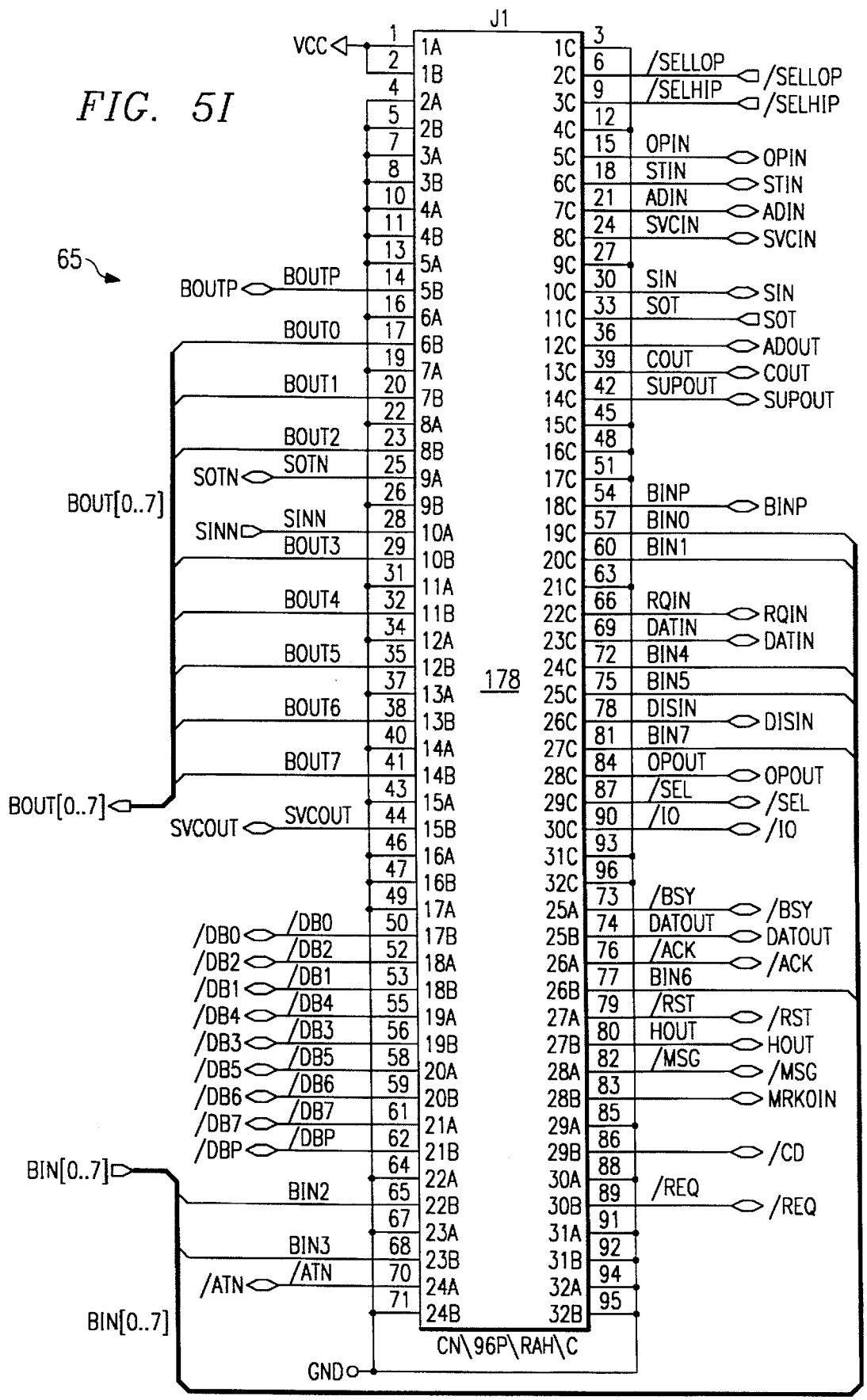

FIG. 5G is a schematic showing the structure of bus interface 66 of FIG. 3. Device 152 comprises a parity generator. Device 154 comprises a 10-bit register. Devices 156 comprise tristate registers operable to control whether or not data is going out bus interface 66 or data is looped back for testing purposes. Device 158 comprises a parity generator that is used to check for bus-out parity. Devices 160 comprise physical signal drivers going out to IBM System/360/370 I/O interface channel 18 and operating physically to drive IBM System/360/370 I/O interface channel bus 18.

FIGS. 5H-1, 5H-2, 5H-3 are schematics showing tag interface 68 of FIG. 3 including a number of devices interconnected as shown. In general, FIG. 3 bus interface 66 provides a data interface between channel controller 64 and IBM System/360/370 I/O interface channel 18, and tag interface 68 provides control signals between channel controller 64 and IBM System/360/370 I/O interface channel 18. Device 162 comprises a voltage reference device used to generate a PRST signal and a reset hard signal. Devices 164 comprise physical drivers for the tag interface bus. Device 166 comprises a loop-back generator that is used for testing similar to that described with respect to bus interface 66. Devices 168 comprise receivers which receive control signals from IBM System/360/370 I/O interface channel 18. Device 170, device 172 and device 174 are operable for reset timing. Device 170 is a programmable component which is operable for selection control for routing signals to and from IBM System/360/370 I/O interface channel 18. Device 176 comprises a selection circuit which functions in the event of power loss to replace device 170 and device 164 with two hardware relays.

Figures 1, 5J:
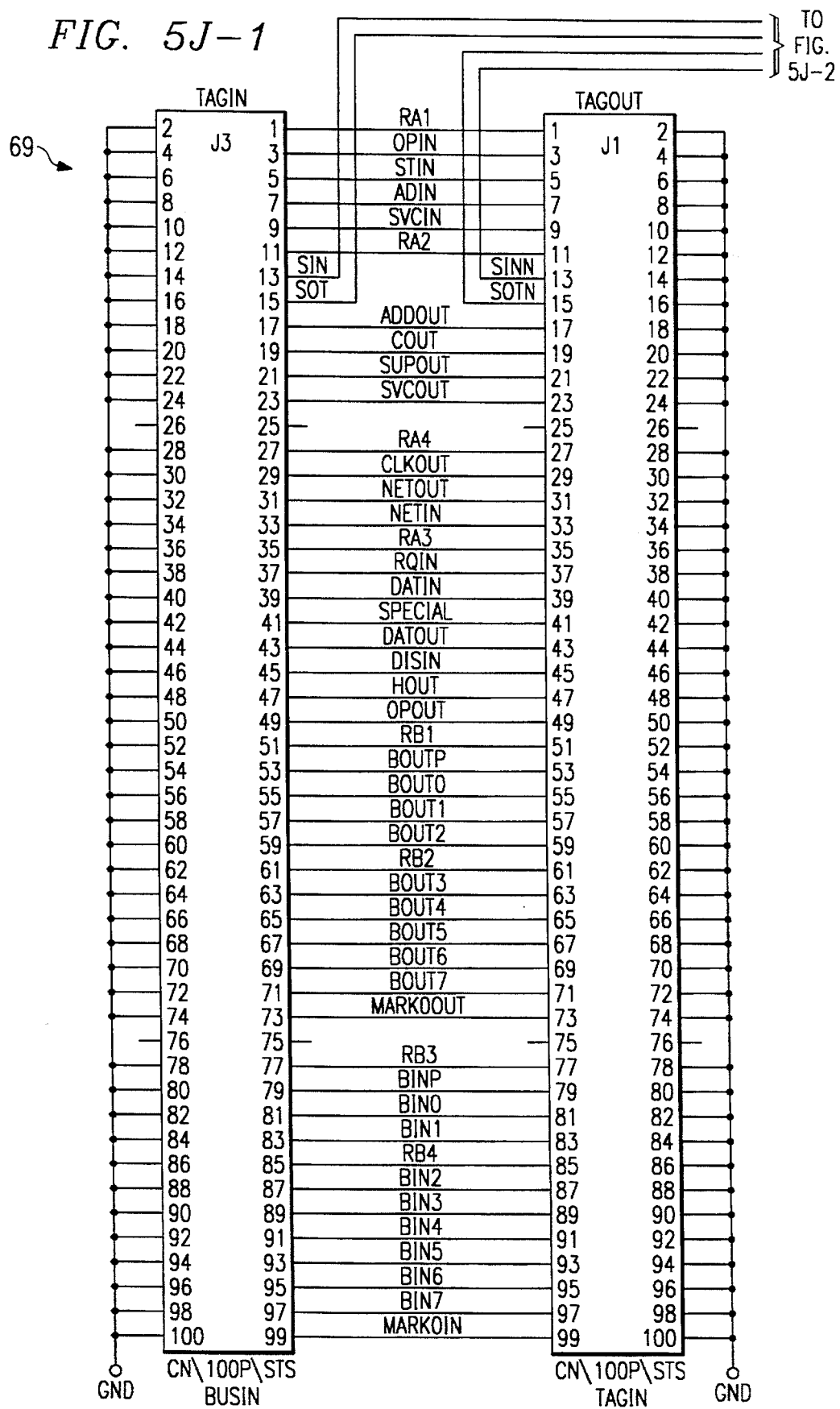
Figures 2, 5J:
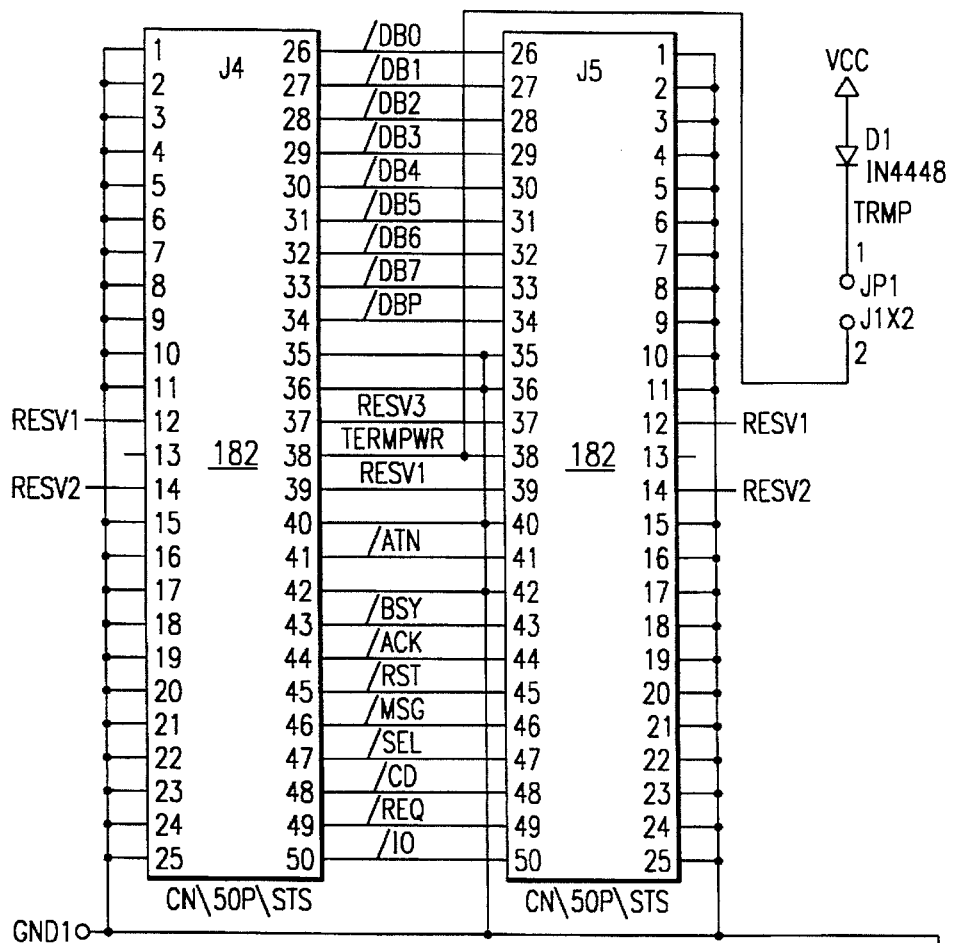
Figures 3, 5J:
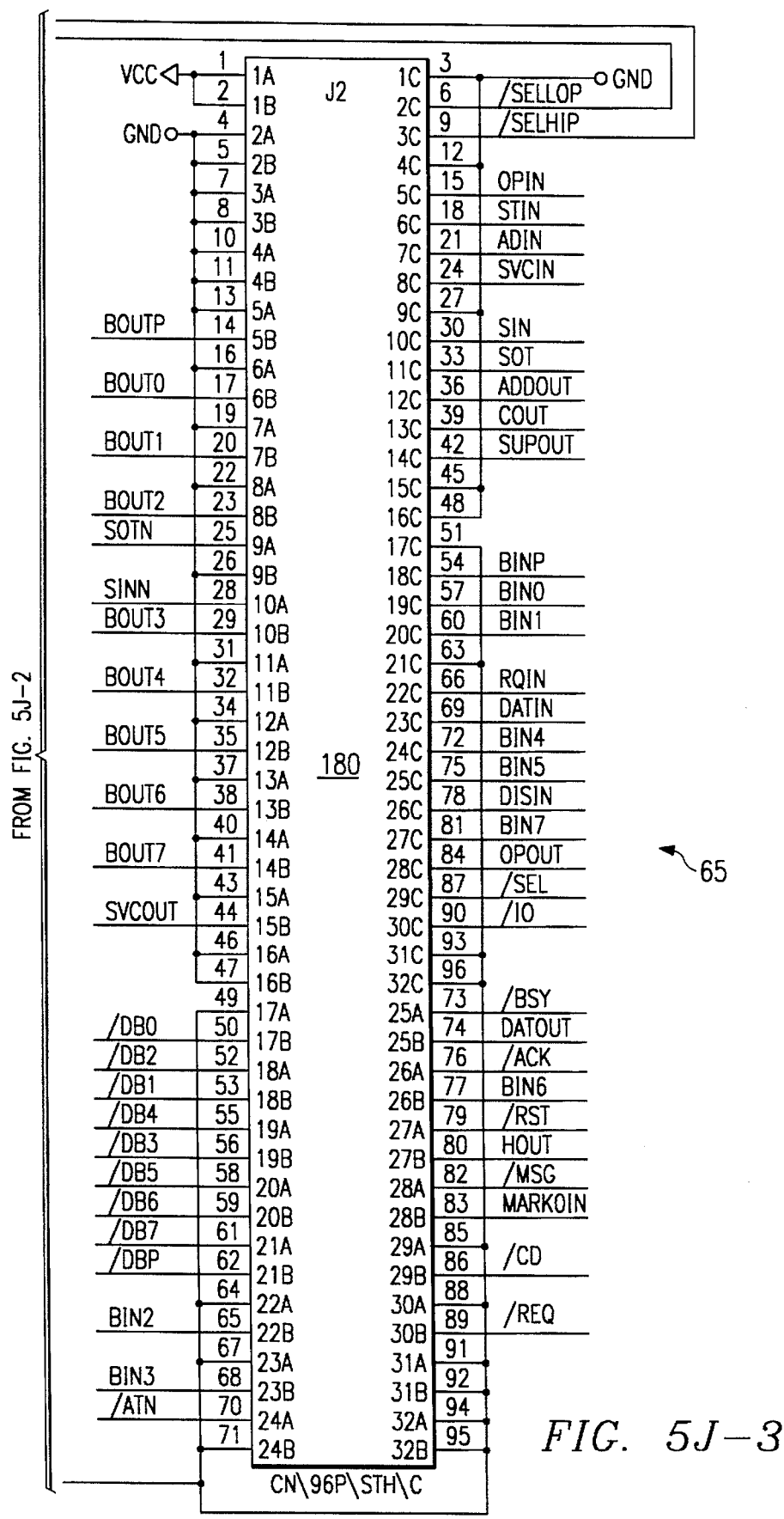

FIGS. 5I and 5J-1, 5J-2, 5J-3 are schematics showing SCSI connector 65 and channel connector 69 of FIG. 3 including a number of devices interconnected as shown. FIGS. 5J-1, 5J-2, 5J-3 show a connector board that is connected to the main board through a connector shown in FIG. 5I. The left side of the FIG. 5J-1 shows the bus and tag connector. Device 180 comprises an interface to device 178 of FIG. 5I. Devices 182 comprise connectors to SCSI bus 38. Devices 184 comprise two relays which are driven by device 176 and are used for selection.

Figure 5K:
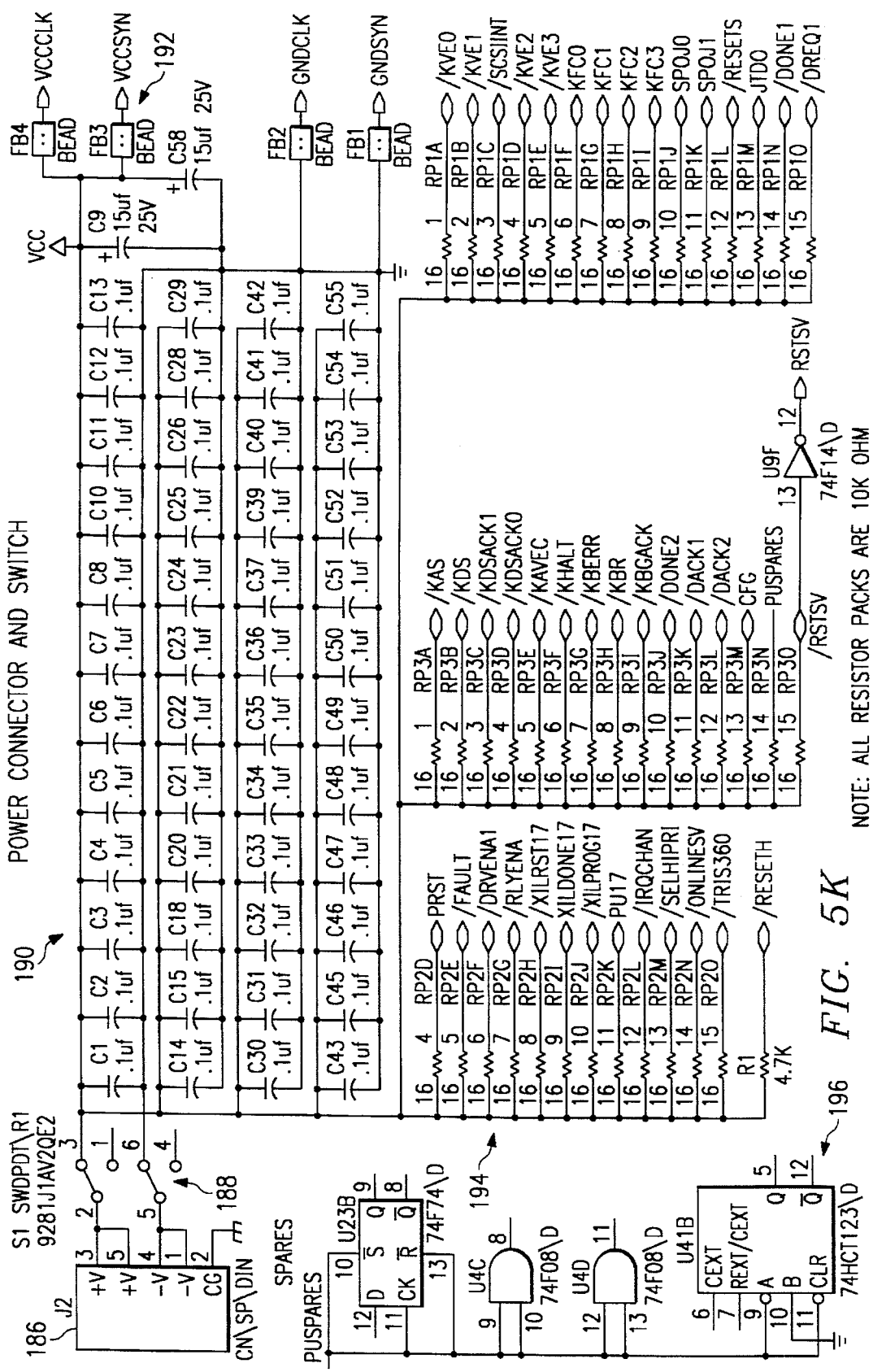

FIG. 5K is a schematic showing a number of components and interconnections. Device 186 provides power to the main board. Device 188 is a power switch. The combination of the capacitive array 190 and the beads 192 construct an LC network. The large number of capacitors are by-pass capacitors which supply clean voltages for the channel controller 64 and a phase lock loop inside processor 60. The large number of resistors 194 are all pull-up resistors and the components 196 are spares.

Schematics for channel controller

FIGS. 6A-1, 6A-2, 6B, 6C-1, 6C-2, 6D-1, 6D-2, 6E-1, 6E-2, 6F-1, 6F-2, 6G-1, 6G-2, 6H, 6I-1, 6I-2, 6J-1, 6J-2, 6K-1, 6K-2, 6L-1, 6L-2, 6M-1, 6M-2, 6M-3, 6M-4, 6N-1, 6N-2, and 6O-1, 6O-2 are schematics showing one embodiment of logic components and interconnections for channel controller 64.

Figures 1, 6A:
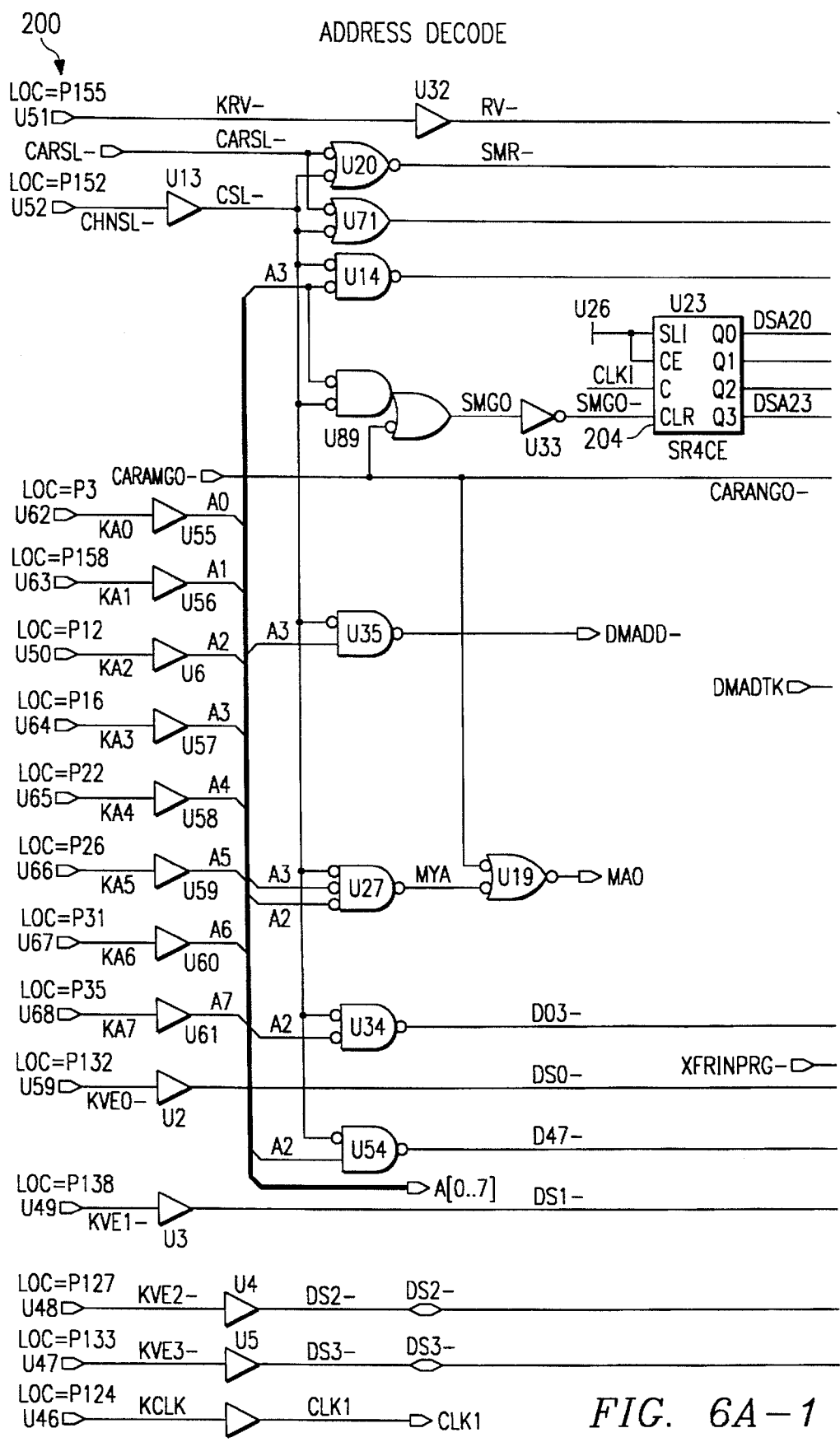
Figures 2, 6A:
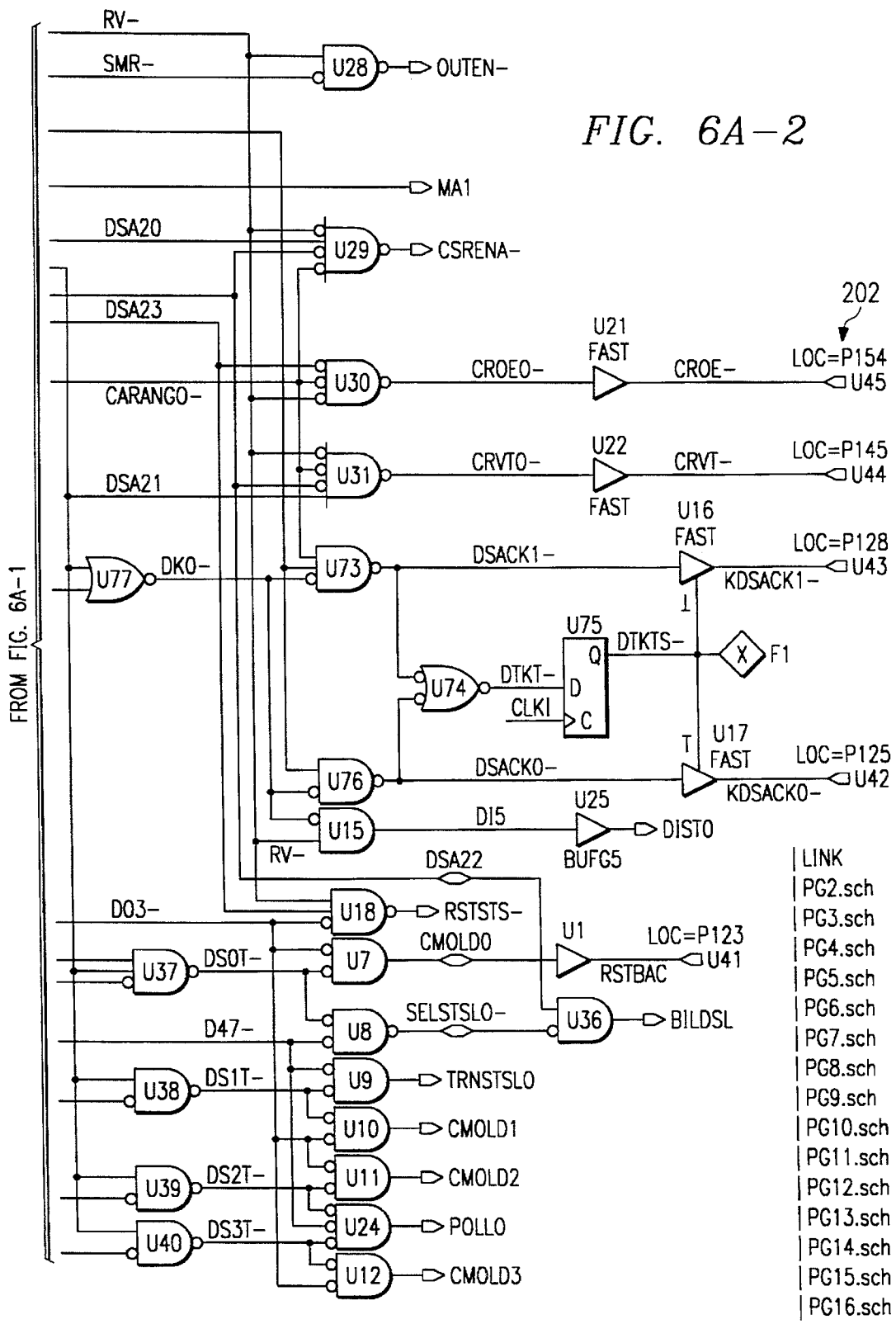

FIGS. 6A-1, 6A-2 are schematics showing address decode including a number of logic components interconnected as shown. Devices 200 of FIG. 6A comprise an inputs of channel controller 64. Channel controller 64 comprises a XILINX® XC4006-6 which is a RAM-based field programmable gate array having an SRAM on board. At power-up, an image is brought from programmable ROM 74 and loaded into SRAM on board channel controller 64. Devices 202 of FIGS. 6A-1, 6A-2 are schematic outputs of channel controller 64. Channel controller 64 has bi-directional pins as well. The address decode logic shown in FIGS. 6A-1, 6A-2 include a device 204 which comprises a state machine. Generally, address decode takes a 256 byte address and separates the address into smaller width addresses, typically an 8-bit, 16-bit or 32-bit address.

Figure 6B:
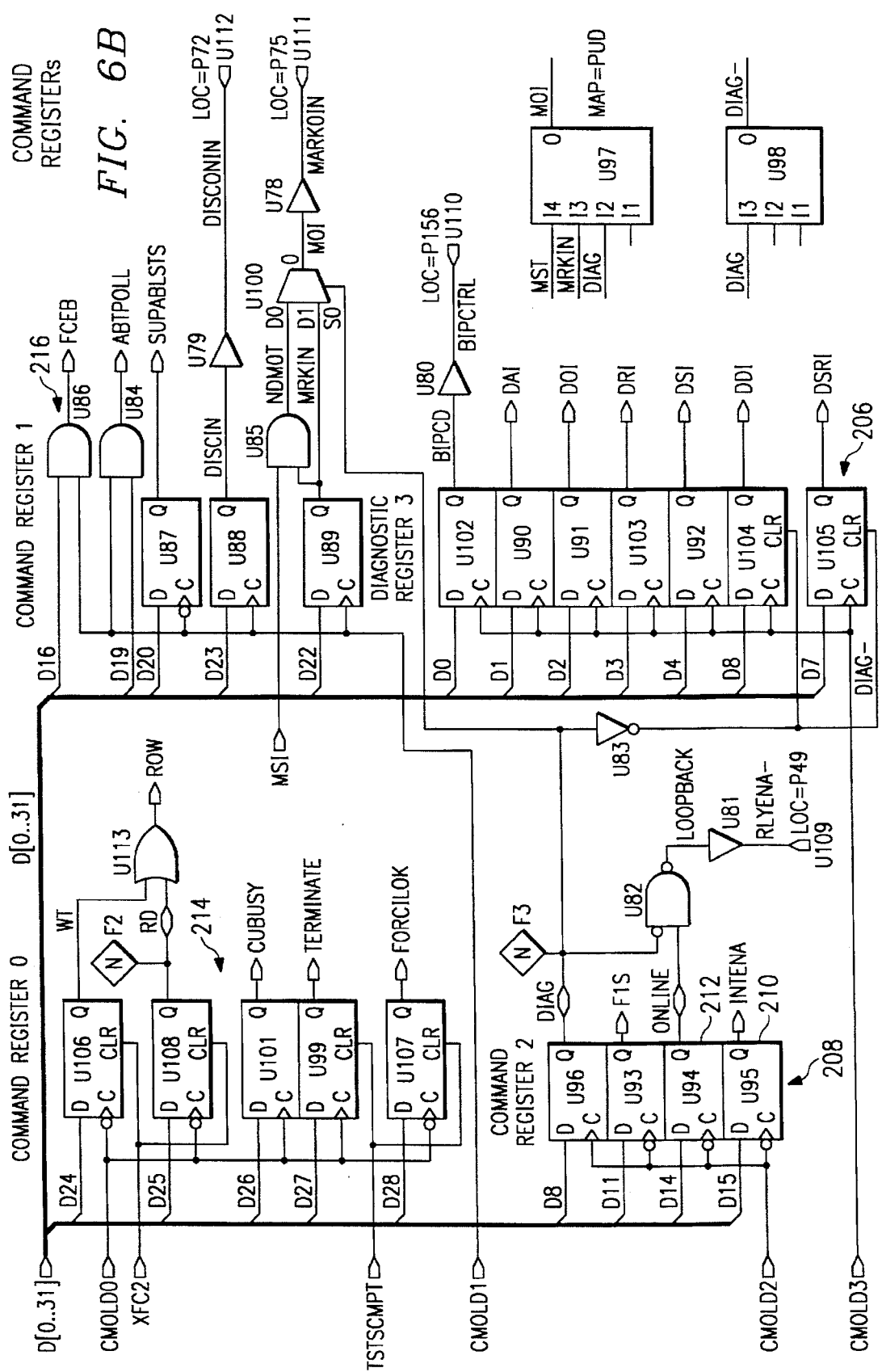

FIG. 6B is a schematic showing command registers including a number of logic components interconnected as shown. Register 206 is used to control loop back diagnostics. Command register 208 is written only once at initialization. For example, device 210 has the interrupt allow bit which indicates there should be an interrupt after the next sequence of operations is completed. Device 212 is an online bit which tells the rest of the system that the controller is on-line. Command register 214 and 216 store similar command bits.

Figures 1, 6C:
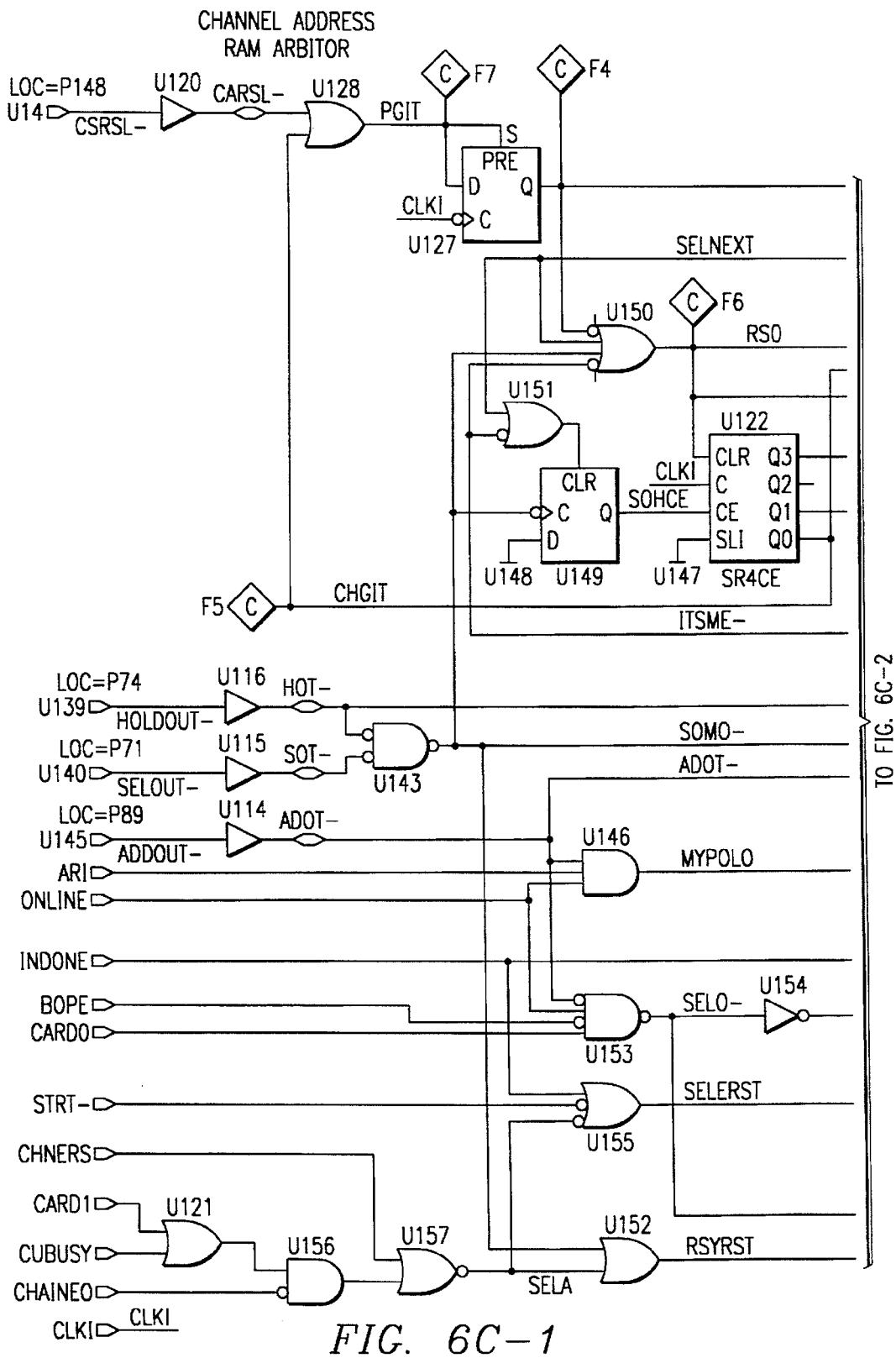
Figures 2, 6C:
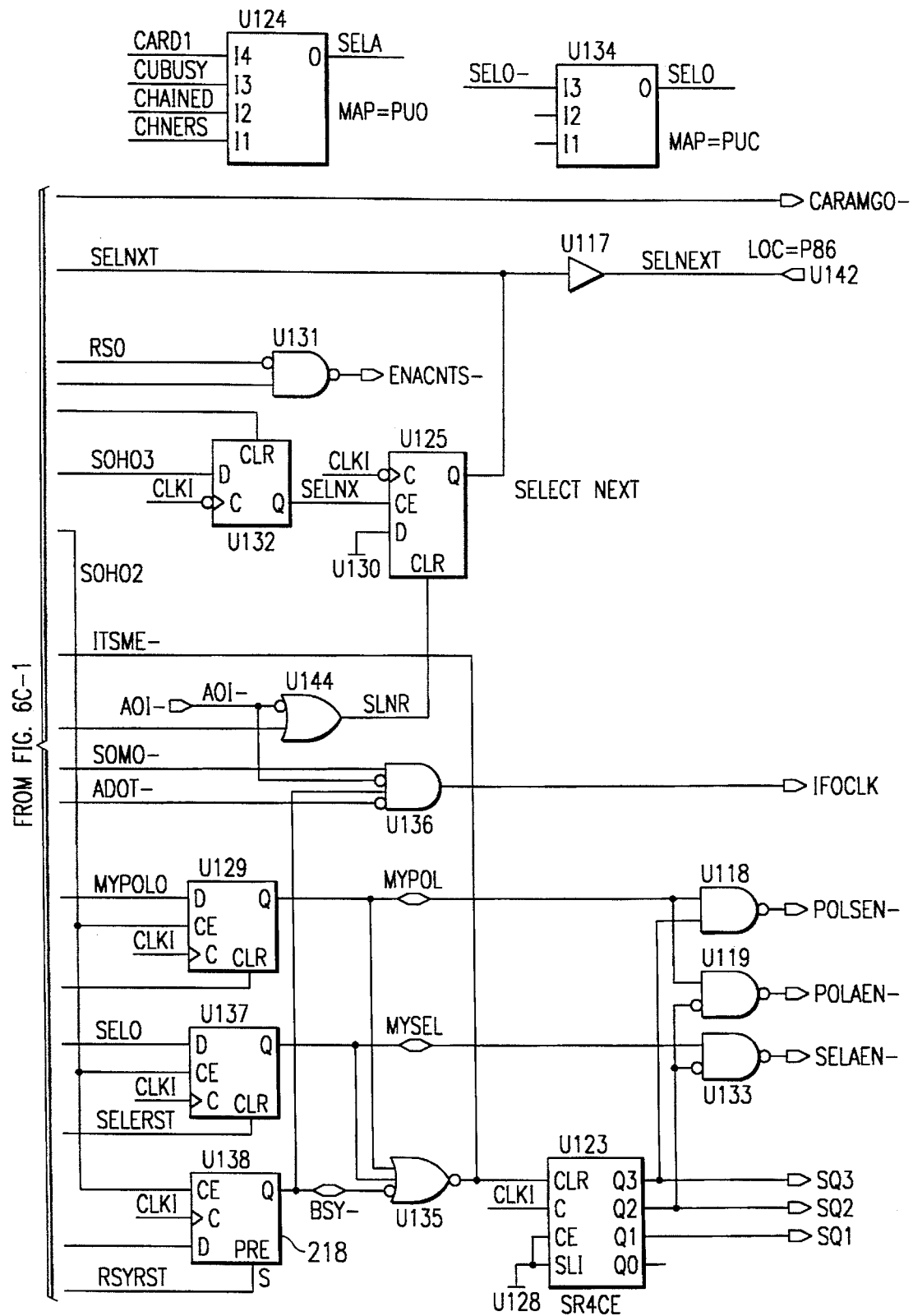

FIGS. 6C-1, 6C-2 are schematics showing the selection controller including a number of logic components interconnected as shown. The selection controller is used in two different circumstances. The first circumstance is during the poll situation where some entity is requesting use of IBM System/360/370 I/O interface channel 18. The selection can be characterized as mainframe 16 alerting processor 60 that some action needs to be taken. The selection controller is also used in the circumstance where the selection is not intended for processor 60, and channel controller 64 functions to propagate two signals which comprise the selection down IBM System/360/370 I/O interface channel 18. The selection controller is also used to create a busy signal where a device can tell mainframe 16 via IBM System/360/370 I/O interface channel 18 that the device is busy. The busy signal is created, stored and generated from device 218 of FIGS. 6C-1, 6C-2.

Figures 1, 6D:
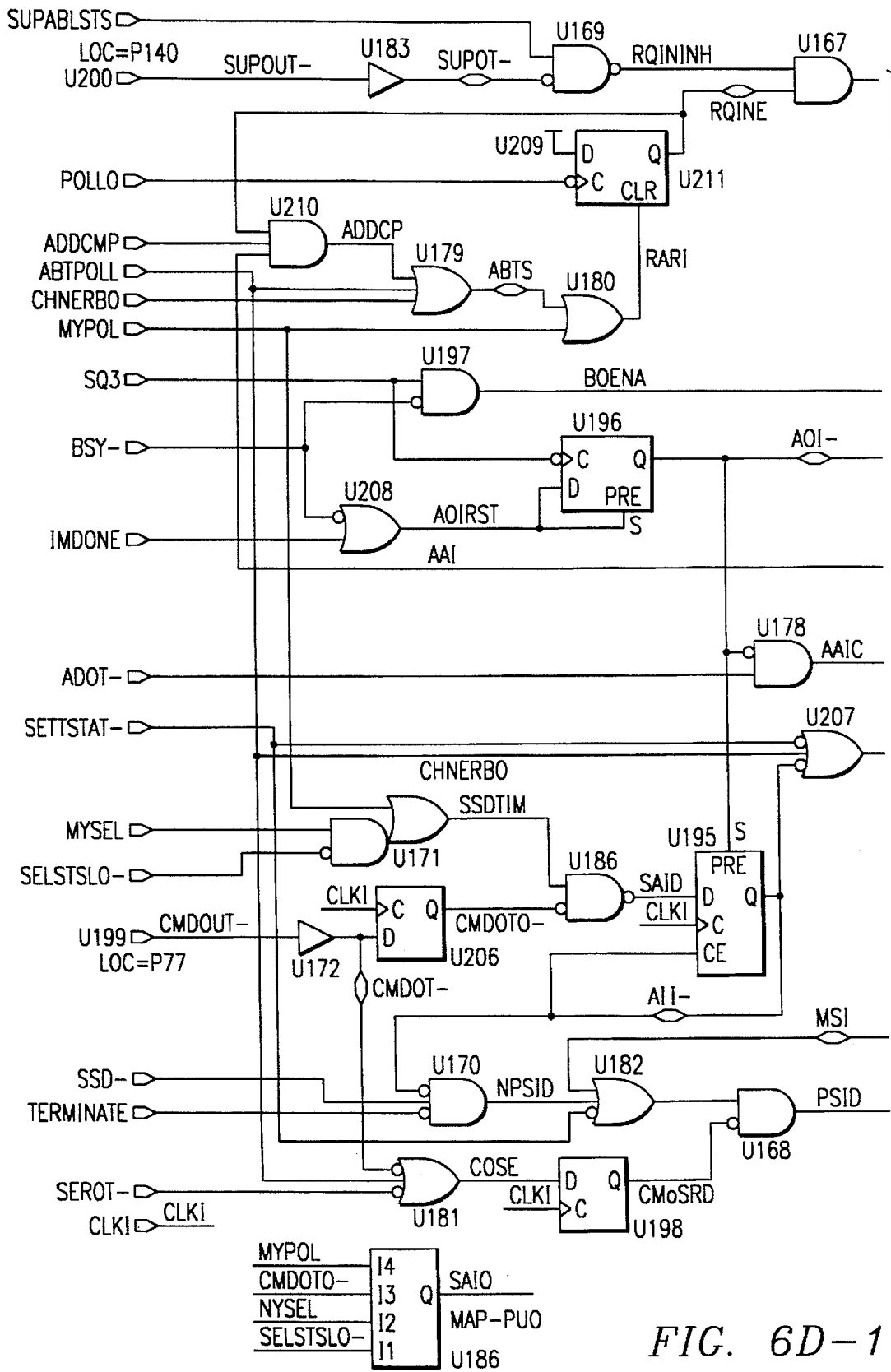
Figures 2, 6D:
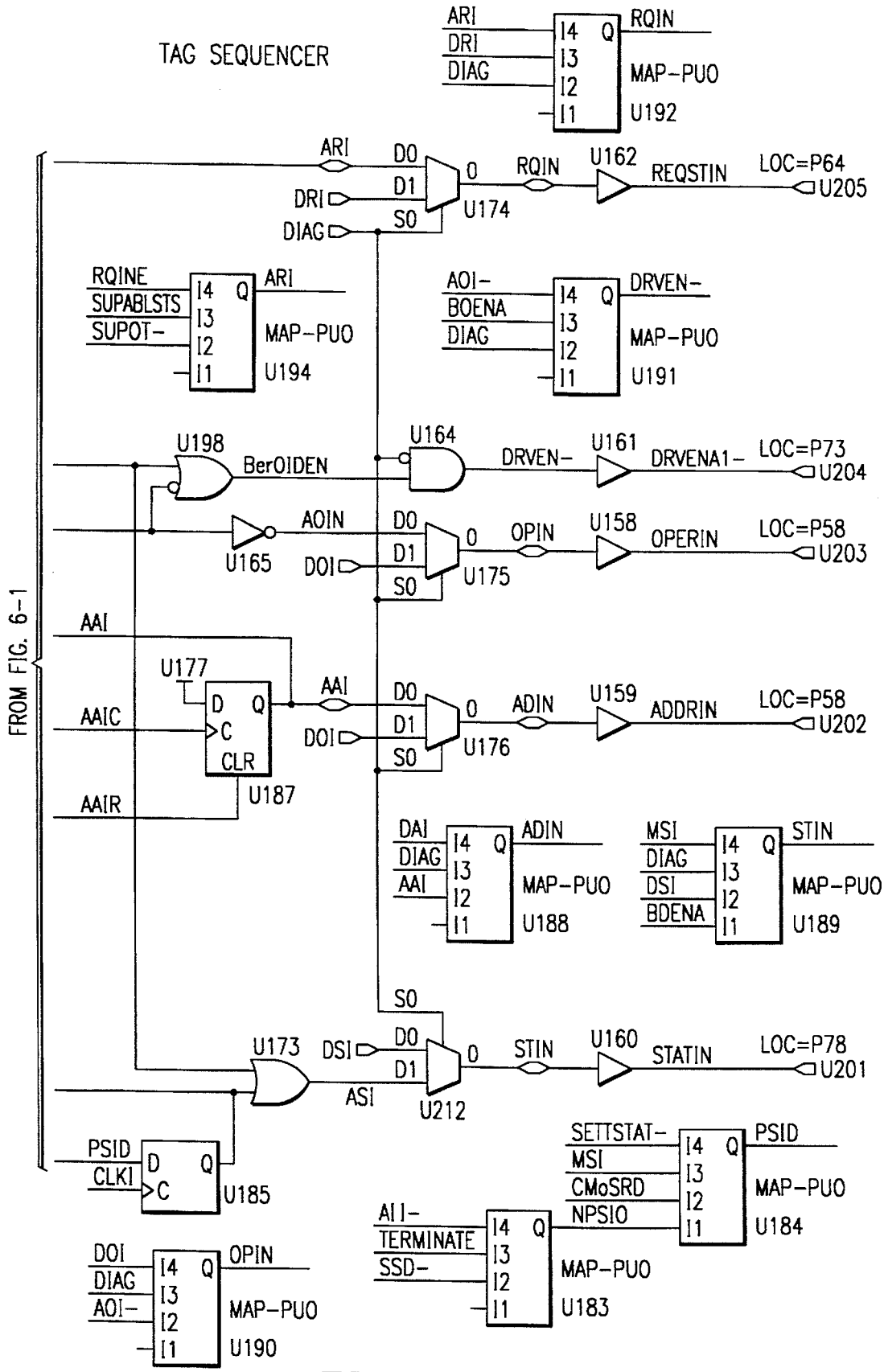

FIGS. 6D-1, 6D-2 are schematics showing the tag sequencer including a number of logic components interconnected as shown. The tag sequencer operates to control the sequence of signalling that happens over tag interface 68. Tag interface 68 provides an interface that passes control signals between mainframe 16 and processor 60. The channel protocol requires particular signals to go high and low at various times within the passing of control information. FIGS. 6D-1, 6D-2 are schematics showing one embodiment of a hardware solution to tag sequencing.

Figures 1, 6E:
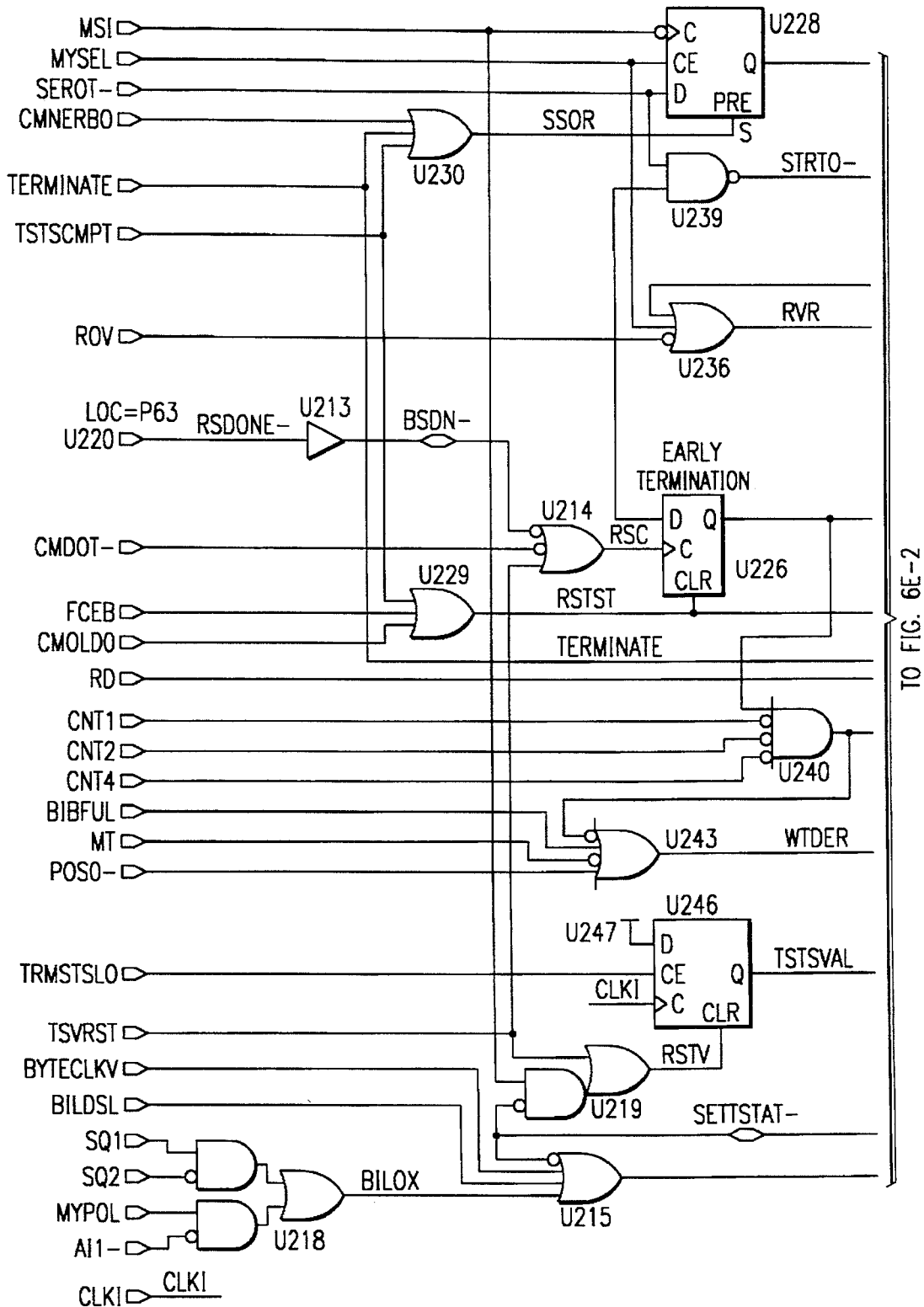
Figures 2, 6E:
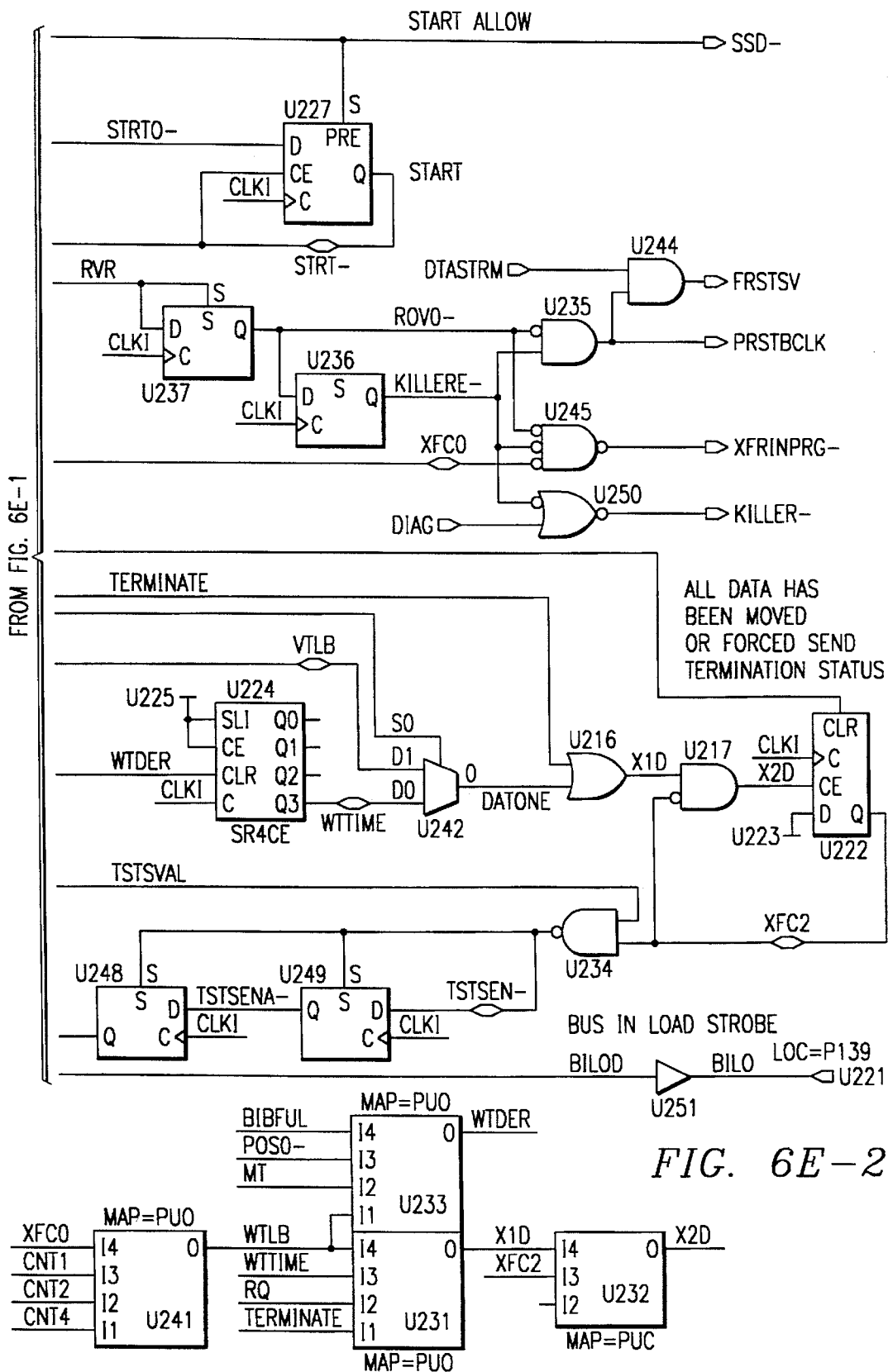

FIGS. 6E-1, 6E-2 are schematics showing the start and termination controller including a number of logic components interconnected as shown. The start and termination controller provides intermediate states, especially the start state which is between the selection from mainframe 16 and the beginning of data transfer. The start and termination controller also provides similar signalling prior to termination of the entire order with the termination signals.

Figures 1, 6F:
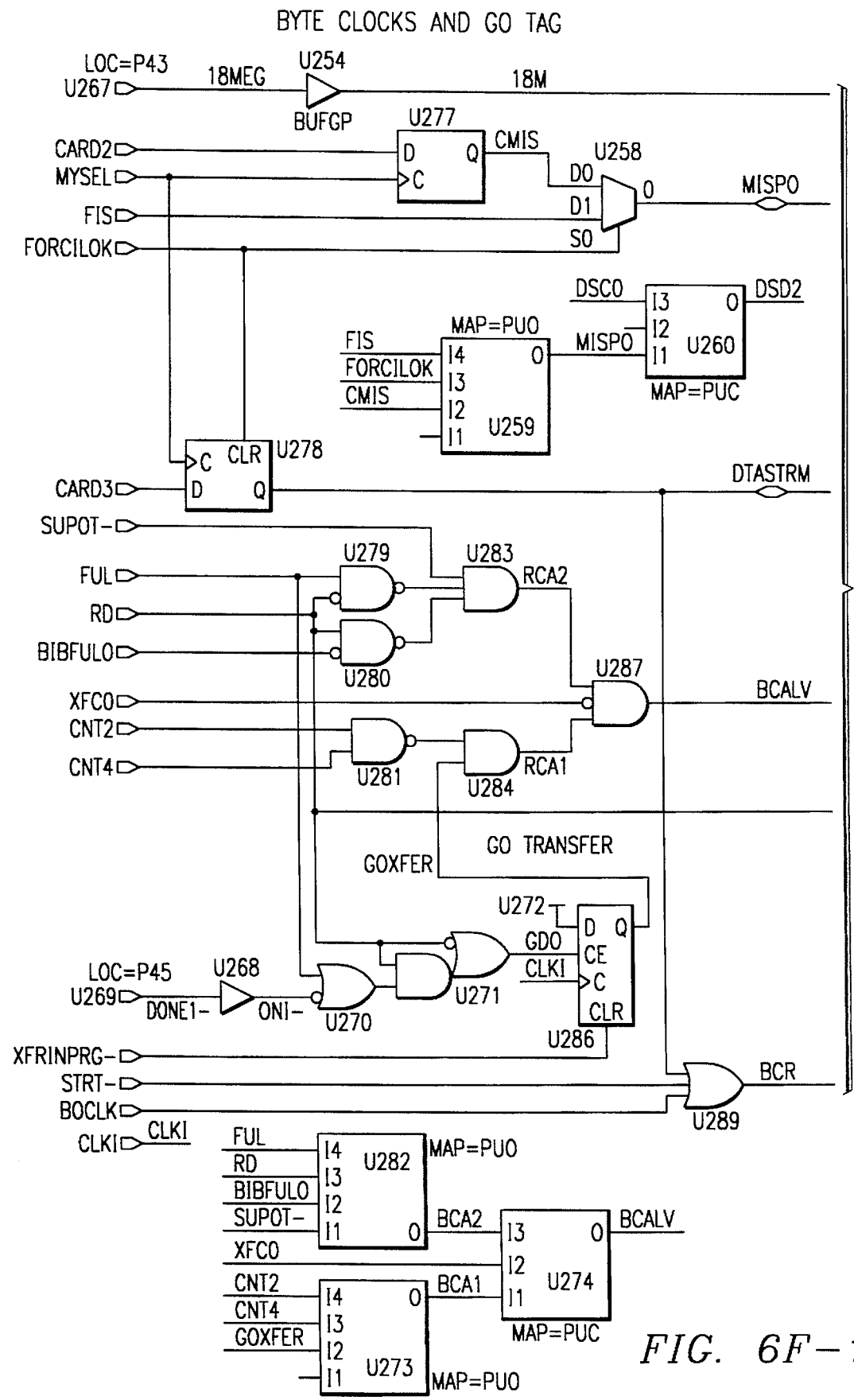
Figures 2, 6F:
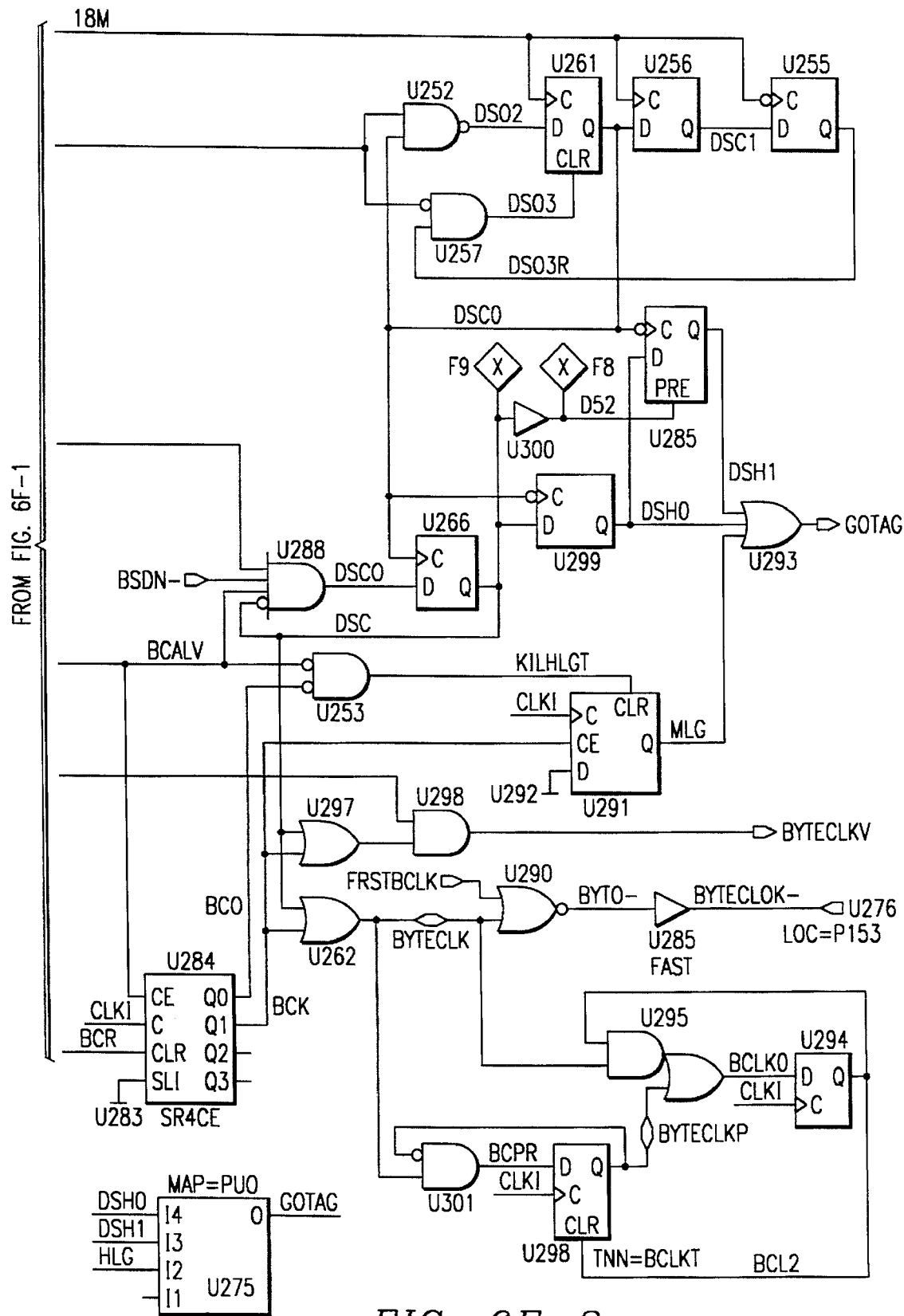

FIGS. 6F-1, 6F-2 are schematics showing the byte clocks and "go" tag sequencer including a number of logic components interconnected as shown. The byte clock is used internally to physically request IBM System/360/370 I/O interface channel 18 to transfer data to processor 60 or to transfer data to channel 18 from processor 60 one byte at a time. The go tag signal occurs between the start process and the termination process and remains on while data transfer is taking place. The upper righthand corner of FIG. 6F-2 is a clock divider for the 18 MHz crystal signal.

Figures 1, 6G:
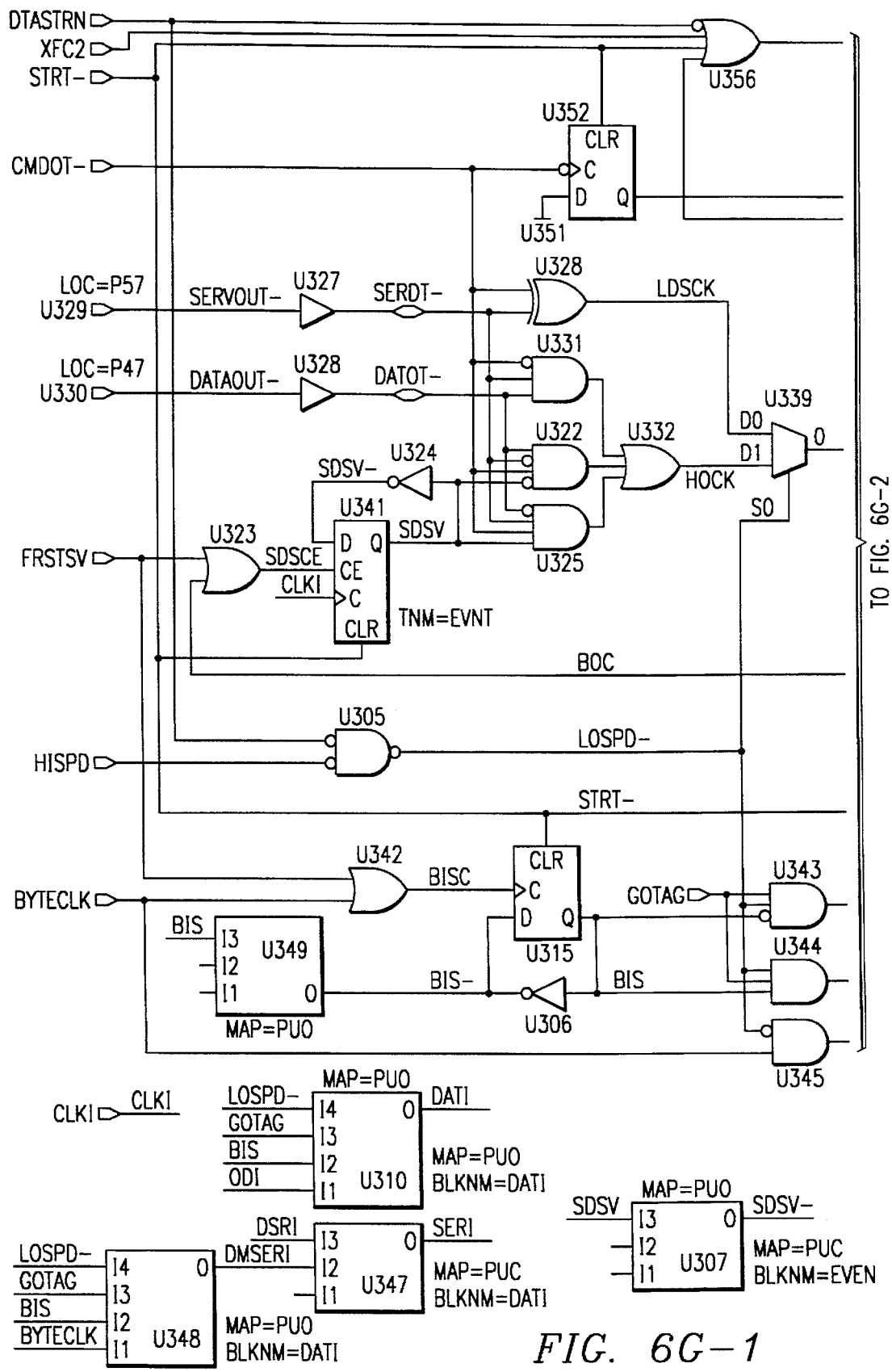
Figures 2, 6G:
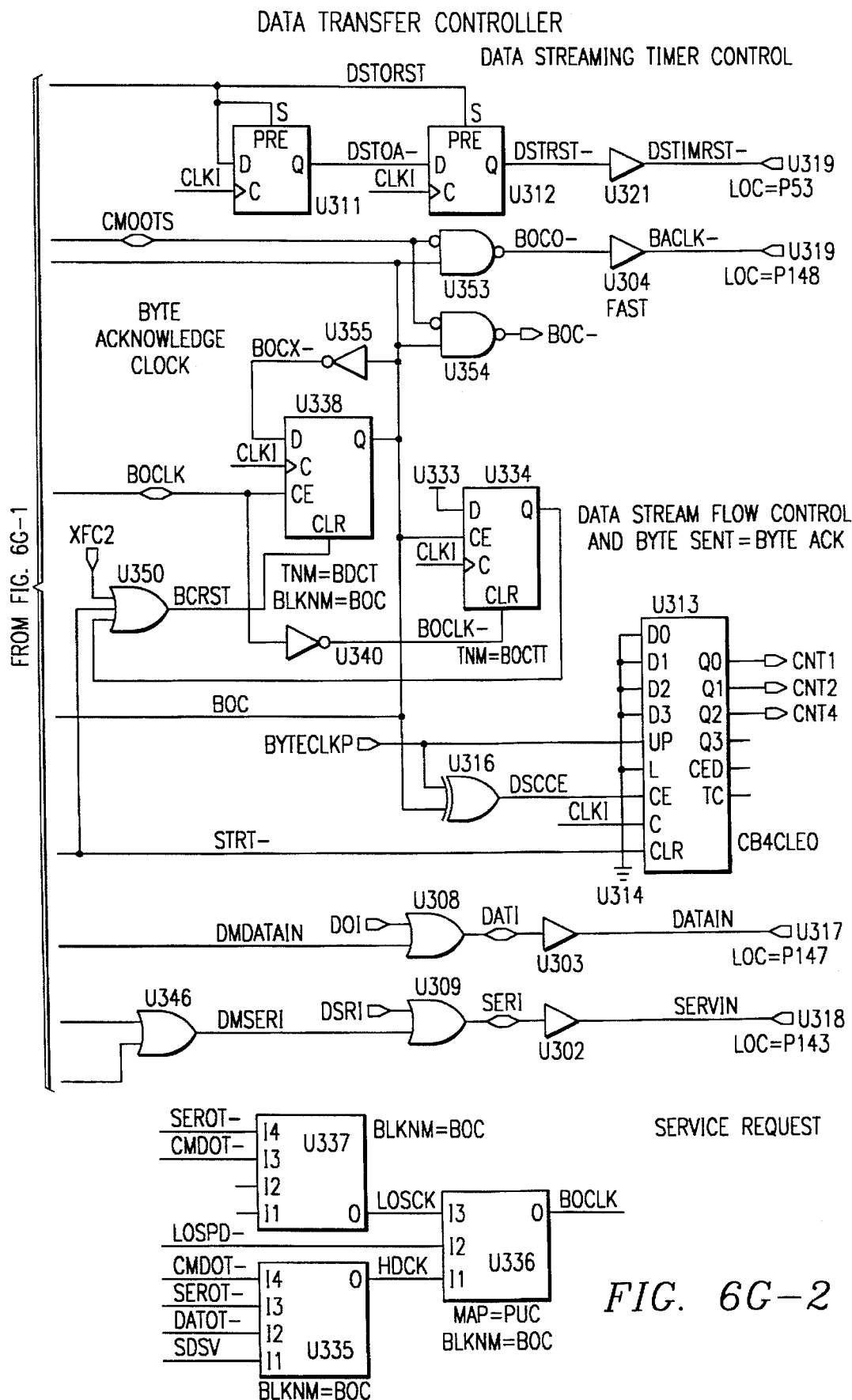

FIG. 6G-1, 6G-2 are schematics showing the data transfer controller including a number of logic components interconnected as shown. The data transfer controller operates under two different types of data transfer. One type is synchronous, and the other type is asynchronous. The data-in and service-in lines and the service-out and data-out lines are used in both types of data transfer. In synchronous data transfer, which is referred to as data streaming, the data-in and service-in lines are used alternatively to transfer data into IBM System/360/370 I/O interface channel 18. At some point after that process begins, the service-out and data-out lines are actuated by mainframe 16 to indicate that synchronous data transfer was received. In the asynchronous mode of transfer, the data-in and service-in lines are used to request a data transfer, and the service-out and data-out lines are then used to acknowledge the request. The propagation delay in IBM System/360/370 I/O interface channel 18, itself, actually reduces the transfer rate in the asynchronous mode because processor 60 must wait for acknowledgement on the service-out and data-out lines before data transfer can take place.

Figure 6H:
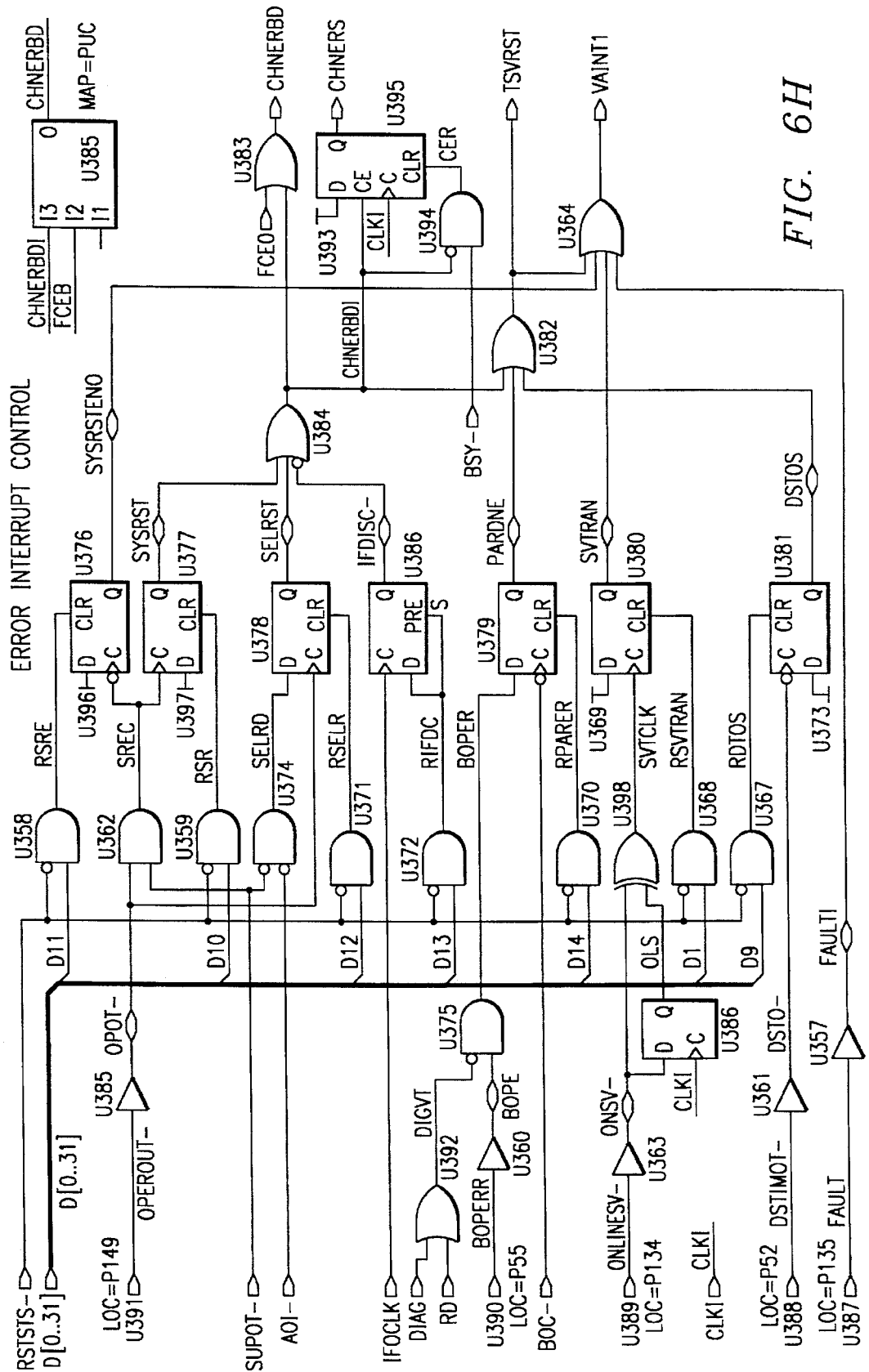

FIG. 6H is a schematic showing the error interrupt control including a number of logic components interconnected as shown. The error interrupt control operates to control three conditions from mainframe 16: resets, selective reset and interface disconnect. Error interrupt control also has three internally generated error conditions. The first one is a parity error which is a standard check on data. If the data is corrupted for some reason, the data transfer must be stopped and re-started. Another error is a switch transition that is an online/offline switch. If this switch has been actuated, processor 60 decides whether or not to go online or whether to go offline based on the current status so that data transfer in process is not interrupted. Data streaming/time out is a counter that times the interval between responses from mainframe 16 to ensure that if IBM System/360/370 I/O interface channel 18 is inactive for too long, processor 16 disconnects to ensure IBM System/360/370 I/O interface channel 18 is not reserved by a nonfunctioning entity.

Figures 1, 6I:
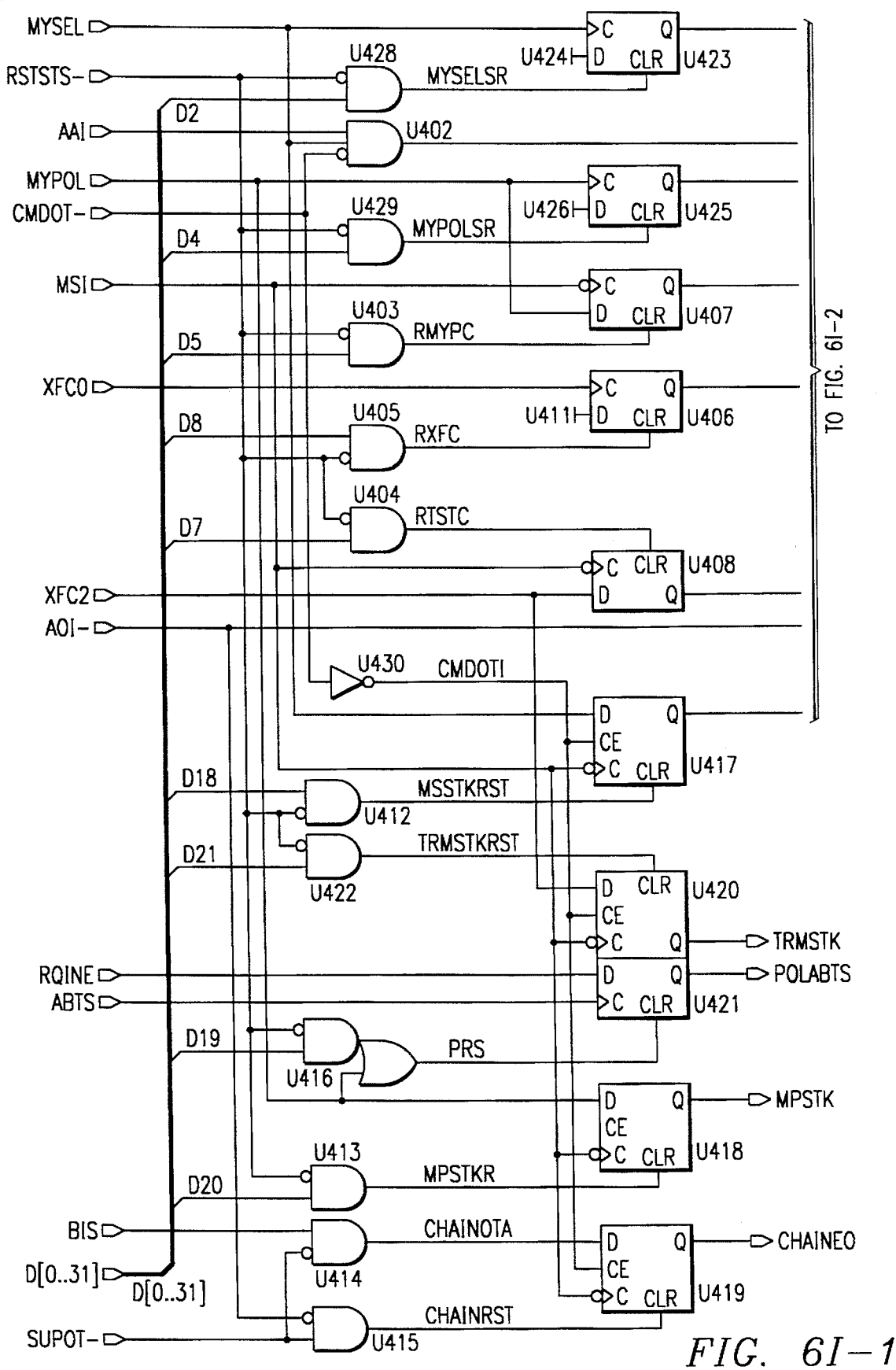
Figures 2, 6I:
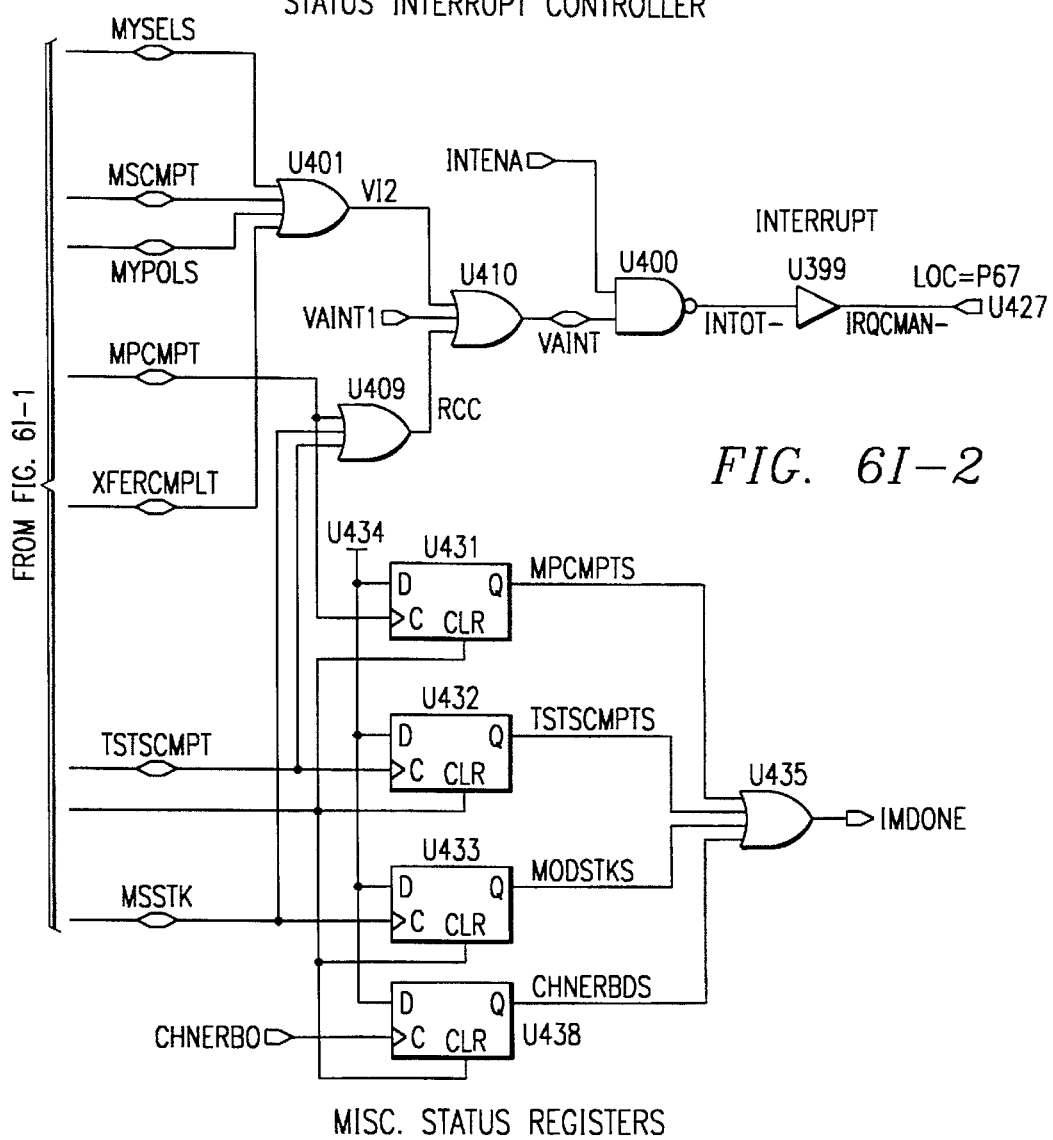

FIGS. 6I-1, 6I-2 are schematics showing the status interrupt controller including a number of logic components interconnected as shown. One function on the righthand side of FIG. 6I is a physical interrupt signal that goes to processor 60. The status interrupt controller generates a variety of status signals which are used by processor 60.

FIGS. 6J-1, 6J-2 and 6K-1, 6K-2 are schematics showing the processor data multiplexers providing an interface between the 32-bit data bus that connects processor 60 and channel controller 64 including a number of logic components interconnected as shown. The processor data multiplexers operate both for input and output of data on that bus.

Figures 1, 6N:
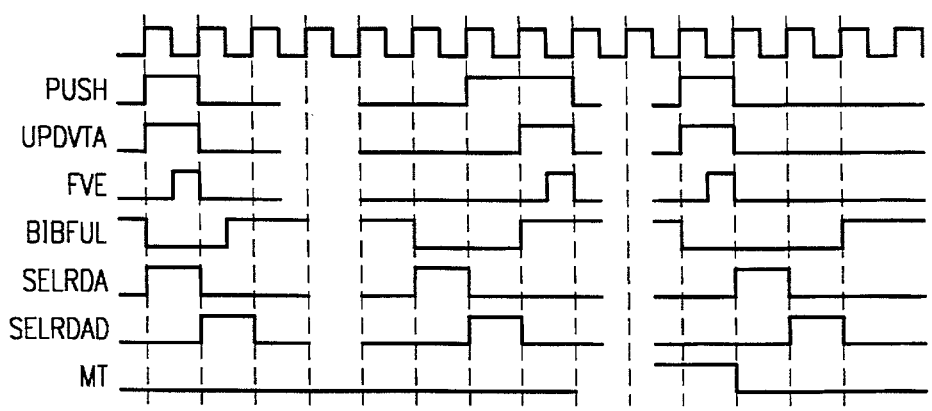
Figures 2, 6J:
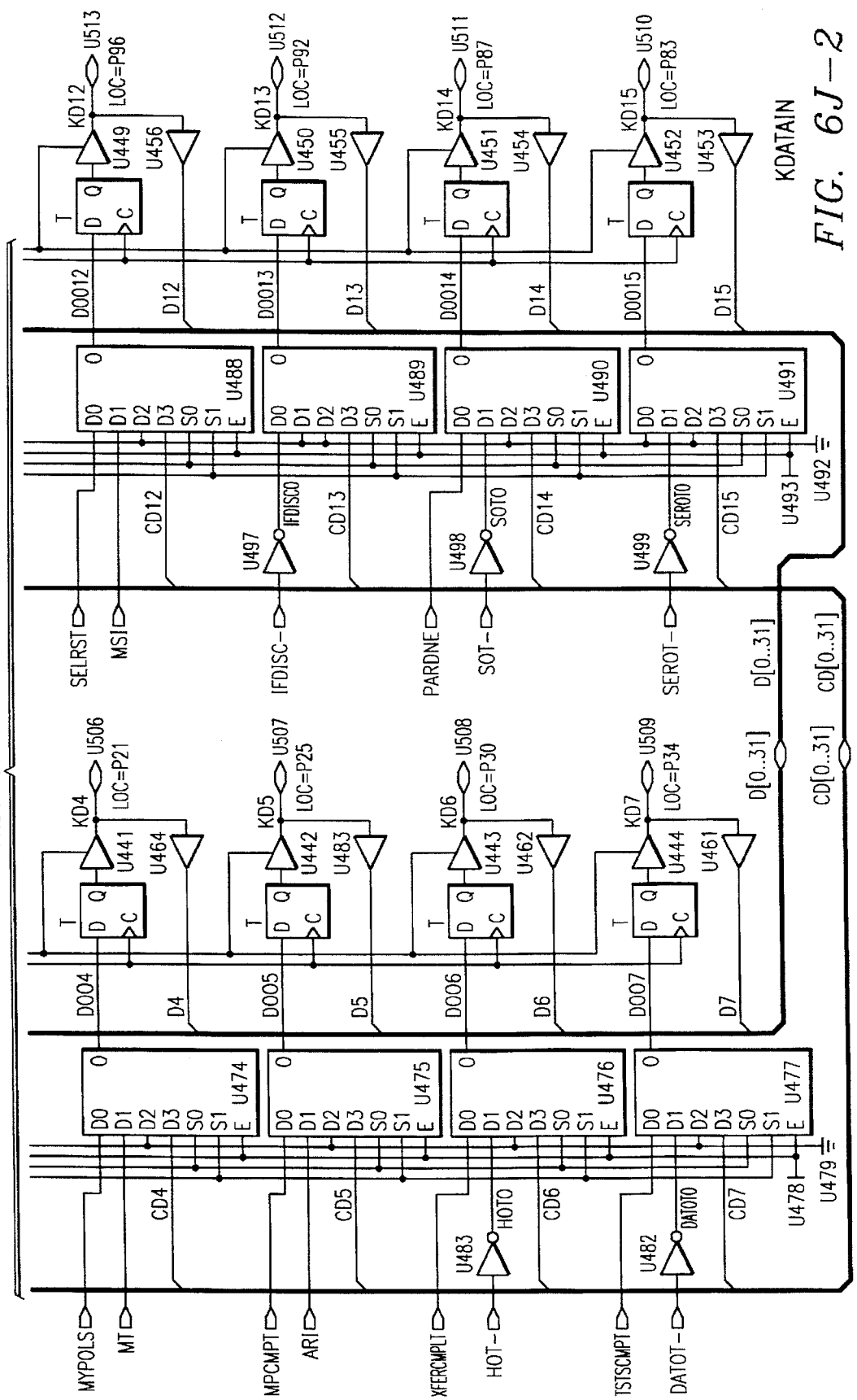
Figures 1, 6K:
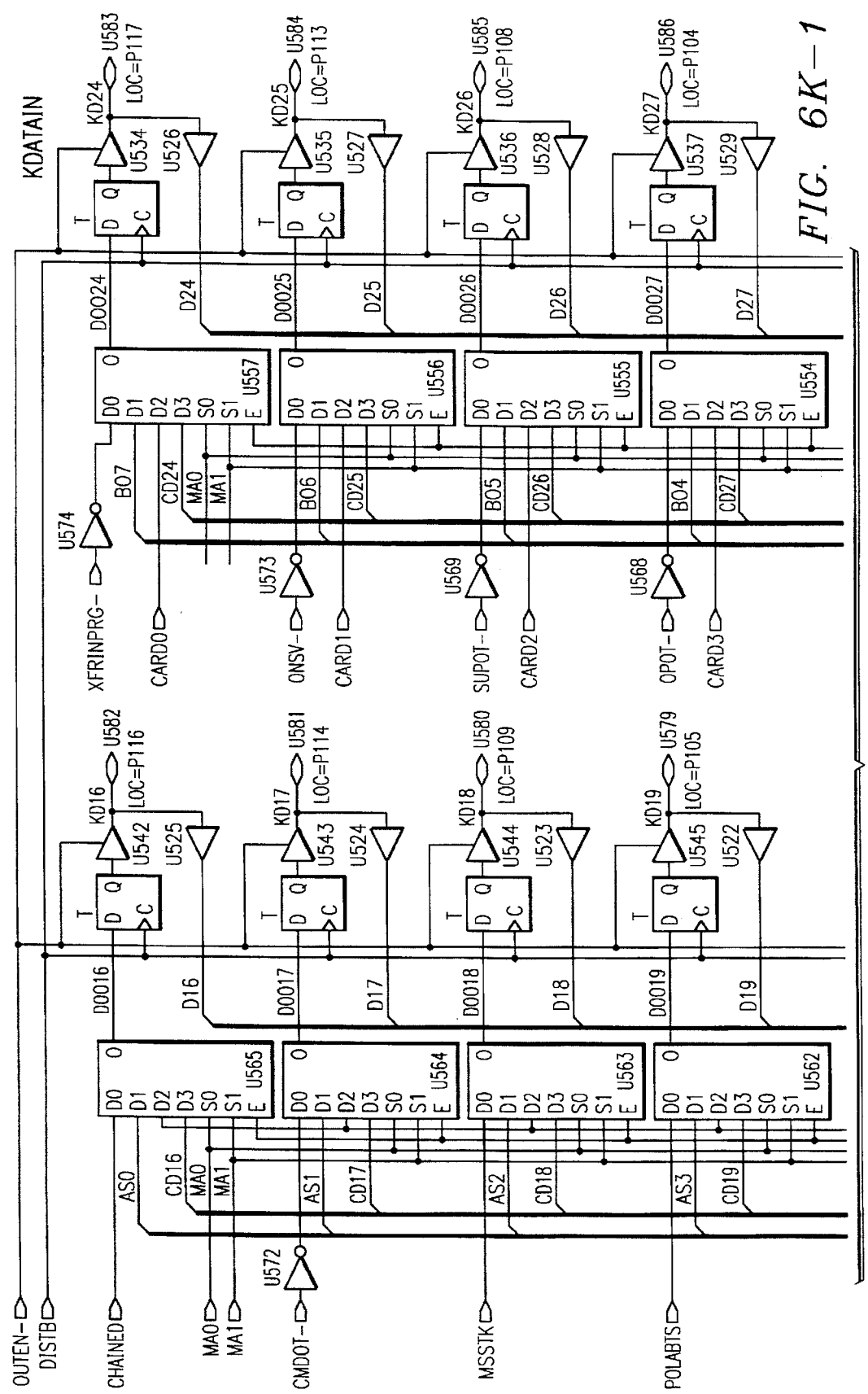
Figures 2, 6K:
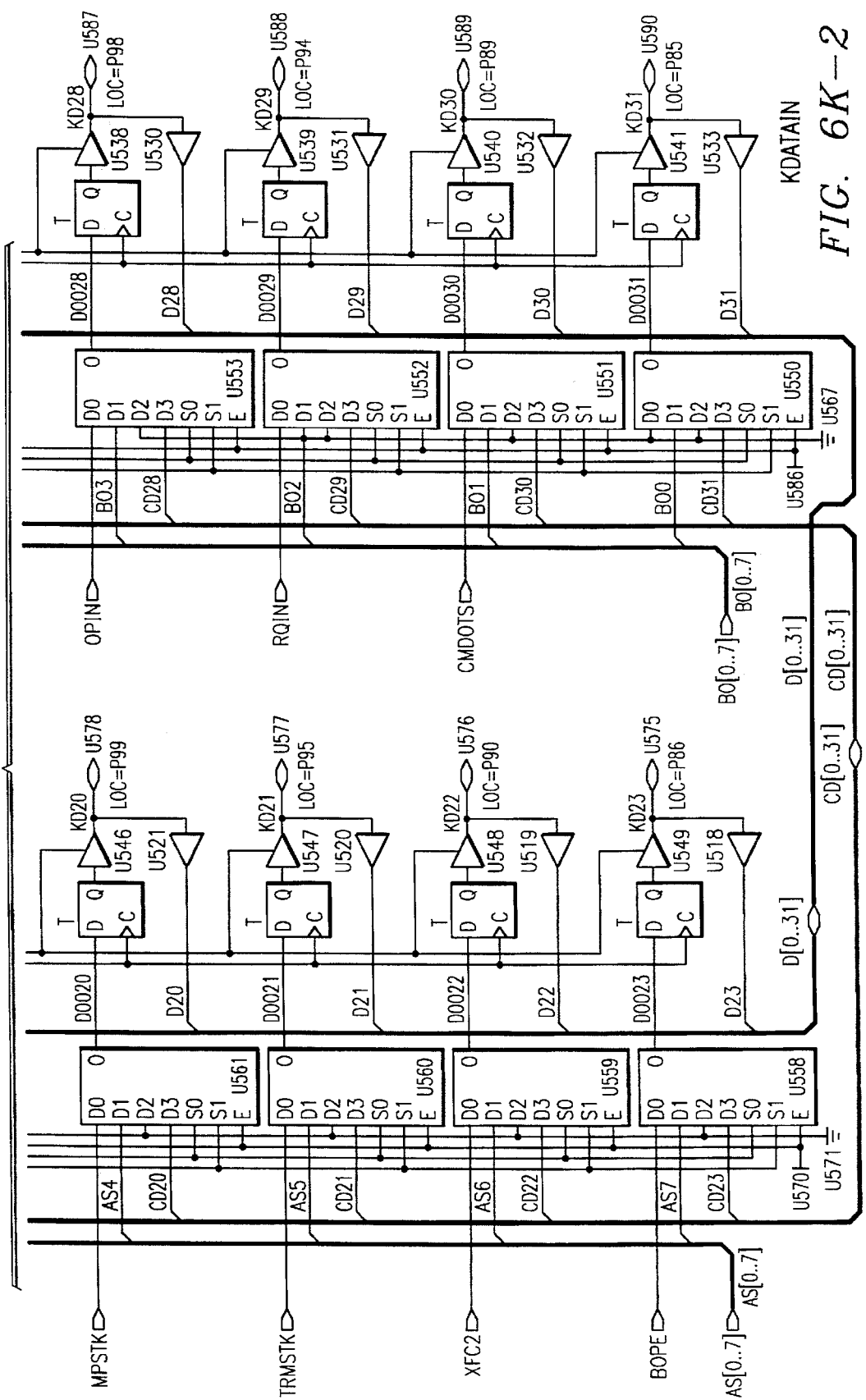
Figures 1, 6L:
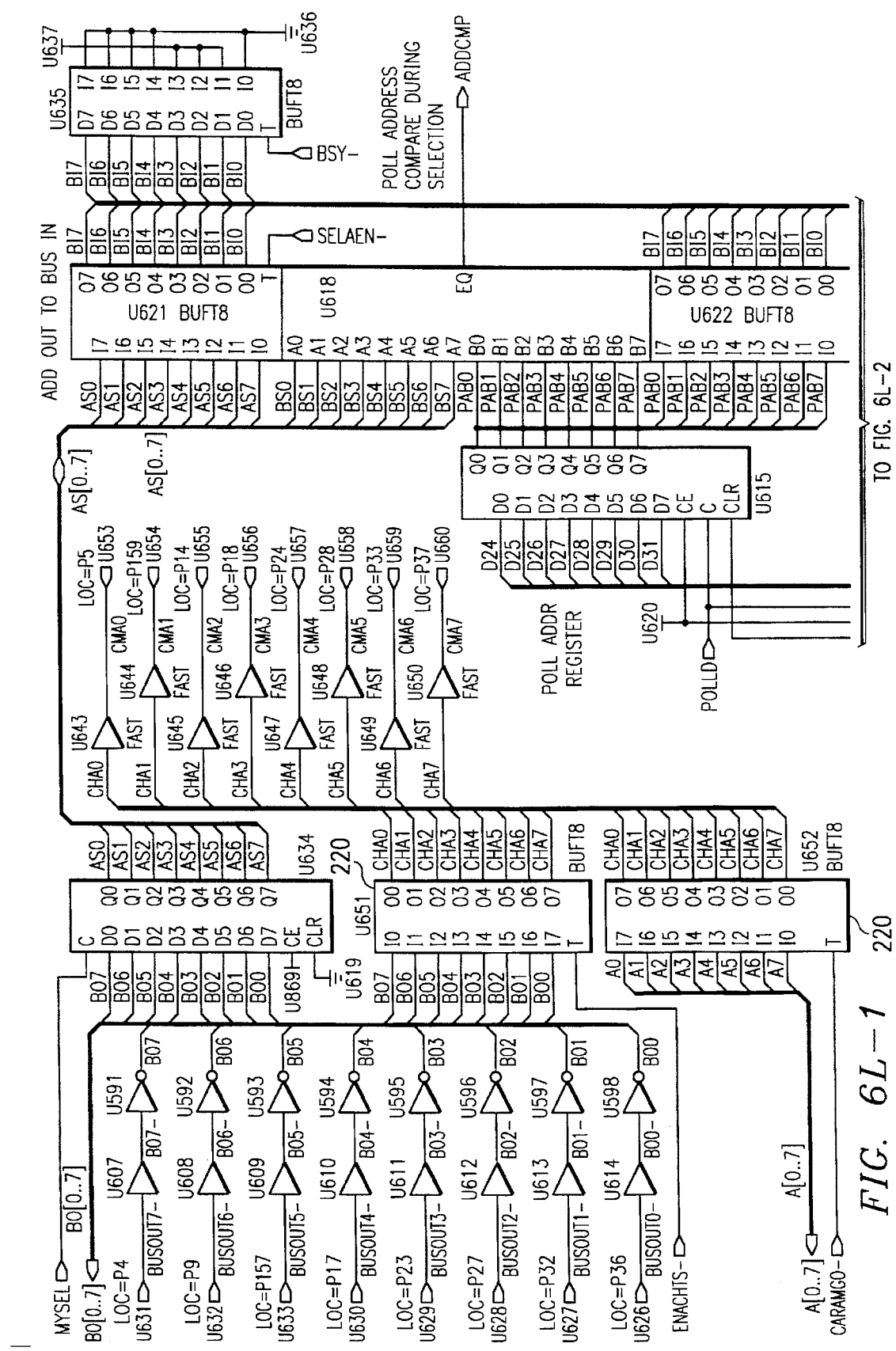
Figures 2, 6L:
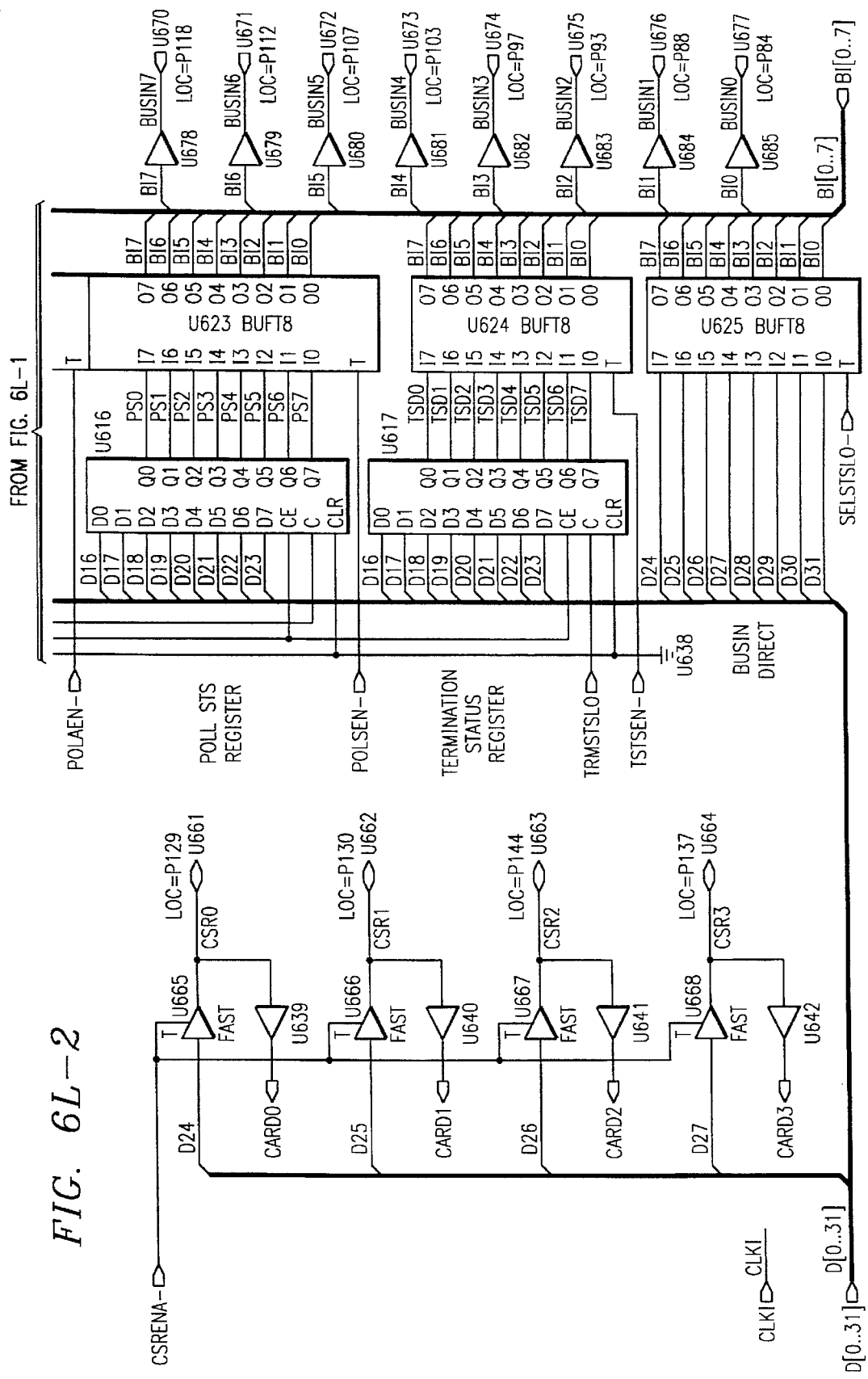

FIGS. 6L-1, 6L-2 are schematics showing the bus-in and bus-out for the connection of data lines from bus interface 66 to channel controller 64 including a number of logic components interconnected as shown. Bus-in on the right side of FIGS. 6L-1, 6L-2 are schematics comprising the output of channel controller 64 to mainframe 16. Bus-out comprises the data coming out of mainframe 16 and going into channel controller 64. Devices 220 comprise an address multiplexer for the 256×4 SRAM shown as device 148 of FIGS. 5F-1, 5F-2. Devices 220 comprise address modes for the SRAM, and card 0, 1, 2, 3 comprises the data mux for the SRAM.

Figures 1, 6M:
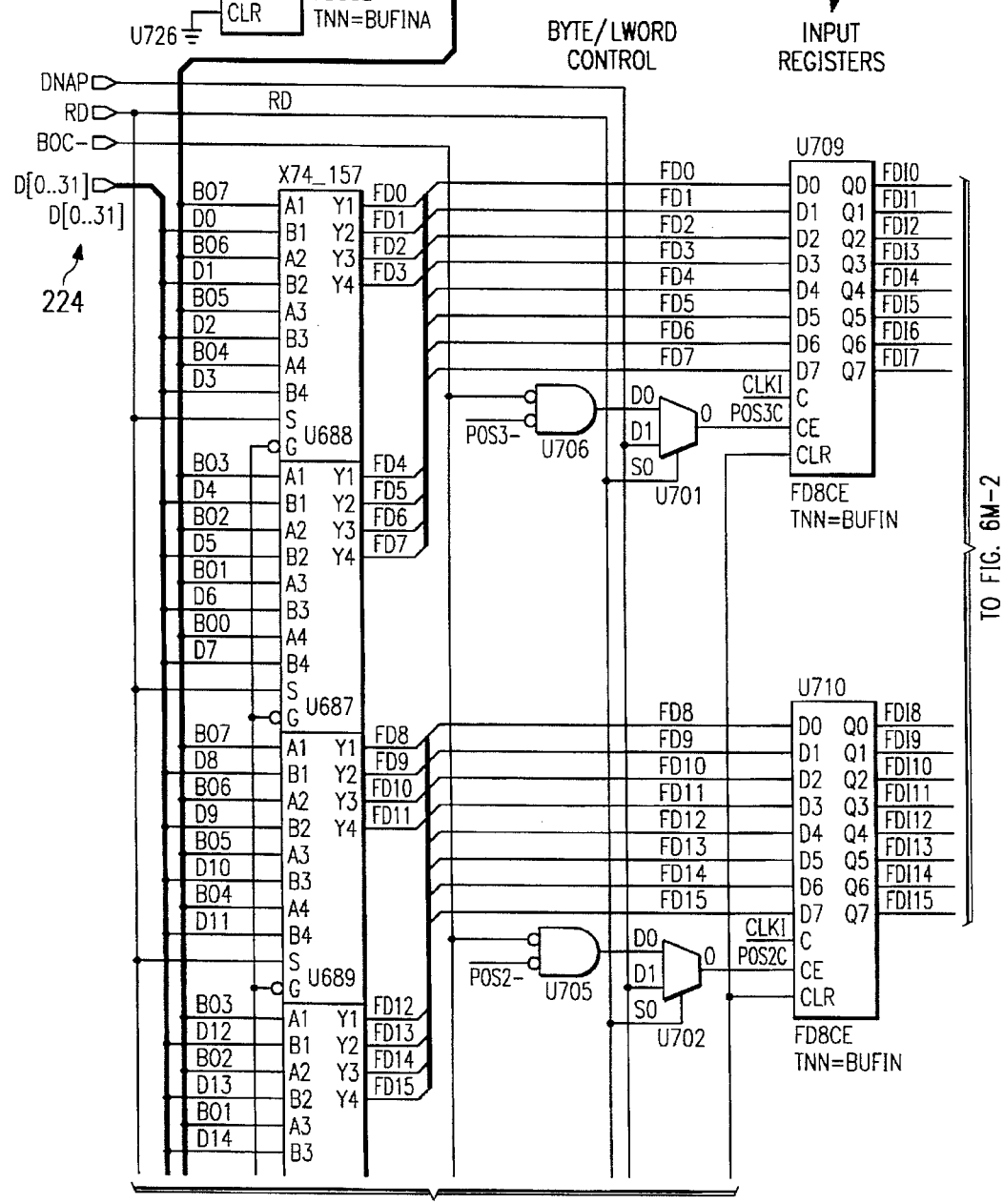
Figures 2, 6M:
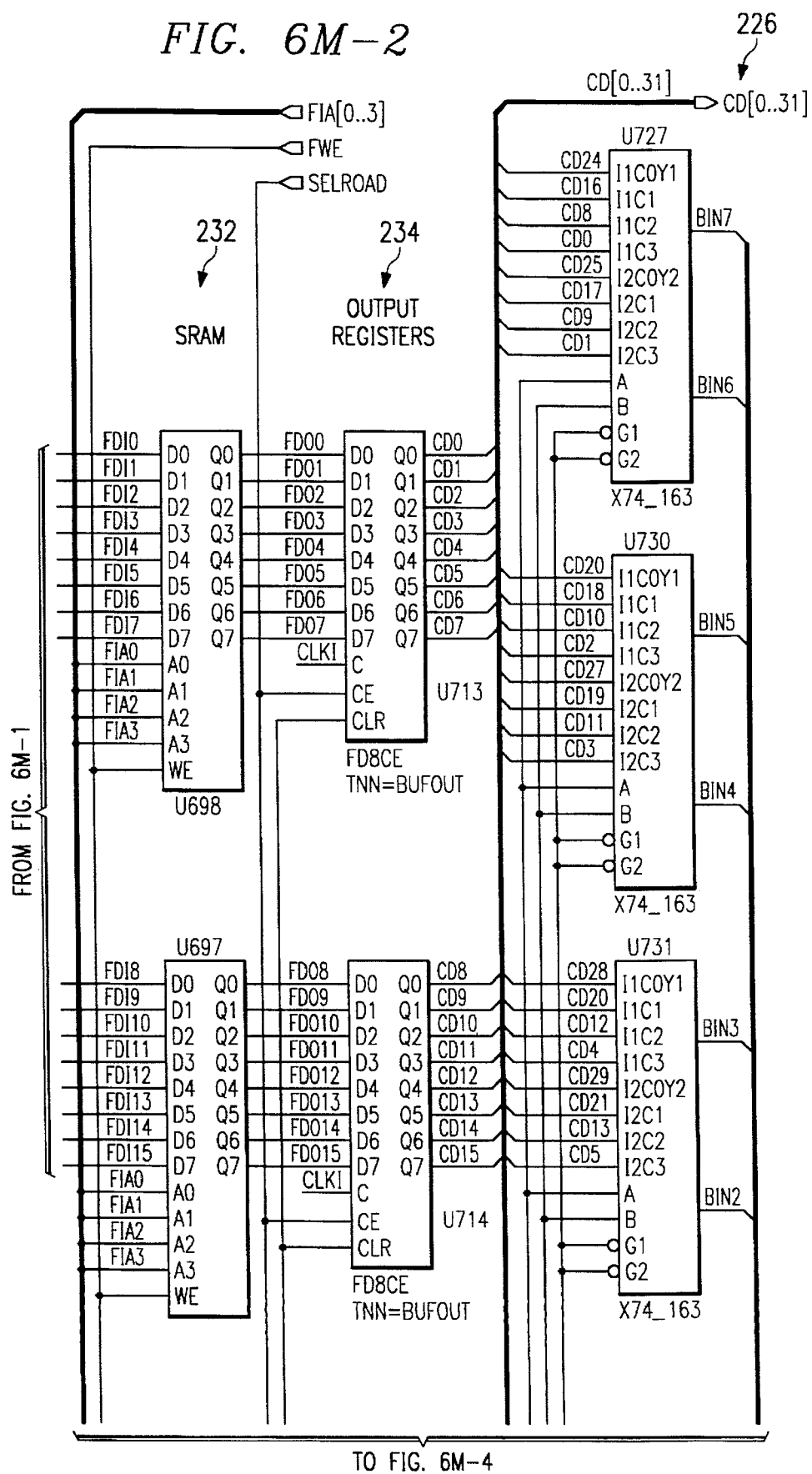
Figures 3, 6M:
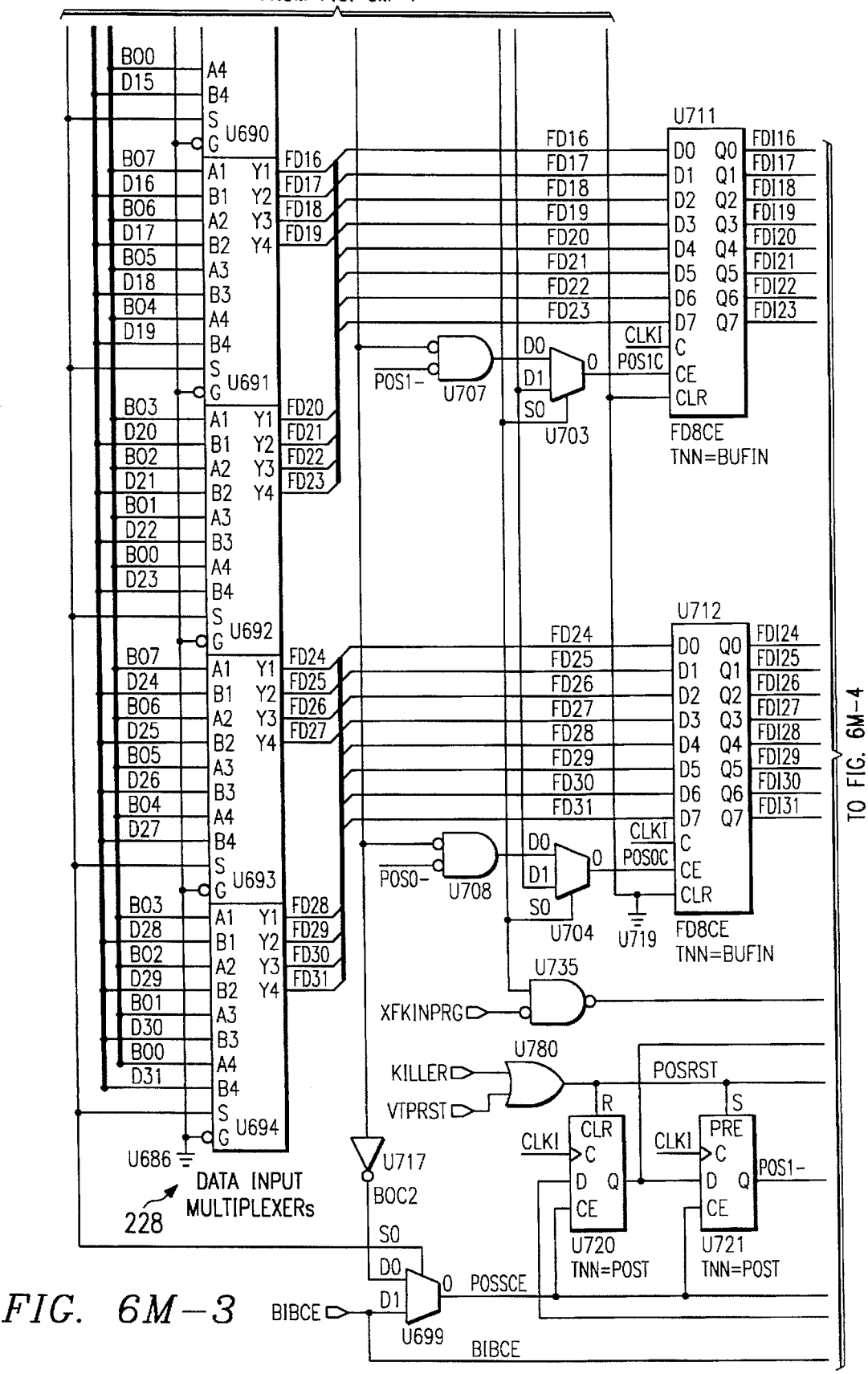
Figures 4, 6M:
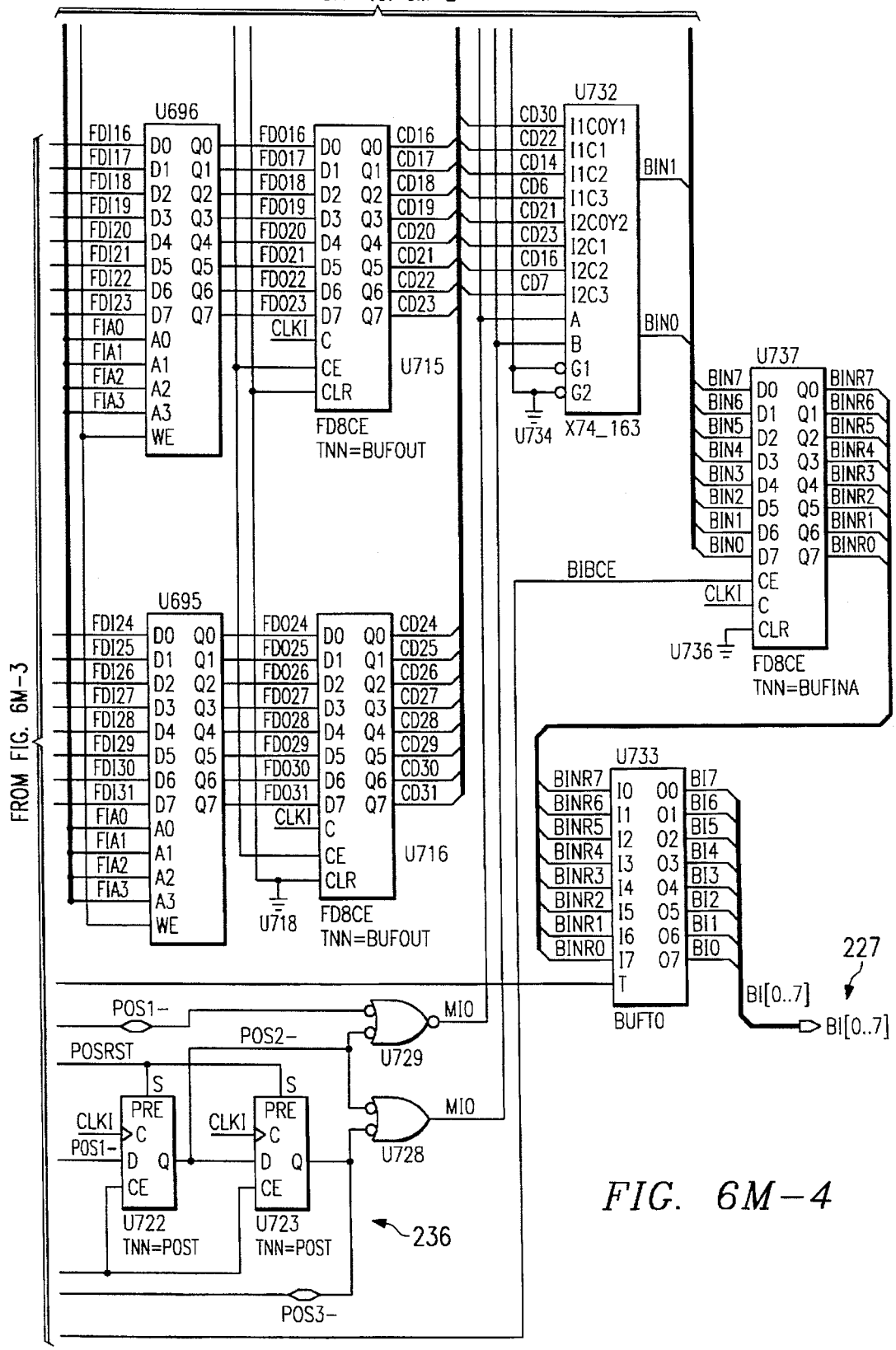
Figures 2, 6N:
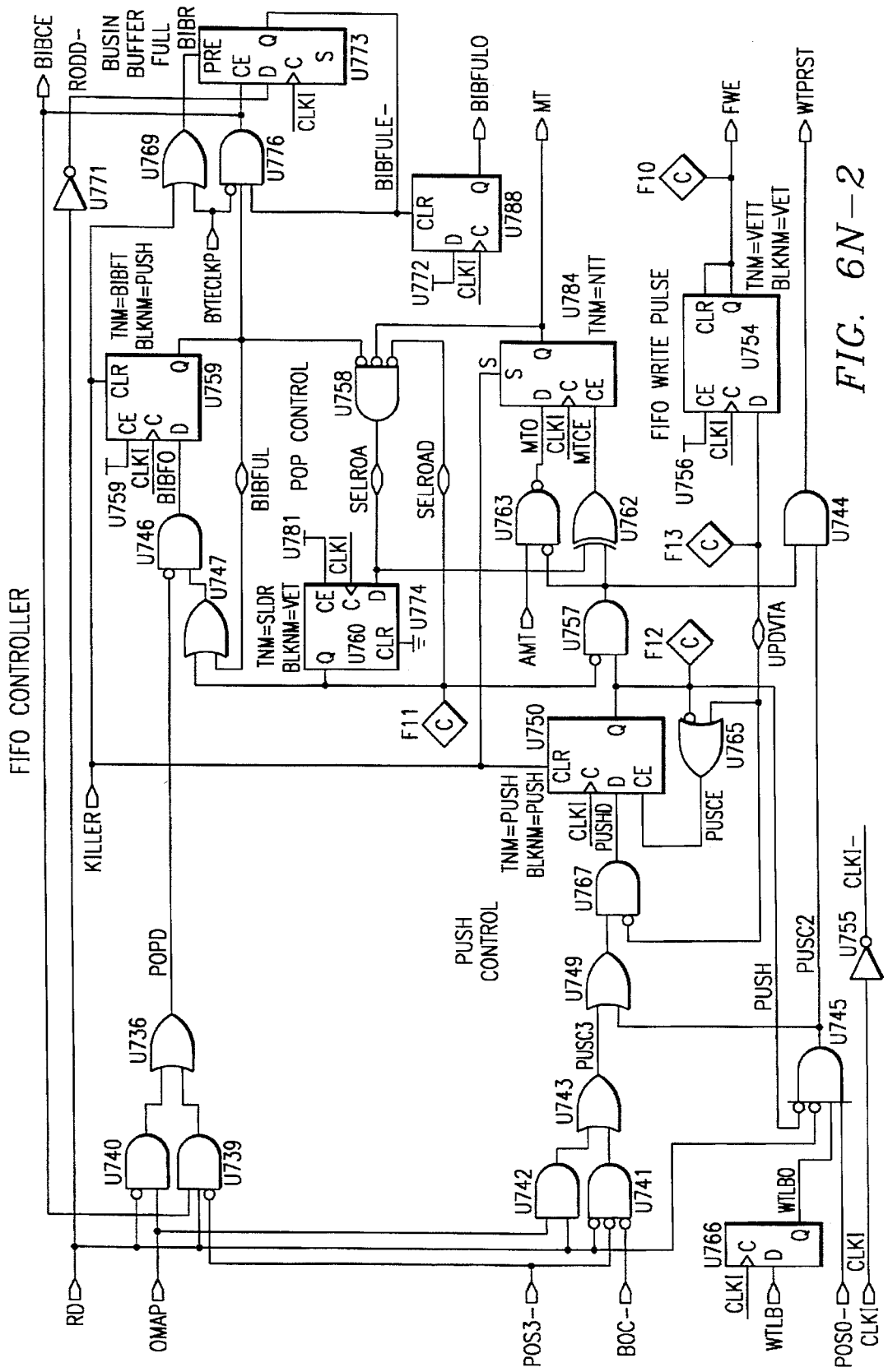
Figures 2, 60:
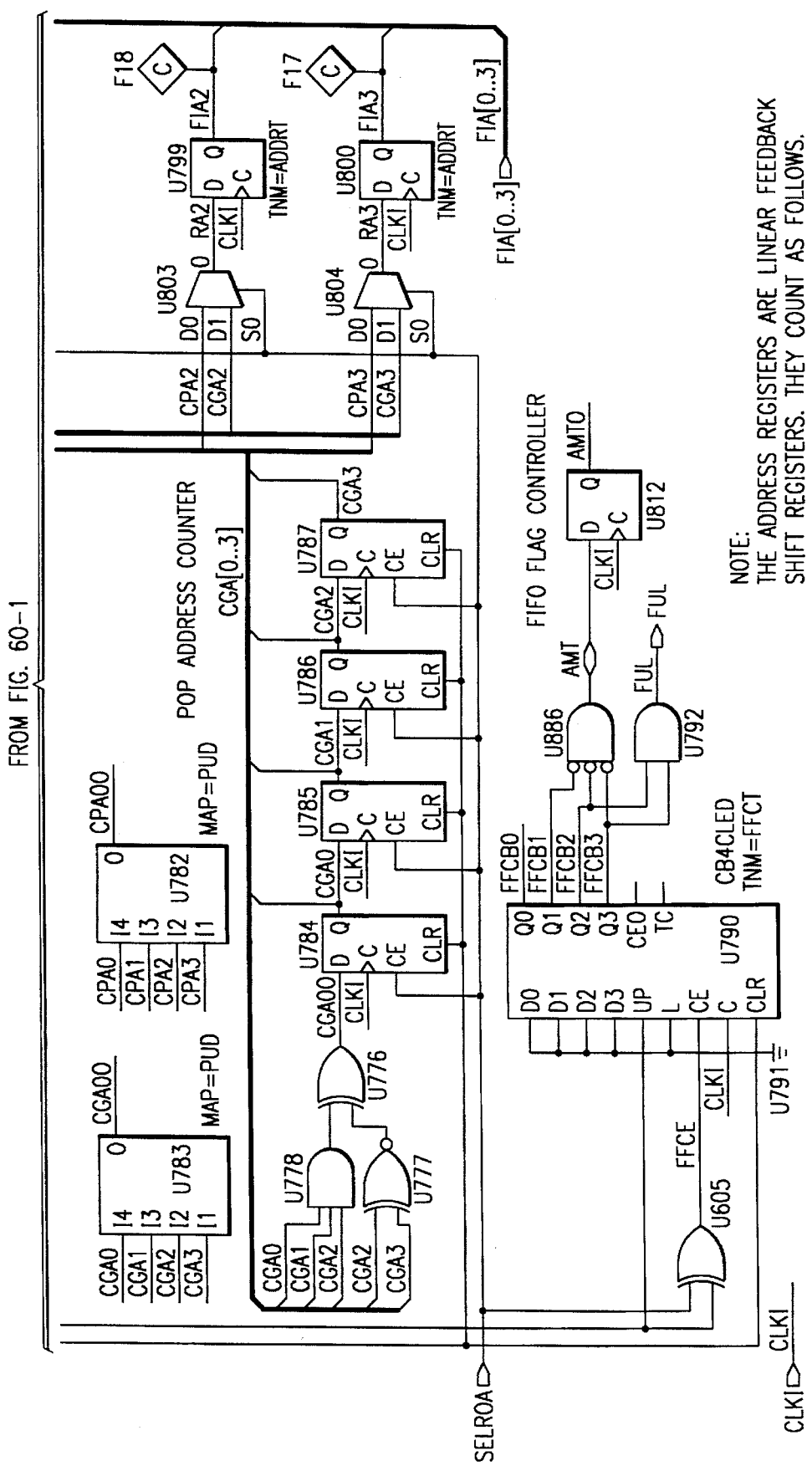
FIG. 2 is a block diagram of one embodiment of an IBM® mainframe connected to a SCSI host via an adapter for interfacing a SCSI bus with an IBM System/360/370 I/O interface channel constructed according to the teachings of the present invention.

FIGS. 6M-1, 6M-2, 6M-3, 6M-4 are schematics showing a data interchange and FIFO system including a number of logic components interconnected as shown. A data path 222 from IBM System/360/370 I/O interface channel 18 is shown in the upper lefthand corner of FIG. 6M-1. Below that, a data path 224 from processor 64 is shown. A data path 226 to processor 64 is shown in the upper righthand corner, and a data path 227 to the channel is shown on the lower right side of FIGS. 6M-2, and 6M-4. Data is received from processor 64 in a 32-bit wide data path and is received from IBM System/360/370 I/O interface channel 18 in an 8-bit wide data path. The data is first placed in a parallel array 228 of data input and multiplexers used to load input registers 230 in the center of FIG. 6M-1. The input registers 230 are loaded in parallel if the data width is 32-bits or sequentially if the data width is 8 bits. The input registers 230 are then used to load an SRAM 232. The SRAM 232 is addressed in a FIFO configuration to load the output registers 234. The output registers 234 are then routed either to processor 64 or to IBM System/360/370 I/O interface channel 18 depending upon the desired destination. At the bottom of FIG. 6M is shown logic 236 which is the channel positioning controller.

The channel positioning controller logic 236 controls which of the input registers 230 is being loaded and which of the output muxes are being accessed for output to IBM System/360/370 I/O interface channel 18.

FIGS. 6N-1, 6N-2 are schematics showing the FIFO push-pop controller including a number of logic components interconnected as shown. This circuit creates control signals that control whether or not data is being pushed into the FIFO or popped out of the FIFO and that control in what order both operations are occurring.

FIGS. 6O-1, 6O-2 are schematics showing the FIFO address and flag controller system including a number of logic components interconnected as shown. The center part of FIGS. 6O-1, 6O-2 are the push address counter and the pop address counter which is the address control for the FIFO. The FIFO flag controller at the bottom of FIGS. 6O-1, 6O-2 determine whether or not the FIFO is empty or full. Direct memory access ("DMA") request is a line that is pulled by channel controller 64 any time channel controller 64 needs data or has data to be placed in memory using a DMA operation.

Overview

An adapter for interfacing a SCSI bus with an IBM System/360/370 I/O interface channel constructed according to the teachings of the present invention provides bidirectional communication at high data bandwidth to take advantage of the bandwidth of the IBM System/360/370 I/O interface channel. Because of the wide availability of SCSI device ports on computer workstations and personal computers, the adapter of the present invention benefits numerous information systems currently used by organizations that include both SNA and TCP/IP environments.

An adapter constructed according to the teachings of the present invention operates to provide numerous functional advantages. Normal DC-interlocked and high-speed transfer features of the IBM System/360/370 I/O interface channel can be supported. Data streaming features of the IBM System/360/370 I/O interface channel can also be supported as well as burst data rates equal to the bandwidth of data streaming on the IBM System/360/370 I/O interface channel. The adapter operates such that arbitrary limits to the number of concurrent sessions are not imposed. The adapter is also flexible to allow adaptation to implement additional channel protocols.

Although the present invention has been described in detail, it should be understood that various changes, substitutions and alterations can be made hereto without departing from the spirit and scope of the invention as defined by the appended claims.

What is claimed is:

1. A data processing system including a plurality of computer systems, the data processing system comprising:

a first computer system having an IBM System/360/370 I/O interface channel, the first computer system operable to communicate SNA and non-SNA protocol information via the IBM System/360/370 I/O interface channel;

a second computer system having a SCSI bus, the second computer system operable to communicate SCSI protocol information via the SCSI bus; and an adapter coupled to the IBM System/360/370 I/O interface channel of the first computer system and the SCSI bus of the second computer system, the adapter operable to interface the SCSI bus with the IBM System/360/370 I/O interface channel to allow bidirectional communication between the IBM System/360/370 I/O interface channel of the first computer system and the SCSI bus of the second computer system.

2. The data processing system of claim 1, wherein the adapter is further operable to define a plurality of logical units representing SCSI devices for communicating information via the SCSI bus.

3. The data processing system of claim 2, wherein the plurality of logical units represent tape devices.

4. The data processing system of claim 1, wherein the adapter comprises:
- a SCSI interface unit, the SCSI interface unit coupled to the SCSI bus;
- a channel interface unit, the channel interface unit coupled to the IBM System/360/370 I/O interface channel; and
- a processor coupled to the SCSI interface unit and to the channel interface unit, the processor operable to control operation of the adapter.

5. The data processing system of claim 4, wherein the SCSI interface unit comprises a dedicated SCSI controller.

6. The data processing system of claim 4, wherein the channel interface unit comprises a programmable logic device.

7. The data processing system of claim 4, wherein the processor comprises a 32-bit microprocessor.

8. The data processing system of claim 1, wherein the first computer system comprises an IBM or compatible mainframe computer system.

9. The data processing system of claim 1, wherein the second computer system comprises a UNIX-based computer workstation.

10. The data processing system of claim 1, wherein the second computer system comprises a personal computer.

11. The data processing system of claim 10, wherein the second computer system operates under a WINDOWS™ operating system.

12. An adapter for interfacing a SCSI bus with an IBM System/360/370 I/O interface channel, the adapter comprising:
- a channel interface unit operable to couple to an IBM System/360/370 I/O interface channel, the channel interface unit operable to communicate SNA and non-SNA protocol information via the IBM System/360/370 I/O interface channel;
- a SCSI interface unit operable to couple to a SCSI bus, the SCSI interface unit operable to communicate SCSI protocol information via the SCSI bus; and
- a processor coupled to the channel interface unit and to the SCSI interface unit, the processor operable to control the channel interface unit and the SCSI interface unit to allow bidirectional communication between the SCSI bus and the IBM System/360/370 I/O interface channel.

13. The adapter of claim 12, wherein the processor is further operable to define a plurality of logical units representing SCSI devices for communicating information via the SCSI bus.

14. The adapter of claim 13, wherein the plurality of logical units represent tape devices.

15. The adapter of claim 12, wherein the channel interface unit, the SCSI interface unit and the processor are coupled to a processor bus.

16. The adapter of claim 15, further comprising a front panel coupled to the processor bus and operable to provide a user interface.

17. The adapter of claim 15, further comprising a dynamic RAM, a static RAM, and a programmable ROM, each coupled to the processor bus.

18. The adapter of claim 12, wherein the SCSI interface unit comprises a dedicated SCSI controller.

19. The adapter of claim 12, wherein the channel interface unit comprises a programmable logic device.

20. The adapter of claim 12, wherein the processor comprises a 32-bit microprocessor.

21. An adapter for interfacing a SCSI bus with an IBM System/360/370 I/O interface channel, the adapter comprising:
- a channel connector, the channel connector operable to couple to an interface channel port of a first computer system, the interface channel port providing access to an IBM System/360/370 I/O interface channel;
- a bus and tag interface coupled to the channel connector;
- a channel controller coupled to the bus and tag interface, the channel controller operable to communicate SNA protocol information via the IBM System/360/370 I/O interface channel;
- a SCSI connector, the SCSI connector operable to couple to a SCSI device port of a second computer system, the SCSI device port providing access to a SCSI bus;
- a SCSI controller coupled to the SCSI connector, the SCSI controller operable to communicate SCSI protocol information via the SCSI bus;
- a processor bus coupled to the channel controller and to the SCSI controller;
- a user interface coupled to the processor bus;
- a dynamic RAM device coupled to the processor bus;
- a static RAM device coupled to the processor bus;
- a programmable ROM coupled to the processor bus; and
- a processor coupled to the processor bus, the processor operable to manage operation of the channel controller and the SCSI controller to allow bidirectional communication between the SCSI bus and the IBM System/360/370 I/O interface channel.

22. The adapter of claim 21, wherein the SCSI controller comprises an NCR35CF96-2 SCSI controller.

23. The adapter of claim 21, wherein the channel controller comprises a programmable logic device.

24. The adapter of claim 21, wherein the processor comprises a MC68360 32-bit microprocessor.

25. The adapter of claim 21, wherein the dynamic RAM device comprises an eight megabyte DRAM.

26. The adapter of claim 21, wherein the static RAM device comprises a 512 kilobyte SRAM.

27. The adapter of claim 21, wherein the programmable ROM device comprises a 128 kilobyte EEPROM.

28. The adapter of claim 21, wherein the user interface comprises a front panel having LED's, buttons and an LCD display.

* * * * *

UNITED STATES PATENT AND TRADEMARK OFFICE
CERTIFICATE OF CORRECTION

PATENT NO. : 5,640,541
DATED : June 17, 1997
INVENTOR(S) : Bartram, et al.

It is certified that error appears in the above-identified patent and that said Letters Patent is hereby corrected as shown below:

Title page, [73], delete "Openconnect Systems, Inc." and insert
  -- Openconnect Systems Incorporated --.

Signed and Sealed this

Seventeenth Day of March, 1998

Attest:

BRUCE LEHMAN

Attesting Officer

Commissioner of Patents and Trademarks